(12) United States Patent
Arima et al.

(10) Patent No.: US 10,627,869 B2
(45) Date of Patent: Apr. 21, 2020

(54) INFORMATION PROCESSING DEVICE

(71) Applicant: Japan Display Inc., Tokyo (JP)

(72) Inventors: Kazuya Arima, Tokyo (JP); Eiji Sakai, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/277,123

(22) Filed: Feb. 15, 2019

(65) Prior Publication Data

US 2019/0258298 A1  Aug. 22, 2019

(30) Foreign Application Priority Data

Feb. 15, 2018 (JP) .................................. 2018-025146
May 10, 2018 (JP) .................................. 2018-091507

(51) Int. Cl.
*H05K 5/00* (2006.01)
*G06F 1/16* (2006.01)
*G06F 3/02* (2006.01)

(52) U.S. Cl.
CPC ............. *G06F 1/1654* (2013.01); *G06F 1/165* (2013.01); *G06F 1/169* (2013.01); *G06F 1/1662* (2013.01); *G06F 3/0202* (2013.01)

(58) Field of Classification Search
CPC ........................................................ H05K 5/00
See application file for complete search history.

(56) References Cited

U.S. PATENT DOCUMENTS

2010/0246119 A1* 9/2010 Collopy ................ G06F 1/1616
361/679.55

FOREIGN PATENT DOCUMENTS

JP  2005-190353 A  7/2005

* cited by examiner

*Primary Examiner* — Jerry Wu
(74) *Attorney, Agent, or Firm* — K&L Gates LLP

(57) ABSTRACT

According to one embodiment, an information processing device includes a keyboard arranged on an upper surface of a body, a main display connected to the body, and a sub-display arranged on a palm rest portion located on a front side of the keyboard.

19 Claims, 35 Drawing Sheets

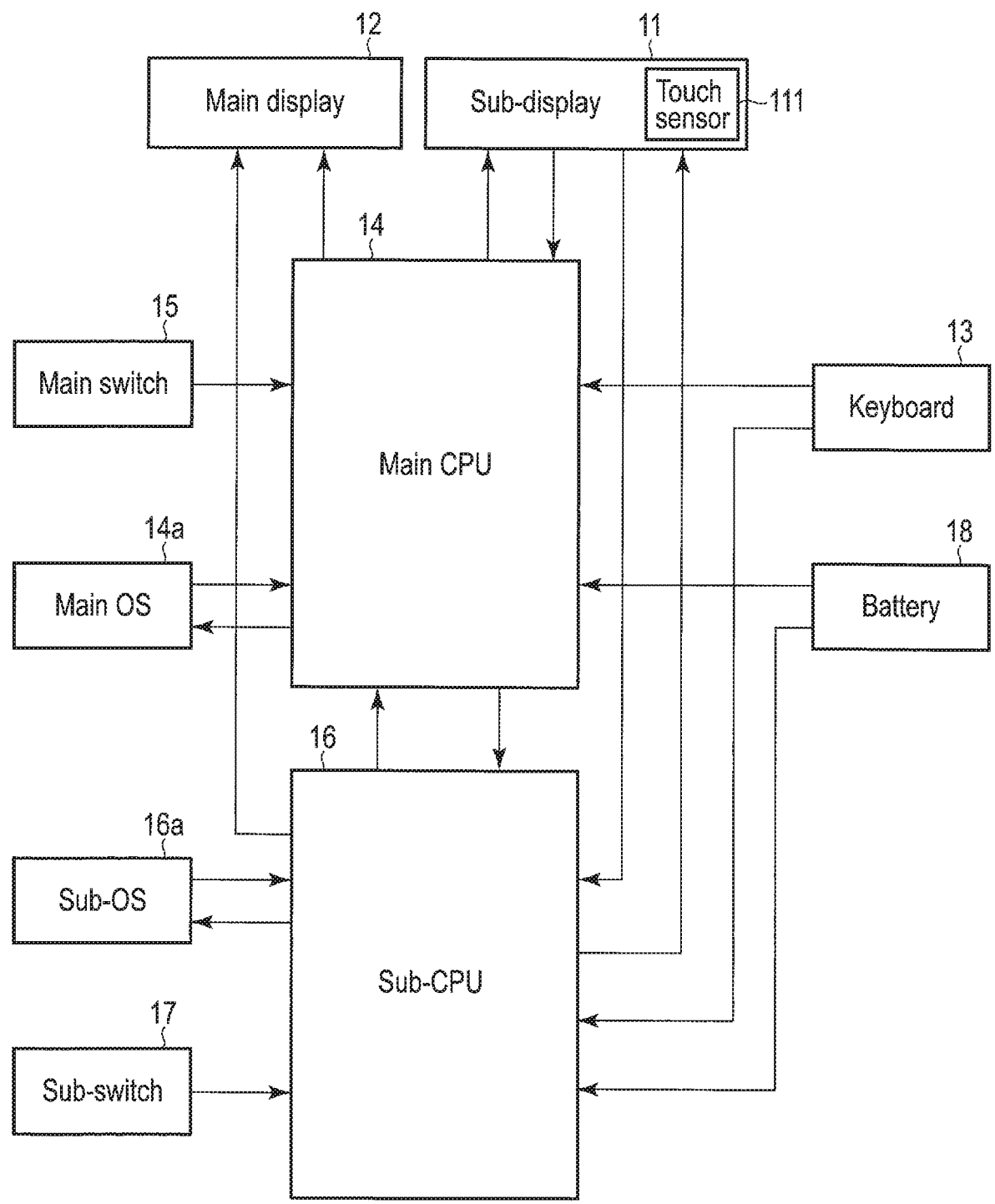
F I G. 6

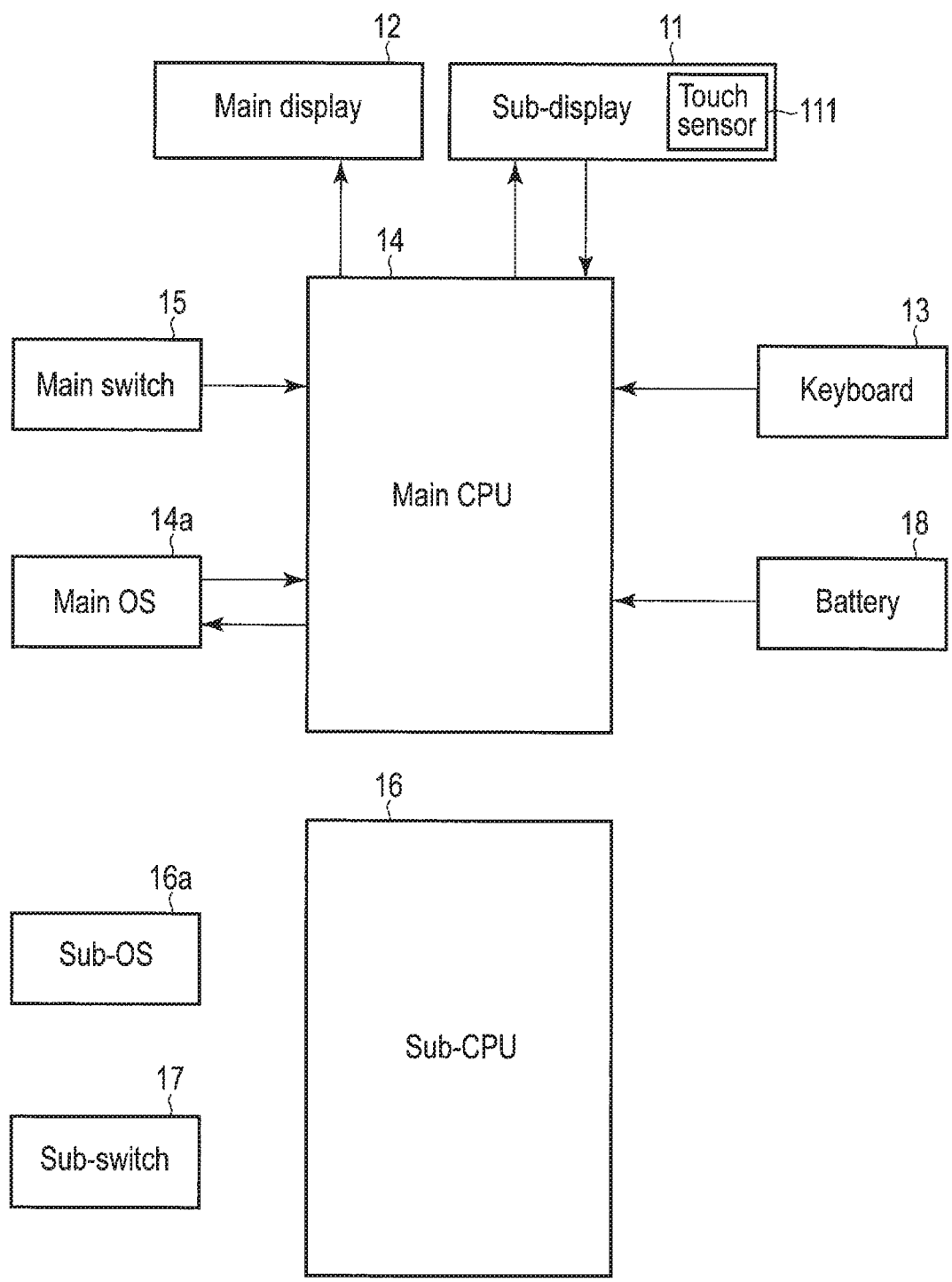
F I G. 7

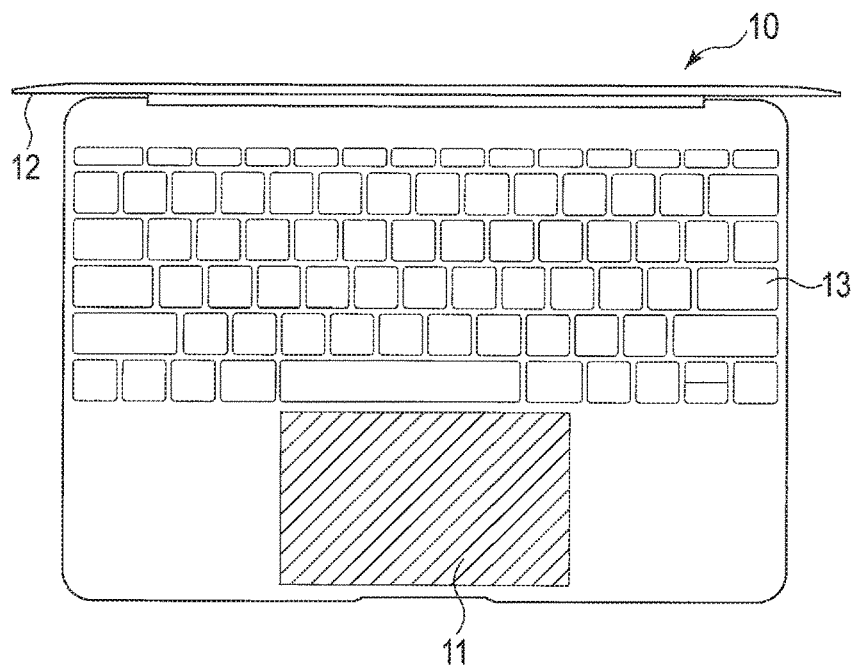
F I G. 12
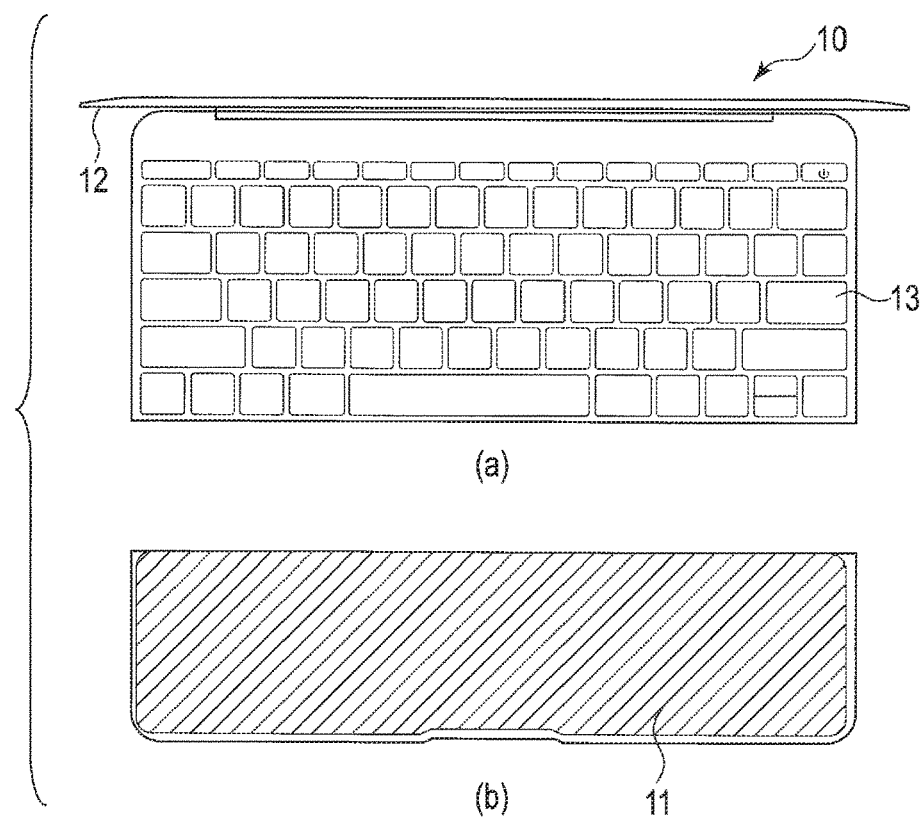
(a)
(b)
F I G. 13

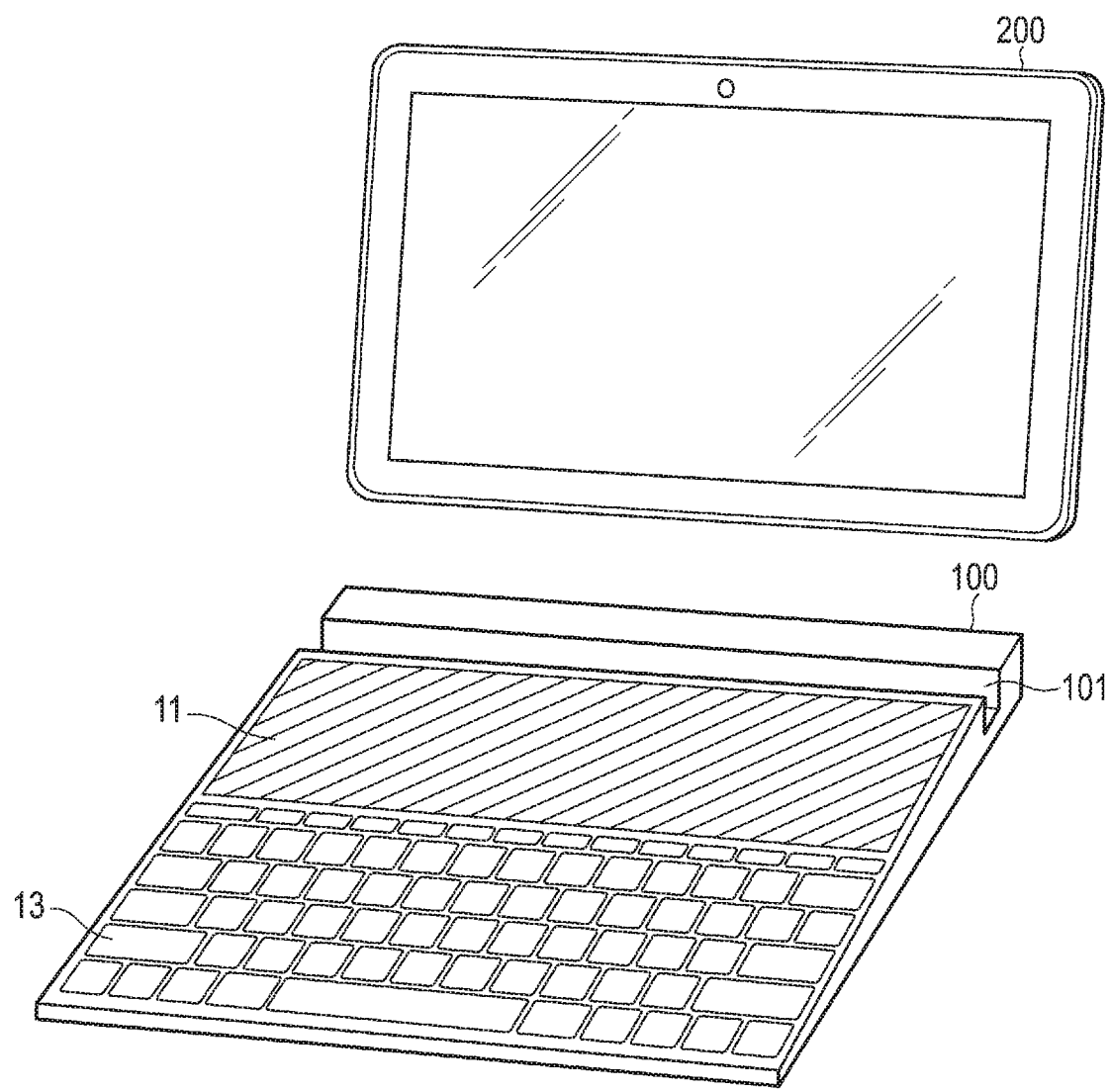
F I G. 14

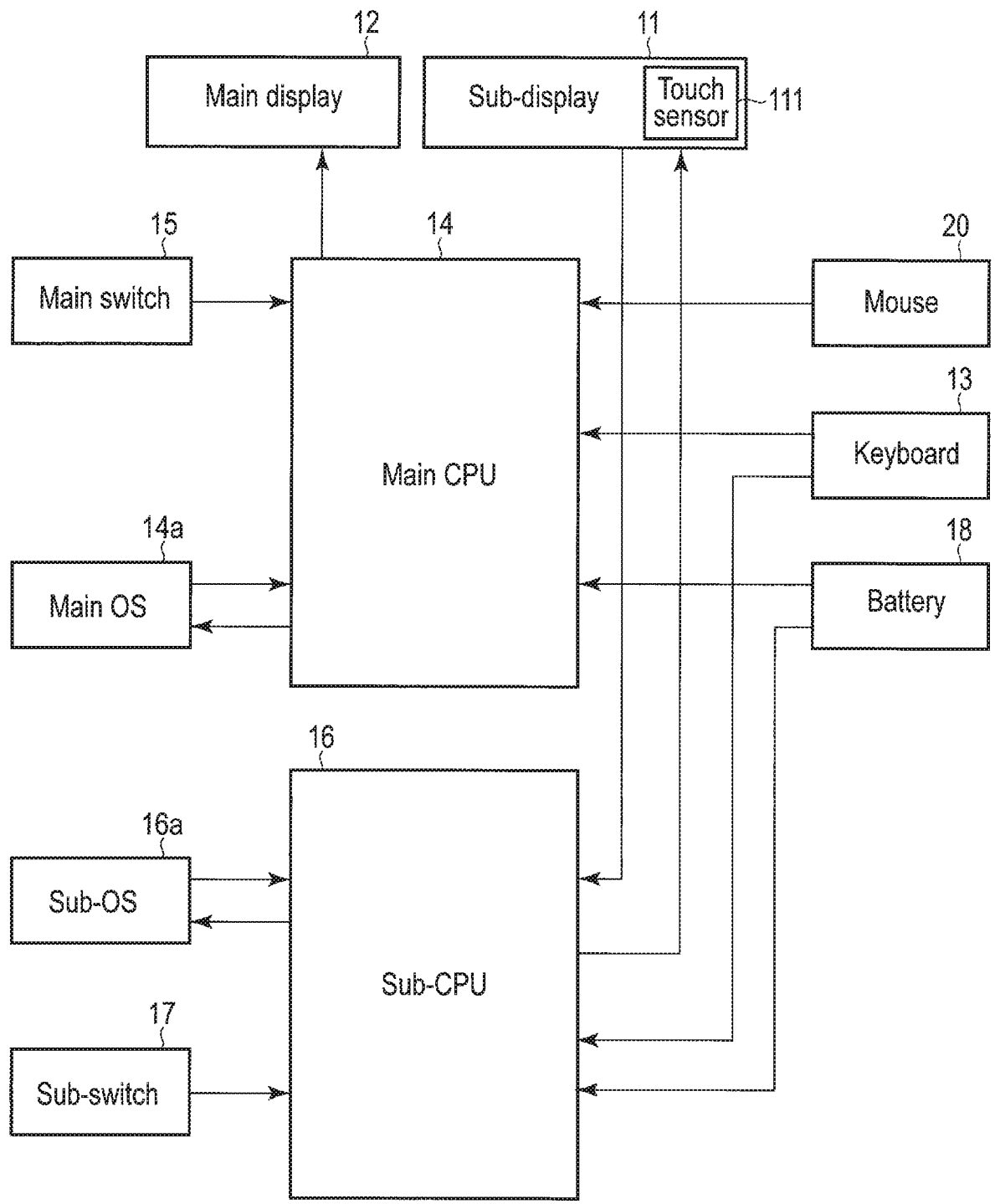
F I G. 16

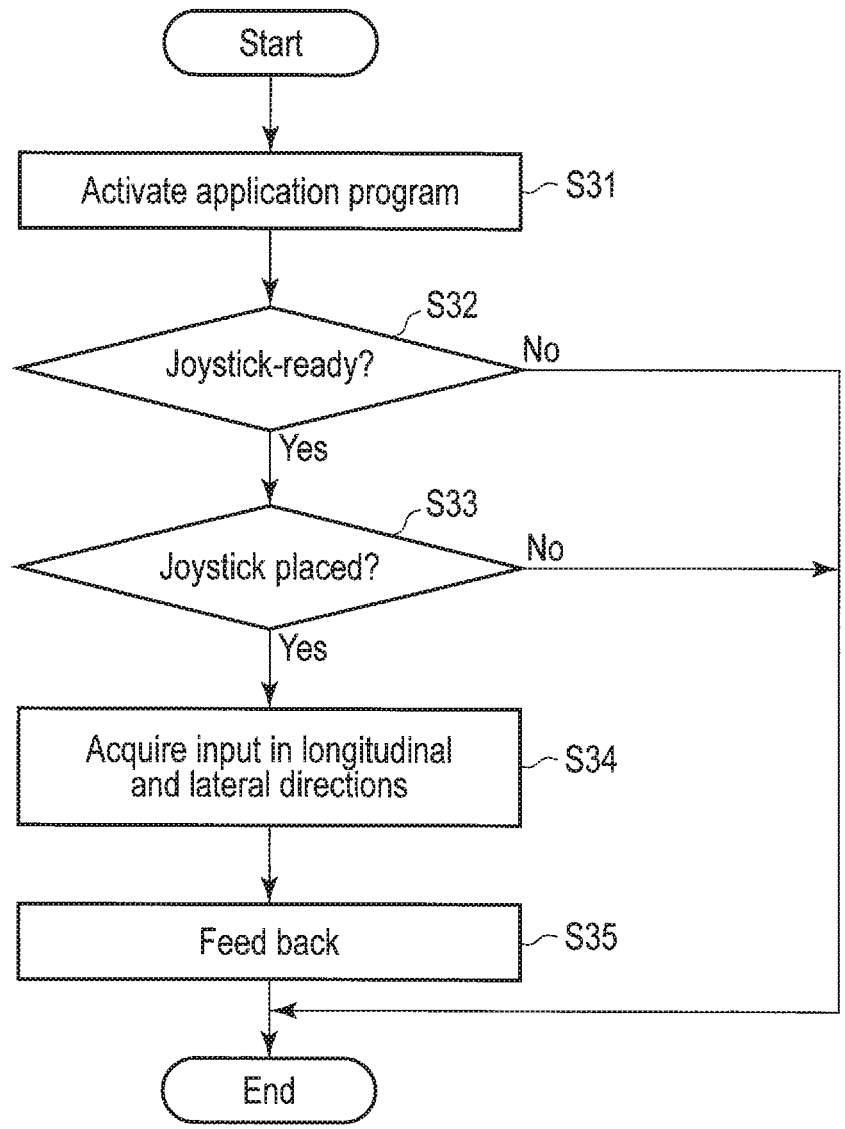
F I G. 24

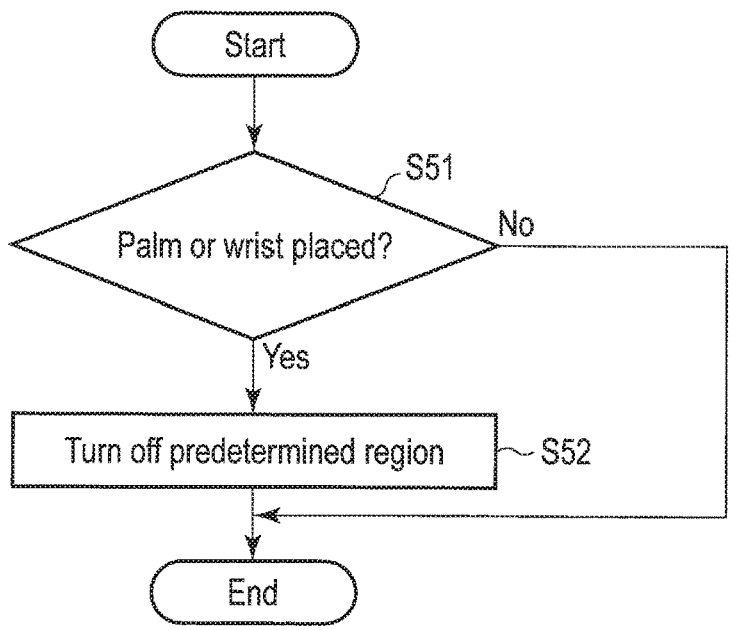
F I G. 27
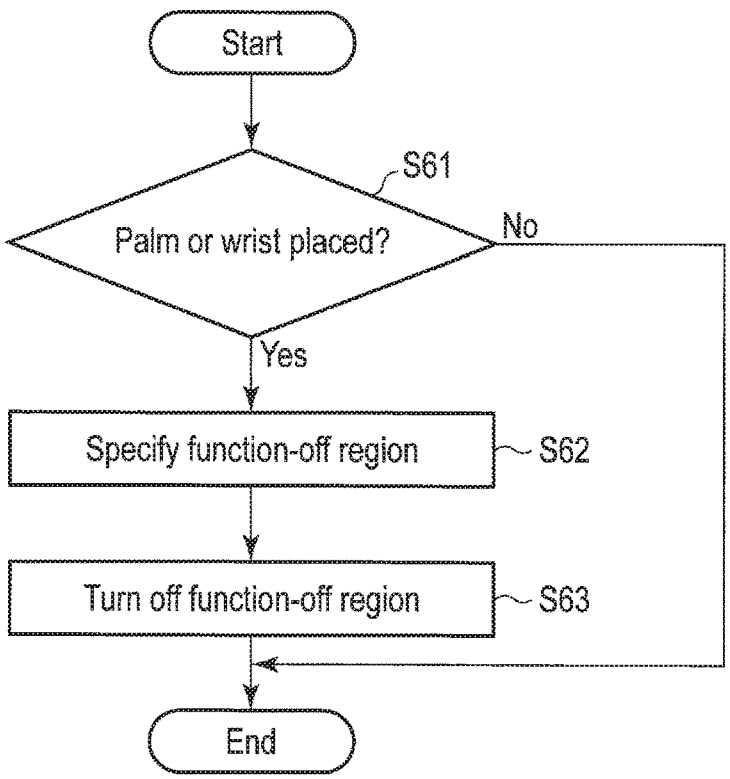
F I G. 28

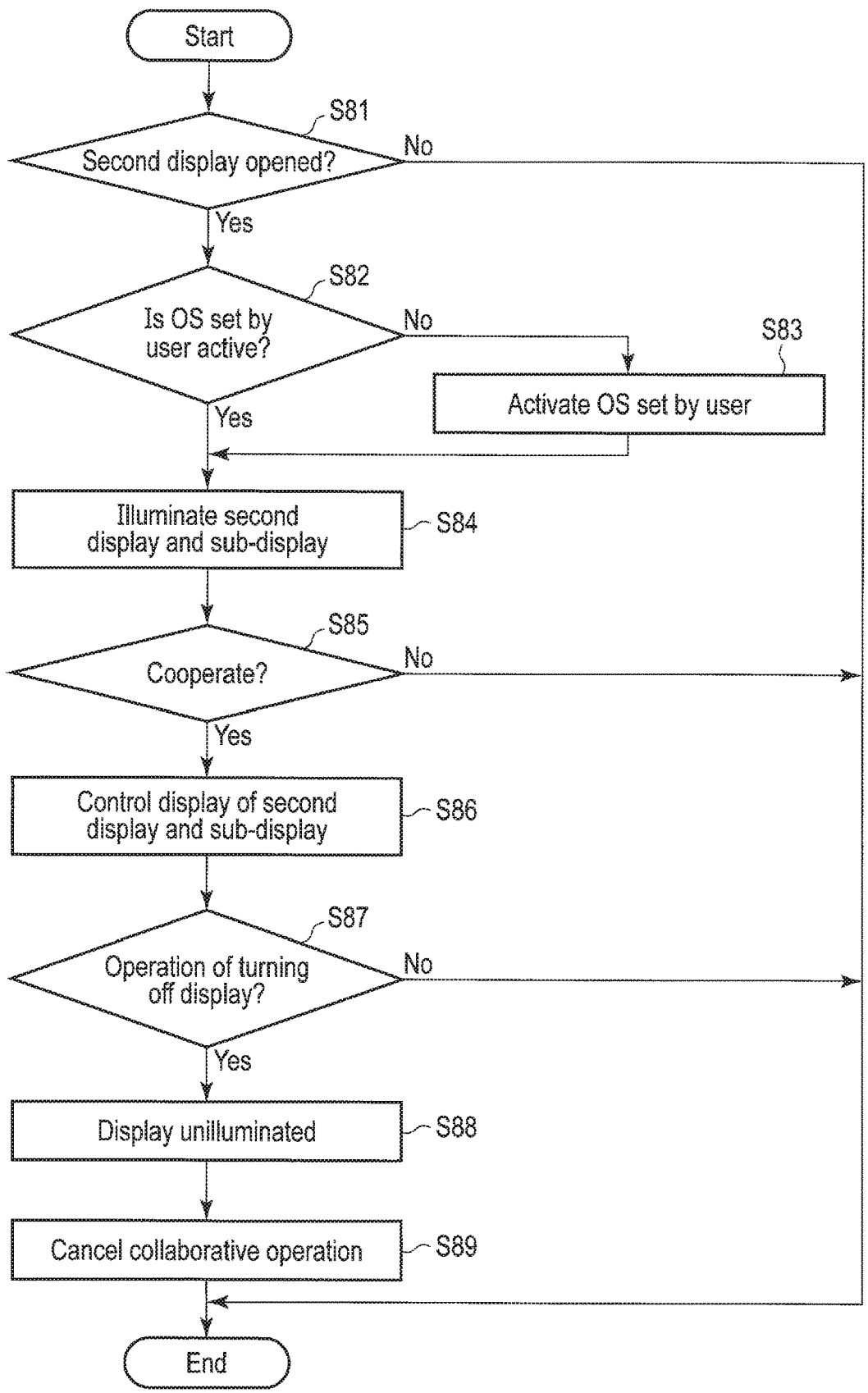
F I G. 37

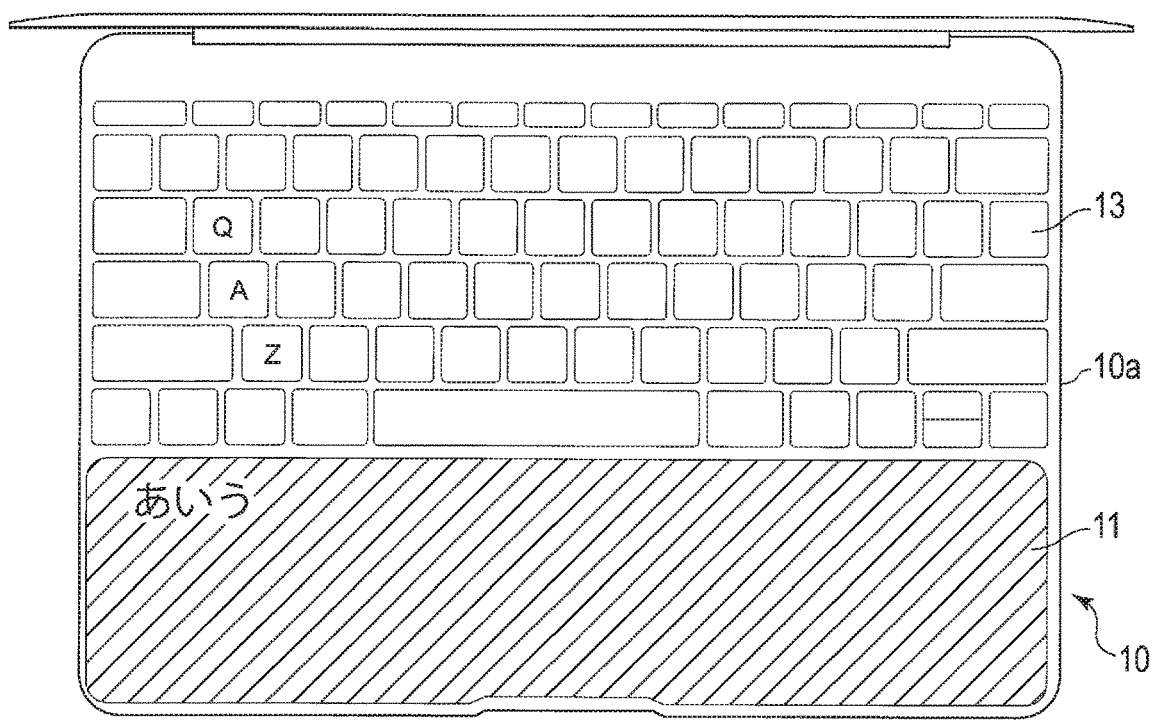
F I G. 42
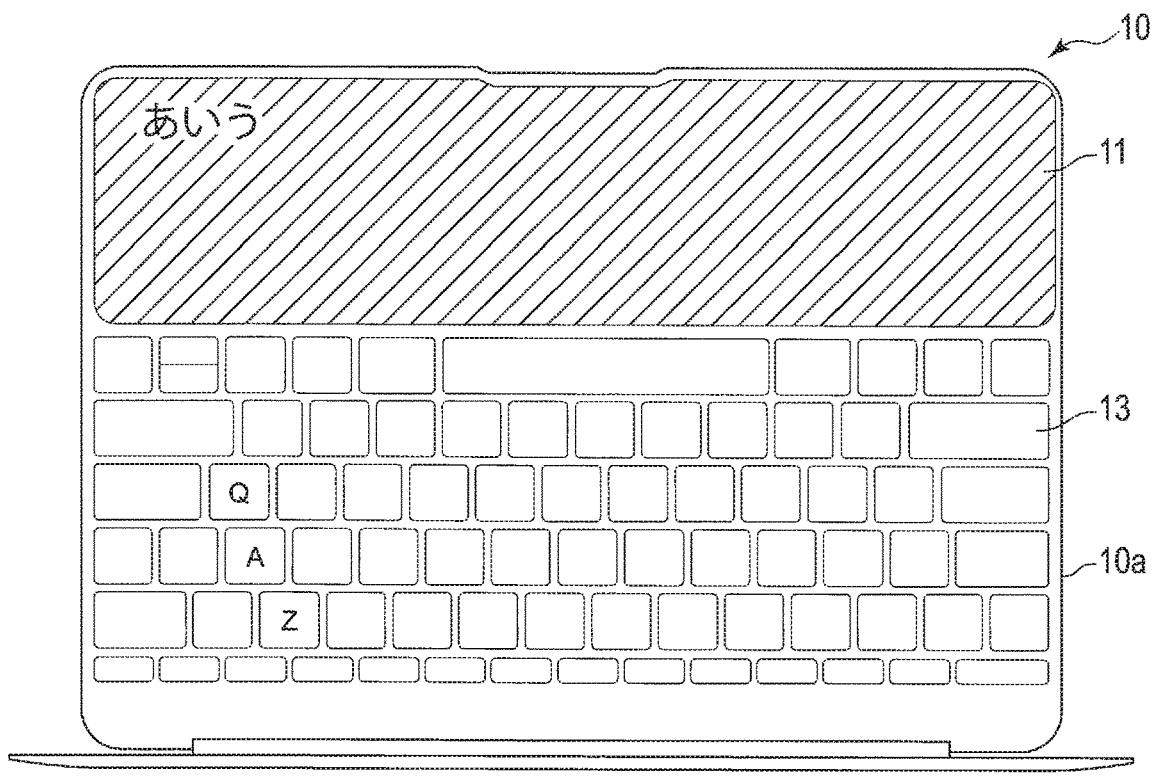
F I G. 43

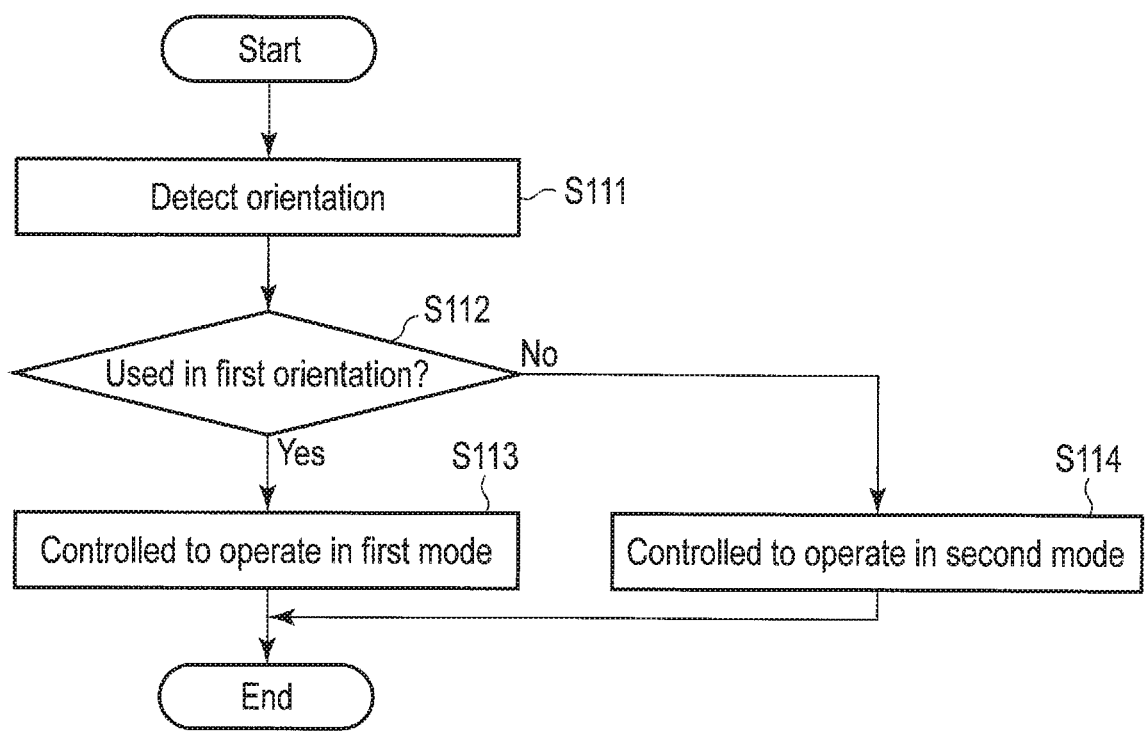
F I G. 44

INFORMATION PROCESSING DEVICE

CROSS-REFERENCE TO RELATED APPLICATIONS

This application is based upon and claims the benefit of priority from Japanese Patent Applications No. 2018-025146, filed Feb. 15, 2018; and No. 2018-091507, filed May 10, 2018, the entire contents of all of which are incorporated herein by reference.

FIELD

Embodiments described herein relate generally to an information processing device.

BACKGROUND

In general, a display is connected to a main body of an information processing device such as a notebook personal computer, and a keyboard and a touch pad are arranged on an upper surface of the main body.

According to such an information processing device, characters and the like input with the keyboard can be displayed on the display or a pointer (cursor) displayed on the display can be operated with the touch pad.

Incidentally, the touch pad is arranged on a palm rest portion located on a front side of the keyboard, and utilizing the palm rest portion more effectively has been reviewed.

SUMMARY

The present application relates generally to an information processing device.

According to one embodiment, an information processing device includes a keyboard arranged on an upper surface of a body, a main display connected to the body, and a sub-display arranged on a palm rest portion located on a front side of the keyboard.

BRIEF DESCRIPTION OF THE DRAWINGS

FIG. 6 is a block diagram showing an example of a system configuration of the information processing device.

FIG. 7 is a block diagram for explanation of a case where the information processing device operates in a main display mode.

FIG. 12 is a view showing an example of the information processing device with the sub-display provided on a part of the palm rest portion.

FIG. 13 is a view showing an example of the information processing device with the sub-display unit configured to be detachable from the body.

FIG. 14 is a view showing an example of an appearance of the information processing device implemented as an input device.

FIG. 16 is a block diagram showing an example of a system configuration of the information processing device according to the third embodiment.

FIG. 24 is a flowchart showing an example of a procedure of the information processing device according to the seventh embodiment.

FIG. 27 is a flowchart showing an example of a procedure of the information processing device according to the ninth embodiment.

FIG. 28 is a flowchart showing an example of a procedure of the information processing device in a case where a region in which the function of the sub-display is turned off is dynamically changed.

FIG. 37 is a flowchart showing an example of a procedure of the information processing device.

FIG. 42 is a view showing use of the information processing device according to the thirteenth embodiment in a first mode.

FIG. 43 is a view showing use of the information processing device according to the present embodiment in a second mode.

FIG. 44 is a flowchart showing an example of a procedure of the information processing device.

DETAILED DESCRIPTION

In general, according to one embodiment, an information processing device includes a keyboard arranged on an upper surface of a body, a main display connected to the body, and a sub-display arranged on a palm rest portion located on a front side of the keyboard.

Embodiments will be described hereinafter with reference to the accompanying drawings.

First Embodiment

First, a summary of an information processing device according to the first embodiment will be explained with reference to FIG. 1. The information processing device according to the present embodiment can be implemented as, for example, a notebook-sized personal computer (hereinafter denoted as notebook PC) used by the user.

Figure 1A:
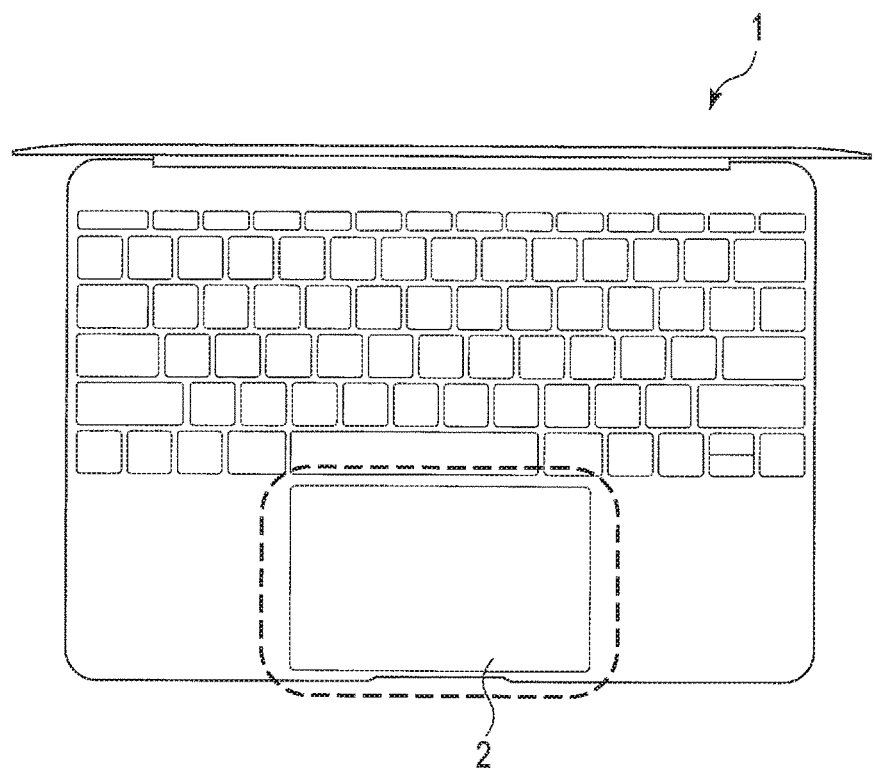
FIG. 1A is a view showing an information processing device with a touch pad arranged on a palm rest portion.

As shown in FIG. 1A, in a notebook PC 1, a touch pad (track pad) 2 is arranged on a palm rest portion located in front of a keyboard arranged on an upper surface of the notebook PC 1.

Figure 1B:
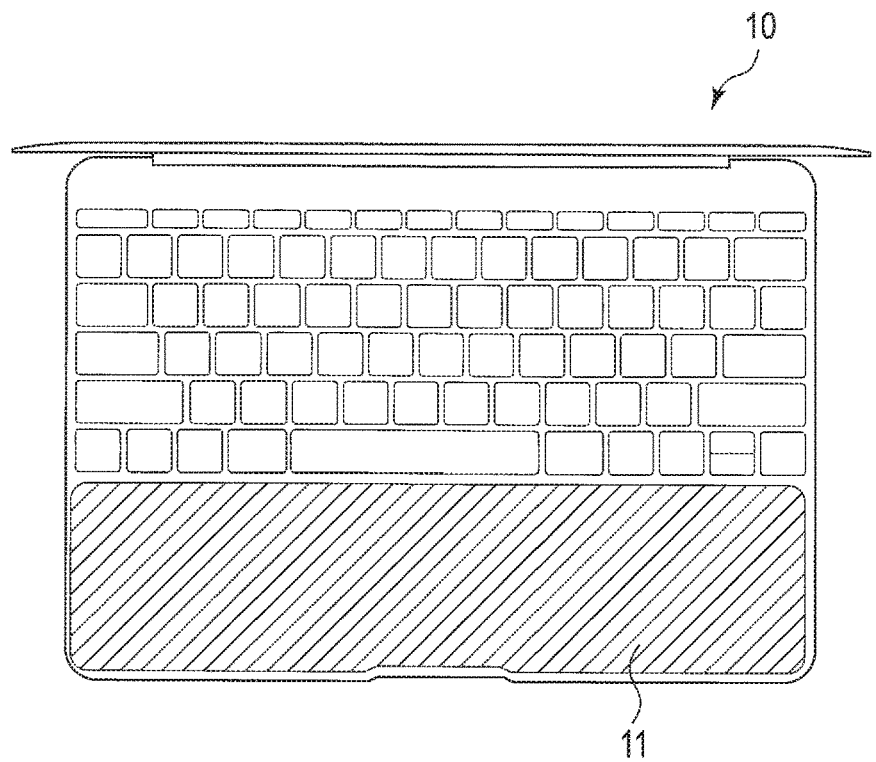
FIG. 1B is a view for explanation of a summary of the information processing device according to the embodiment.

In contrast, in an information processing device (notebook PC) 10 according to the present embodiment, a sub-display 11 is arranged at the palm rest portion as shown in FIG. 1B. The sub-display 11 is a touch panel display including a touch sensor (touch panel) capable of detecting a position of contact of an external proximate object such as a user's finger or palm or a pen (stylus) on the screen. The contact indicates not only a direct contact but a case where the object is close to a range which can be detected.

According to the configuration of the present embodiment, the palm rest portion can be utilized more effectively than the configuration of the general notebook PC 1 that the touch pad is arranged at the palm rest portion.

More specifically, since the display (hereinafter denoted as sub-display) 11 arranged at the palm rest portion is capable of detecting the user's contact position, the same function as the function of the touch pad can be implemented with the sub-display 11.

Furthermore, the sub-display 11 is provided and a multi-display can also be thereby implemented together with a main display to be explained later. According to the multi-display, for example, the display area on the information processing device 10 can be expanded by displaying different images on the sub-display 11 and the main display.

In this case, for example, shortcut keys, control keys, or the like defined by various types of software (application programs) operating on the information processing device 10 may be displayed on the sub-display 11.

Figure 2:
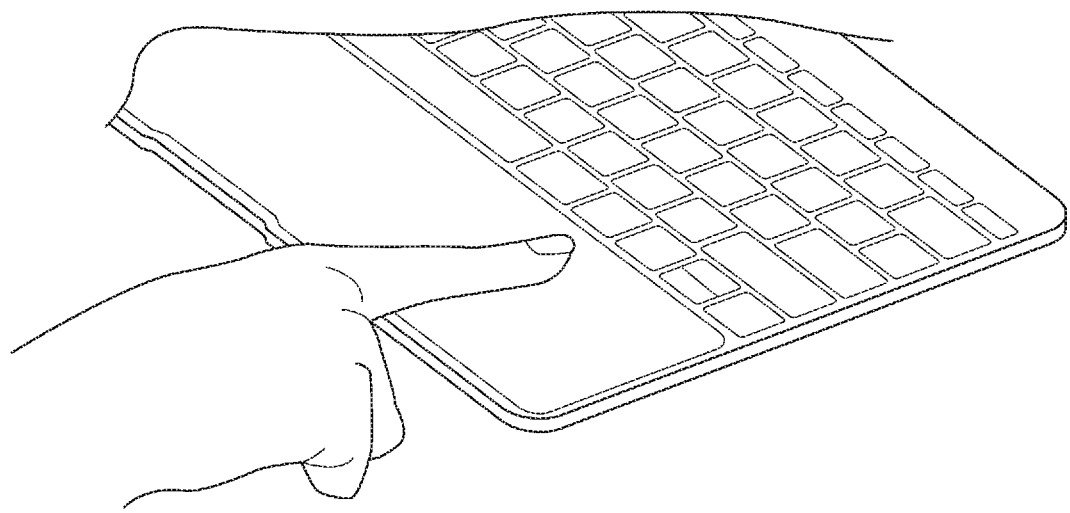
FIG. 2 is a view for explanation of a fingerprint authentication function.

Furthermore, the sub-display 11 may include, for example, a fingerprint sensor to implement a function (fingerprint authentication function) of authenticating a fingerprint of the user using the information processing device 10 as shown in FIG. 2.

Figure 3:
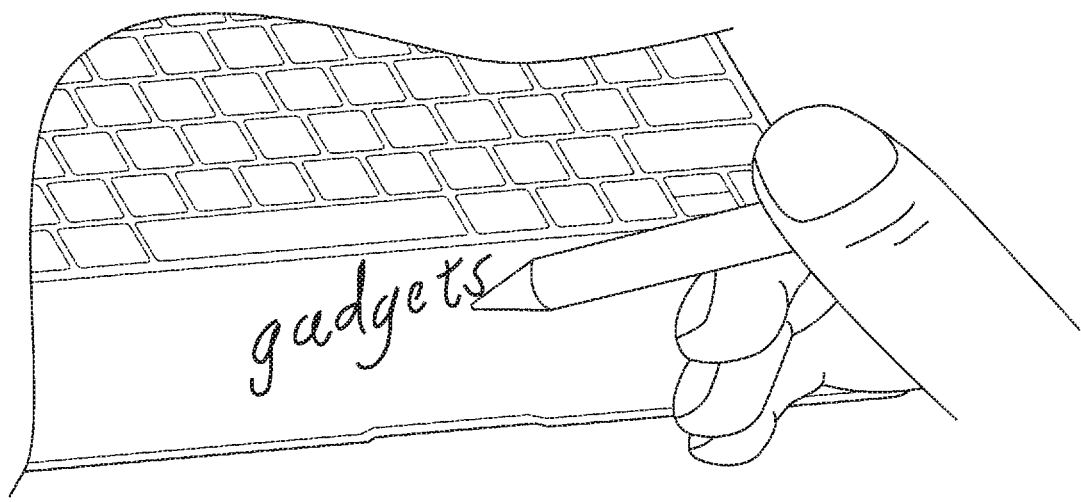
FIG. 3 is a view for explanation of a handwriting input function.

In addition, as shown in FIG. 3, a locus of movement of the user's finger or stylus on the sub-display 11 is detected with the touch sensor, and input (hereinafter denoted as handwriting input) of a character, figure, or the like handwritten by the user can be thereby accepted (handwriting input function). Such handwriting input can be used for, for example, signature on a PDF file or the like.

Figure 4:
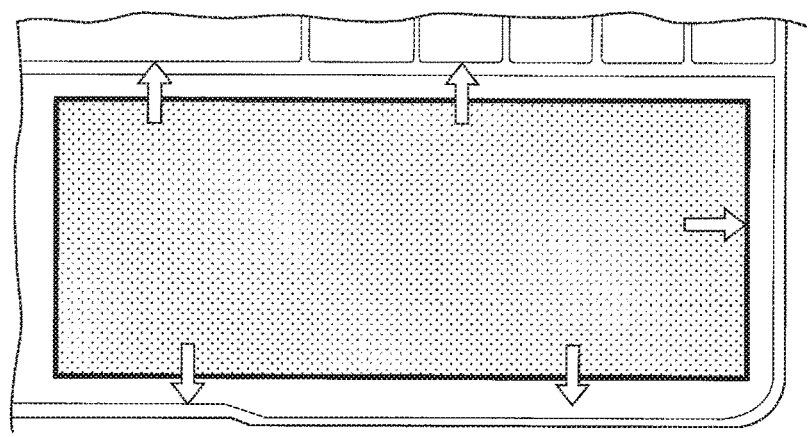
FIG. 4 is a view for explanation of a range adjustment function.

Furthermore, as shown in FIG. 4, when the sub-display 11 is arranged at the whole body of the palm rest portion, a range (size) of the display region, handwriting input region or the like on the sub-display 11 can be adjusted arbitrarily (range adjustment function).

In the present embodiment, various functions explained above can be implemented and provided to the user by arranging the sub-display (touch panel display) 11 at the palm rest portion.

Figure 5:
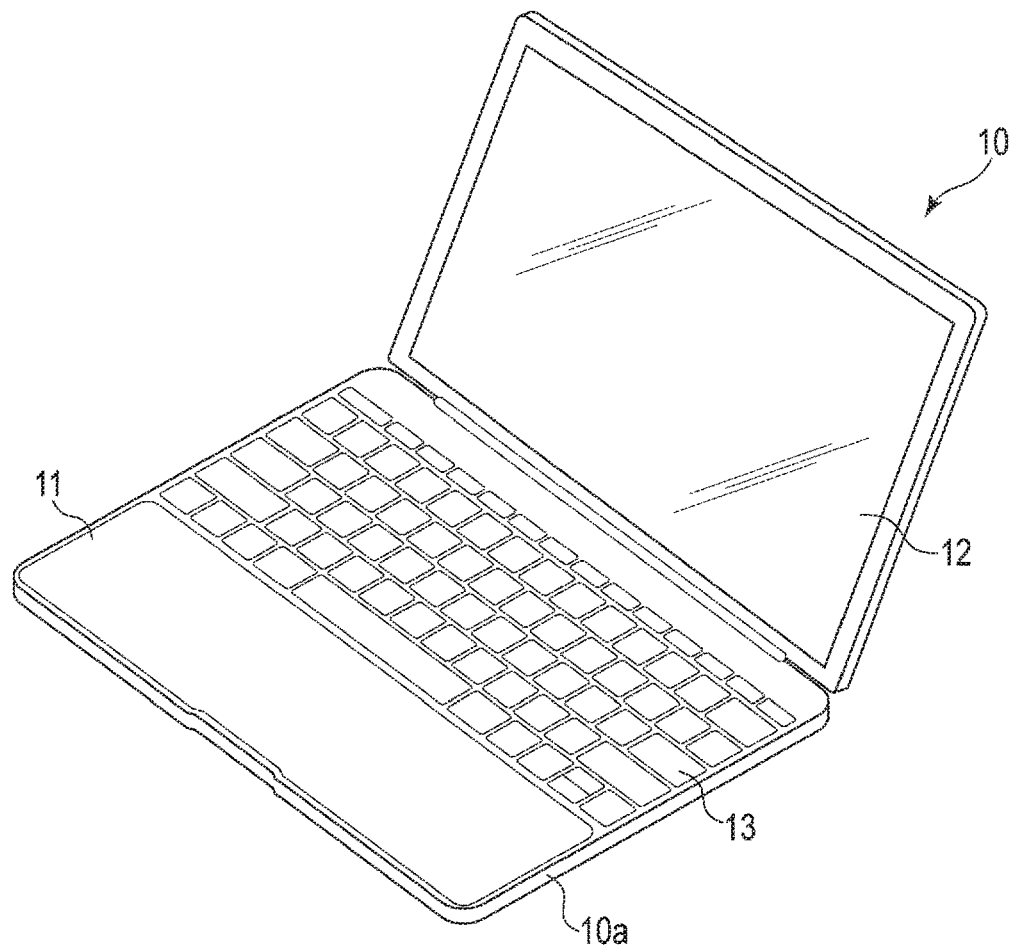
FIG. 5 is a perspective view showing an example of an appearance of the information processing device.

FIG. 5 is a perspective view showing an appearance of the information processing device (notebook PC) 10 according to the present embodiment. The information processing device 10 shown in FIG. 5 includes an information processing device body (hereinafter simply denoted as body) 10a including, for example, a thin box-shaped housing.

As shown in FIG. 5, a main display 12 is connected to the body 10a. More specifically, the main display 12 is connected to the body 10a so as to be capable of pivoting between a position where an upper surface of the body 10a is exposed and a position where the upper surface of the body 10a is covered with the main display 12.

The main display 12 is, for example, a liquid crystal display device (LCD) but may be the other display device such as an organic electroluminescent display device (EL) or a micro-LED (μLED) display device. In addition, the main display 12 may be a display (touch panel display) including a touch sensor similarly to the sub-display 11.

In contrast, a keyboard 13 is arranged on the upper surface of the body 10a, and the above-explained sub-display 11 is arranged at the palm rest portion located on the front side of the keyboard 13 as viewed from the user using the information processing device 10. The palm rest portion is a portion (area) where the user's palm or wrist is placed when the keyboard 13 is used.

FIG. 6 shows an example of a system configuration of the information processing device 10. As shown in FIG. 6, the information processing device 10 includes a main CPU (main processing unit) 14, a main switch 15, a sub-CPU (sub-processing unit) 16, a sub-switch 17, a battery 18, and the like in addition to the sub-display 11, the main display 12, and the keyboard 13 explained above.

A touch sensor 111 is assumed to be built in the sub-display 11 as explained above. In addition, illustration of, for example, memory devices such as a main memory and a nonvolatile memory, various types of other substrates, and the like is omitted in FIG. 6.

The main CPU 14 is a processor configured to control operations of the respective components in the information processing device 10. The main CPU 14 executes, for example, software such as an operating system (hereinafter denoted as main OS) 14a and various application programs loaded from the nonvolatile memory to the main memory.

The main switch 15 is a switch for operating the information processing device 10 in a main display mode to be explained later.

The sub-CPU 16 is a processor configured to mainly control the operation of the sub-display 11. The sub-CPU 16 executes, for example, software such as an operating system (hereinafter denoted as sub-OS) 16a and various application programs loaded from the nonvolatile memory to the main memory.

The sub-switch 17 is a switch for operating the information processing device 10 in a sub-display mode to be explained later.

Figure 8:
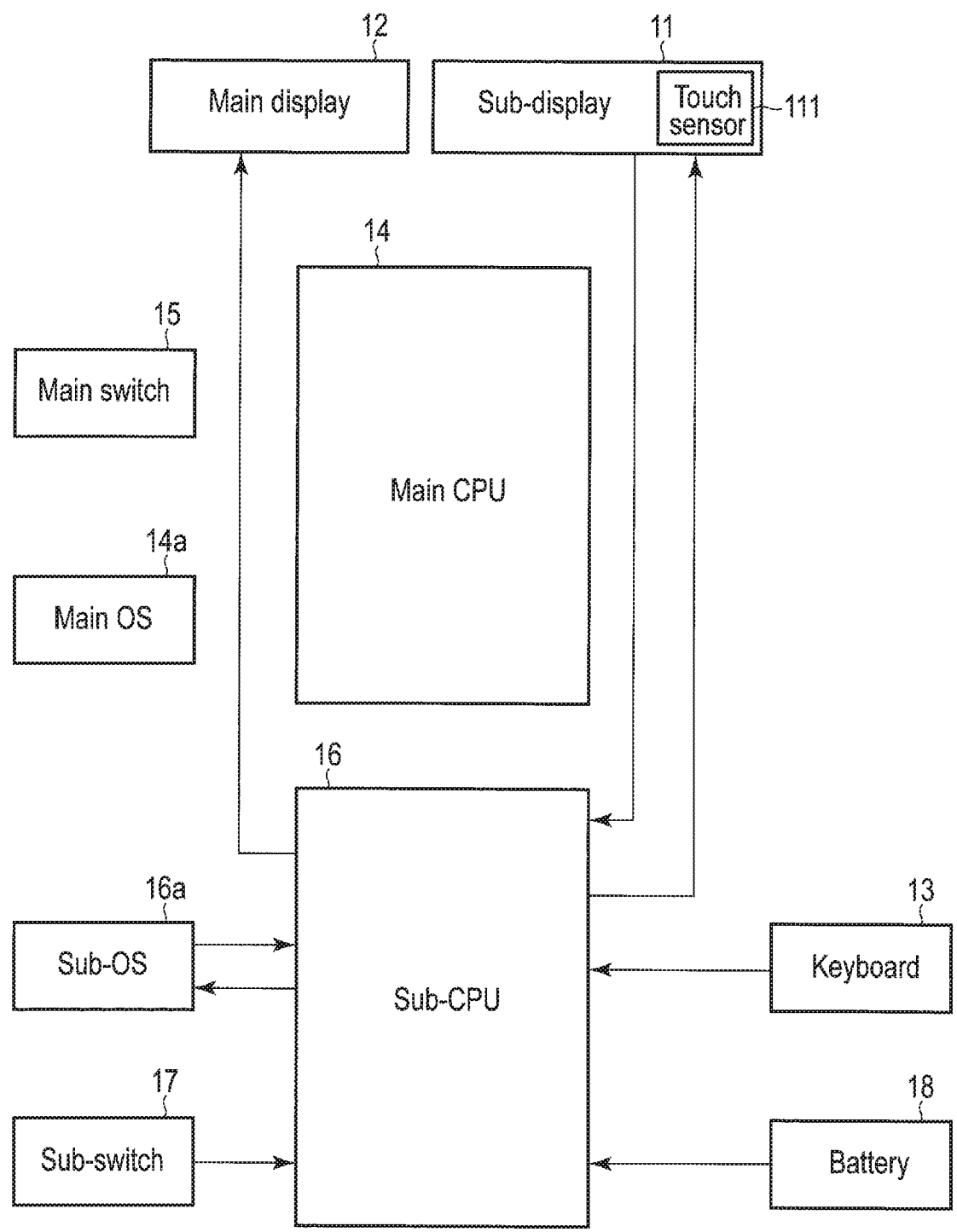
FIG. 8 is a block diagram for explanation of a case where the information processing device operates in a sub-display mode.

The battery 18 is a storage battery which stores power to operate the information processing device 10. The information processing device 10 can operate with the power stored in the battery 18 (i.e., power supplied from the battery 18). The information processing device 10 can also operate with, for example, power supplied from an external power supply unit such as an AC adapter. In FIG. 6 to FIG. 8, the power is supplied from the battery 18 to the main CPU 14 and the sub-display 16, but the power may be supplied from the battery 18 to the main display 12, the sub-display 11, the keyboard 13, and the other blocks.

In the present embodiment, the main OS 14a and the sub-OS 16a are assumed to be different operating systems. More specifically, Windows (registered trademark) can be used as the main OS 14a and Android (registered trademark) can be used as the sub-OS 16a. The main OS 14a and the sub-OS 16a are mere examples, and the sub-OS 16a is assumed to be OS having smaller capacity (i.e., smaller weight or smaller processing load) than the main OS 14a.

In addition, the memory device and the like used by the main CPU 14 and the sub-CPU 16 may be provided in each of the main CPU 14 and the sub-CPU 16 or may be provided commonly to the main CPU 14 and the sub-CPU 16.

The operation of the information processing device 10 of the present embodiment will be explained below. In the present embodiment, the information processing device 10 can operate in the main display mode and the sub-display mode explained above.

First, operation of the information processing device 10 in the main display mode will be explained with reference to FIG. 7.

When the information processing device 10 is operated in the main display mode, the user sets the main switch 15 to be the ON state. In this case, the main CPU 14 operates with the power supplied from the battery 18, and the main CPU 14 activates the main OS 14a.

The main CPU 14 can thereby execute various types of the application programs and the like on the main OS 14a, and can display an image based on the application program on the main display 12 by controlling the main display 12.

In addition, input by the user using the keyboard 13 is reflected on an image displayed on the main display 12.

Furthermore, the main CPU 14 can implement the same function as the touch pad by controlling the sub-display (touch panel display) 11. In this case, the user can operate a pointer on the image displayed on the main display 12 by, for example, sliding a finger on the sub-display 11. The main CPU 14 can also display the main display 12 alone in a state in which the function of the sub-display (touch panel display) 11 is stopped.

According to this, the user can use the information processing device 10 similarly to a general notebook PC by operating the information processing device 10 in the main display mode.

The sub-display 11 may operate to implement the functions other than the touch pad in accordance with the instruction of the main CPU 14 (main OS 14a).

More specifically, for example, the sub-display 11 may also operate as the multi-display together with the main display 12 as explained above.

In addition, if the sub-display 11 includes a fingerprint sensor, the sub-display 11 may operate such that the user authentication processing using the fingerprint authentication function is executed when, for example, the main OS 14a is activated or a specific application program is executed.

In addition, if, for example, a document preparation application program or the like is executed by the main CPU 14, the sub-display 11 may operate to accept the handwriting input.

Various functions that can be implemented by the above-explained sub-display 11 may be changed under an instruction of the user using the information processing device 10 or may be automatically changed in accordance with the type of the application program executed by the main CPU 14, and the like.

Next, the operation of the information processing device 10 in the sub-display mode will be explained with reference to FIG. 8.

If the information processing device 10 is operated in the sub-display mode, the user sets the sub-switch 17 to be the ON state. In this case, the sub-CPU 16 operates with the power supplied from the battery 18, and the sub-CPU 16 activates the sub-OS 16a.

The sub-CPU 16 can thereby execute various types of the application programs and the like on the sub-OS 16a, and can display an image based on the application program on the sub-display 11 by controlling the sub-display 11. The sub-CPU 16 may control both the main display 12 and the sub-display 11, control the main display 12 alone, or control sub-display 11 alone.

If the information processing device 10 operates in the sub-display mode, for example, an application program implementing a function of taking notes (memos) or the like (hereinafter denoted by a note function) is assumed to be executed by the sub-CPU 16.

Figure 9A:
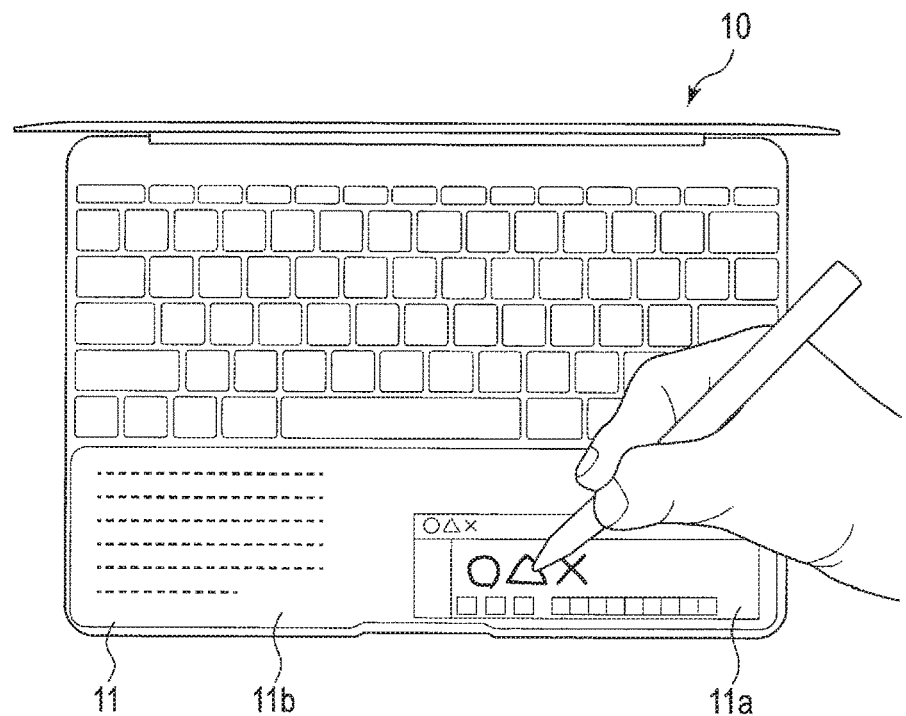
FIG. 9A is a view showing an example of an image displayed on a sub-display in a case where the information processing device operates in the sub-display mode.

FIG. 9A shows an example of an image (hereinafter denoted a note image) displayed on the sub-display 11 in a case where the application program implementing the note function is executed. As shown in FIG. 9A, a handwriting input region 11a and a note display region 11b are set on the note image displayed on the sub-display 11.

The user can execute handwriting input of a content to be noted (i.e., a character string) to the handwriting input region 11a. The character string input by handwriting to the handwriting input region 11a is assumed to be converted into a text by, for example, character recognition processing. The user's note converted into the text is displayed in the note display region 11b. In this case, a pen tip is detected by the touch sensor 111, the position of detection is displayed, and the handwriting input is thereby executed.

As explained above, if the information processing device 10 operates in the sub-display mode, the user can take notes via, for example, the sub-display 11.

It is assumed that the note displayed in the note display region 11b can be stored in a nonvolatile memory or the like incorporated in the information processing device 10. Such a note may be displayed on the main display 12 when the information processing device 10 operates in the main display mode as explained later or may be used in processing in various application programs executed by the main CPU 14.

In addition, it has been explained in FIG. 9A that the content input by handwriting is converted into the text, but the handwritten character string (note) may be stored as its original image or the like. In addition, the handwriting input using the stylus is shown in FIG. 9A, but the handwriting input may be executed with a user's finger.

Figure 9B:
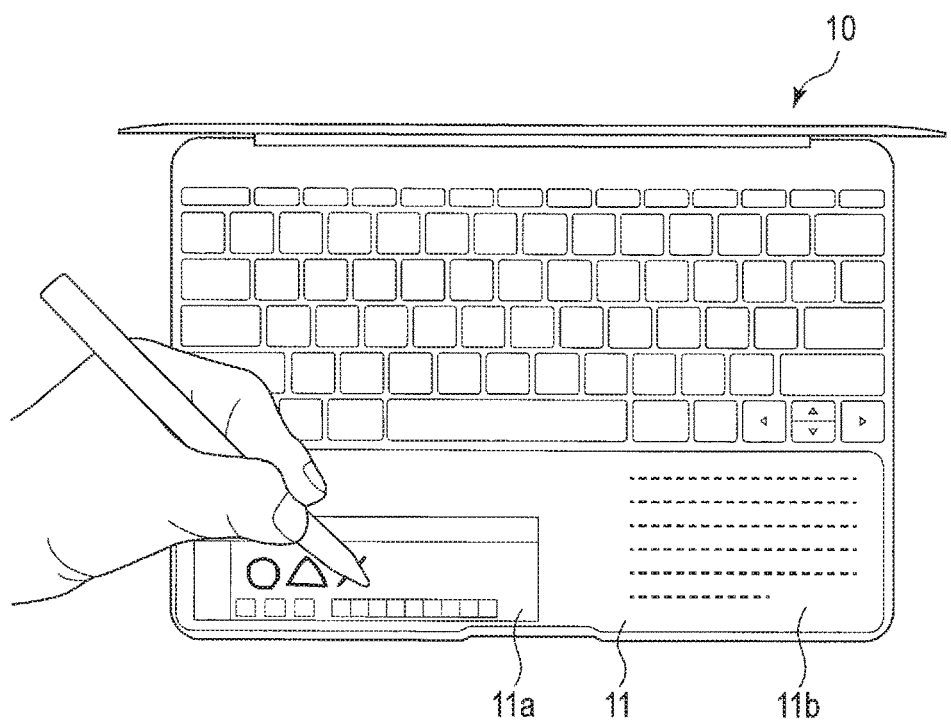
FIG. 9B is a view showing another example of an image displayed on the sub-display in a case where the information processing device operates in the sub-display mode.

The user is assumed to be right-handed in FIG. 9A but, for example, if the user is left-handed, the handwriting input region 11a may be provided on the left side and the note display region 11b may be provided on the right side as shown in FIG. 9B. For example, the display on the image shown in FIG. 9A and FIG. 9B may be changed by setting the user to be right-handed or left-handed. Alternatively, whether the user is right-handed or left-handed may be determined by detecting the position and shape of the user's palm with the touch sensor 111 provided on the sub-display 11.

Even if the information processing device 10 operates in the sub-display mode, the keyboard 13 may be usable by supplying the power from the battery 18 to the keyboard 13. In this case, the user can take notes by operating the keyboard 13.

Figure 10:
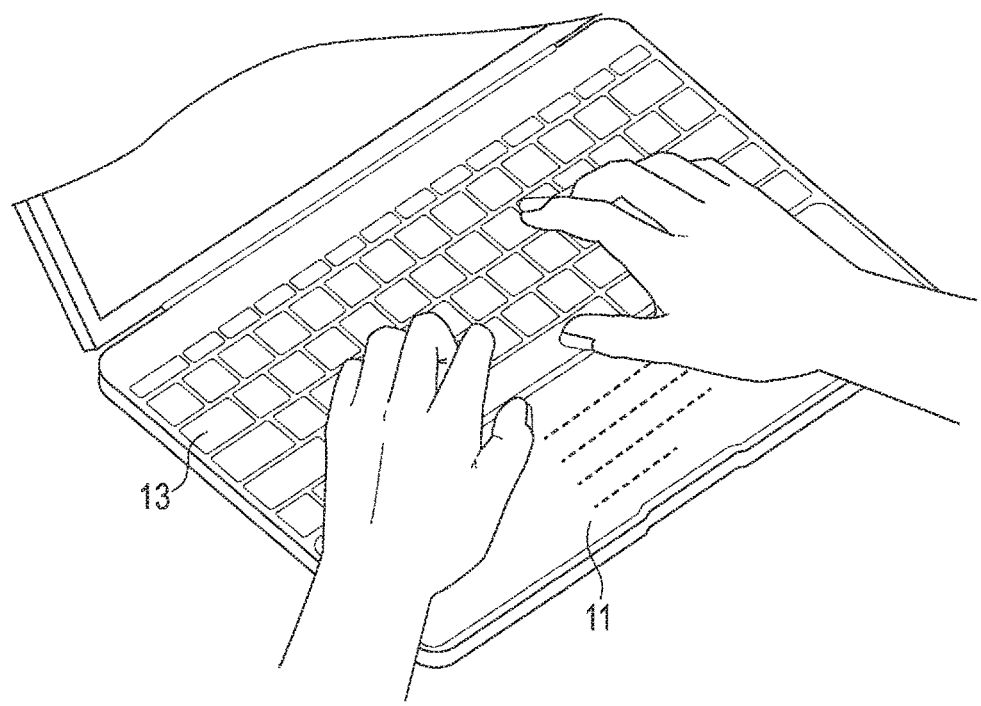
FIG. 10 is a view showing an example of an image displayed on the sub-display when taking notes with the keyboard.

Since the sub-display 11 is arranged on the palm rest portion as explained above, a region of the sub-display 11 is partially covered with the palm or wrist while the keyboard 13 is used. For this reason, for example, if the user takes notes with the keyboard 13 when the information processing device 10 operates in the sub-display mode, notes (character strings) may be displayed on a region which is not covered with the user's palm or wrist as shown in FIG. 10. The region which is not covered with the user's palm or wrist is a region where a touch is not detected by the touch sensor 111 provided on the sub-display 11.

In addition, the state in which the keyboard 13 is used (i.e., a part of the region of the sub-display 11 is covered with the user's palm or wrist) and the state in which the operation such as handwriting input is executed on the sub-display 11 with the user's finger or stylus can be determined in accordance with the size of the area of contact on the sub-display 11. The sub-display 11 can include a palm rejection function of allowing the operation made by the only contact of the user's finger or stylus to be accepted by determining the contact of the palm.

According to this, for example, if it is determined that the state in which the keyboard 13 is used is canceled, based on the area of contact on the sub-display 11, the display of the sub-display 11 for keyboard input shown in FIG. 10 may be changed to that for handwriting input shown in FIG. 9 by assuming that the keyboard 13 is not used. Similarly, if the state in which the keyboard 13 is used is determined, the display of the sub-display 11 for handwriting input may be changed to that for keyboard input.

Such change of the sub-display 11 can also be applied to a case where the sub-display 11 is controlled by the main CPU 14.

When the information processing device 10 operates in the sub-display mode as explained above, the user can take notes by using the note function without operating the main CPU 14 (i.e., main OS 14a) of the information processing device 10.

The main display 12 can also be set to be usable in the operation in the sub-display mode by supplying the power to the main display 12 when the sub-switch 17 is set in the on state.

Incidentally, since the user needs to take notes quickly as needed, the above-explained note function is desirably capable of being used quickly.

For this reason, the sub-switch 17 is mainly set in the on state and, when the information processing device 10 is not used or the information processing device 10 operates in the main display mode, the sub-CPU 16 is set to be in a sleep state. According to this, for example, if the user needs to take notes, the sub-CPU 16 can be promptly activated and the user cab immediately use the note function by a simple operation such as pressing the sub-switch 17 or touching the sub-display 11.

In this case, the fingerprint authentication processing (user authentication processing) using the fingerprint sensor provided in the sub-display 11 may be executed from the viewpoint of security.

It has been explained that the application program which implements the note function is executed in the sub-display mode in the above explanations, but the other application program may be executed. For example, the application program which can be executed on the sub-OS 16a is assumed to be downloaded (installed) from its own market and used. Downloading such an application program may be executed when, for example, the information processing device 10 operates in the main display mode.

As explained above, in the present embodiment, for example, the palm rest portion of the information processing device 10 such as the notebook PC can be effectively used in the configuration that the keyboard 13 is arranged on the upper surface of the body 10a equipped with the main display (first display) 12 and that the sub-display (second display) 11 is arranged on the palm rest portion located on the front side of the keyboard 13.

The sub-display 11 includes the touch sensor 111 capable of detecting the position of the user's contact (i.e., the position of contact of the finger or stylus) on the image displayed on the sub-display 11. As the touch sensor 111, for example, a mutual capacitance detection type or self-capacitance detection type touch sensor using electrostatic capacitance, or an optical touch sensor, a resistive film touch sensor or the like can be used. According to this, the user can use various functions implemented by the sub-display 11 arranged on the palm rest portion.

More specifically, the sub-display 11 may be used as the touch pad as explained above or used as a part of the multi-display. In addition, if the fingerprint sensor is built in the sub-display 11, the fingerprint authentication may be executed. Furthermore, the sub-display 11 may be used to accept the user's handwriting input.

In the present embodiment, for example, these functions can be implemented by arranging the sub-display 11 on the palm rest portion but, the sub-display 11 may be configured to implement at least one of these function or may be configured to implement, for example, a function other than these functions. In addition, the sub-display 11 can also be configured such that a part of the region of the sub-display 11 is used as the touch pad and the other region is used as the display area.

In addition, in the present embodiment, if the main switch 15 (first switch) is set in the on state (i.e., if the information processing device 10 operates in the main display mode), the main OS 14*a* is activated and the sub-display 11 and the main display 12 are controlled. If the sub-switch 17 is set in the on state (i.e., if the information processing device 10 operates in the sub-display mode), the sub-OS 16*a* is activated and the sub-display 11 is controlled.

According to this configuration, if the information processing device 10 operates in the main display mode, the user can use the information processing device 10 (the main display 12, the keyboard 13, and the like) as a general notebook PC while using various functions implemented by the sub-display 11.

If the information processing device 10 operates in the sub-display mode, the user can use, for example, a function such as taking notes with the sub-display 11 alone. Since the sub-OS 16*a* which is more lightweight than the main OS 14*a* is activated in the sub-display mode, the information processing device 10 can be used at low power consumption in the sub-display mode as compared with the main display mode. In addition, the power consumption can also be reduced in the sub-display mode by using the sub-CPU 16 consuming lower power than the power of the main CPU 14.

Moreover, the sub-OS 16*a* can be activated at a high speed when the sub-switch 17 is pressed, by maintaining the sub-CPU 16 in the sleep state. According to this, the user can take notes immediately as needed with high convenience.

It has been explained in the present embodiment that the main CPU 14 which operates in the main display mode and the sub-CPU 16 which operates in the sub-display mode are provided separately, but the main CPU 14 and the sub-CPU 16 may be configured integrally and the main OS 14*a* and the sub-OS 16*a* may be executed by one CPU.

In addition, in the present embodiment, since the sub-display 11 includes the fingerprint sensor as explained above, security in the information processing device 10 can also be reinforced.

Figure 11:
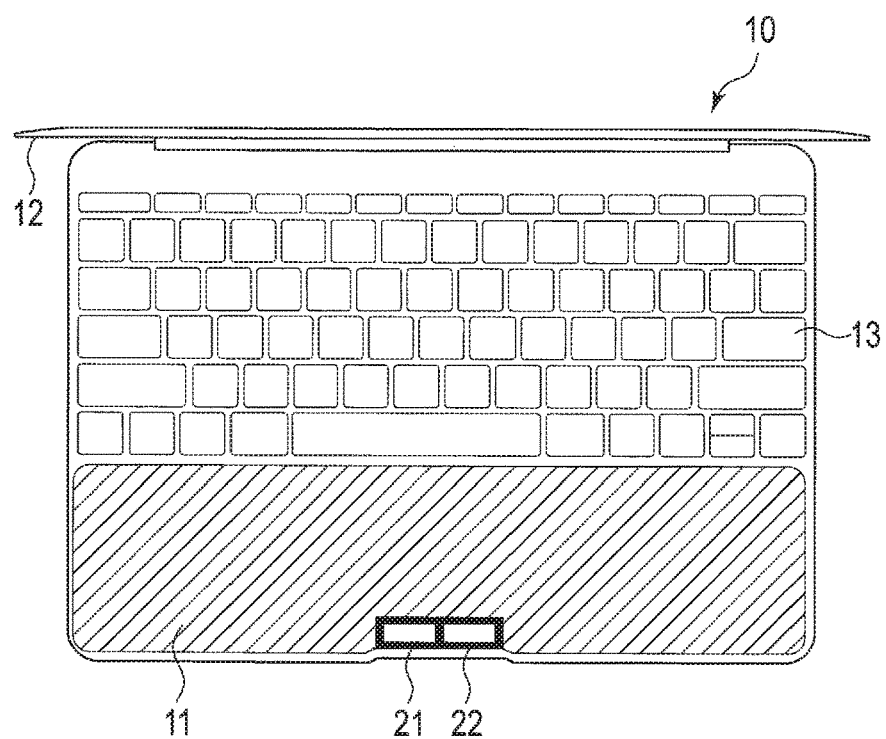
FIG. 11 is a view showing an example of the information processing device with buttons provided on the palm rest portion.

It has been explained in the present embodiment that the sub-display 11 is arranged on the palm rest portion but, as shown in FIG. 11, for example, buttons 21 and 22 corresponding to a left click and a right click of a mouse, other than the sub-display 11, may be provided on the palm rest portion.

In addition, the example that the sub-display 11 is arranged on the entire body of the palm rest portion has been explained in the present embodiment, but, for example, the sub-display 11 may be arranged on a part of the palm rest portion as shown in FIG. 12.

Furthermore, it has been explained in the present embodiment that, for example, the body 10*a*, the sub-display 11, the main display 12 and the like are configured as one body but, as shown in FIG. 13, a sub-display unit including the sub-display 11 may be configured to be detachable (separable) from the body 10*a*. The sub-display unit is assumed to be equipped with, for example, the sub-display 11, the sub-CPU 16, the sub-switch 17, and the like. According to this configuration, the sub-display 11 (sub-display unit) can be used in a state of being separated from the body 10*a*.

Although explanation of details is omit, if the body 10*a* and the sub-display unit are configured to be separable, for example, the memory device and the battery are provided on the body 10*a* side and the sub-display unit side, respectively, and the body 10*a* and the sub-display unit are configured to be operable interdependently of each other.

In addition, even if the body 10*a* and the sub-display unit are separated, the body 10*a* and the sub-display unit are often connected and used. In this case, for example, the body 10*a* and the sub-display unit may be connected in a wireless manner by wireless LAN, Bluetooth (registered trademark) and the like or may be connected in a wired manner using various types of cables and the like.

It has been explained that the information processing device according to the present embodiment is mainly the notebook PC but, for example, the information processing device may be implemented as an input device connected to the other terminal device and used.

FIG. 14 shows an example of an appearance of the information processing device implemented as an input device. As shown in FIG. 14, the keyboard 13 is arranged on the front side and the sub-display 11 is arranged on the back side, as seen from the user using the information processing device 100, on the upper surface of the information processing device 100.

In addition, a holding portion 101 in a groove shape formed from one end to the other end of the information processing device 100 in the lateral direction is provided on the further back side of the sub-display 11 of the information processing device 100. The information processing device 100 can hold, for example, a mobile terminal device 200 such as a tablet PC by the holding portion 101.

In addition, it is assumed that the information processing device 100 is configured to be connectable (communicable) in a wireless or wired manner to the mobile terminal device 200 held by the holding portion 101.

According to this, the user can use the information processing device 100 (keyboard 13) as, for example, a keyboard (input device) of the mobile terminal device 200.

The sub-display 11 can be used similarly to the sub-display 11 of the information processing device 10. More specifically, for example, if the mobile terminal device 200 is held by the holding portion 101 (i.e., the information processing device 100 is connected to the mobile terminal device 200), the sub-display 11 can operate similarly to the above-explained operation in the main display mode. In contrast, for example, if the mobile terminal device 200 is not held by the holding portion 101 (i.e., the information processing device 100 is not connected to the mobile terminal device 200), the sub-display 11 can operate similarly to the above-explained operation in the sub-display mode. In this case, the user can use the above-explained note function and the like on the information processing device 100 alone. In addition, the sub-display 11 may be configured to be detachable and to be communicable to the information processing device 100 in a wireless or wired manner.

In the example shown in FIG. 14, since the information processing device 100 is assumed to be used as the keyboard of the mobile terminal device 200, the keyboard 13 is arranged on the front side and the sub-display 11 is arranged on the back side. In this arrangement, however, the operability in using the sub-display 11 as the touch pad is considered low (i.e., use as the touch pad is considered difficult). In this case, the sub-display 11 may be used to use a function other than the touch pad, and a track point or the like may be provided on the keyboard 13 instead of the touch pad. In addition, to avoid an operation error of the keyboard 13 when touching the sub-display 11 (touch pad), input of the keyboard 13 may be temporarily invalidated if the contact of the finger or stylus on the sub-display 11 is detected by the touch sensor 111.

In the information processing device 100, too, the keyboard 13 may be arranged on the back side and the sub-display 11 may be arranged on the front side.

Second Embodiment

Next, a second embodiment will be explained. An appearance and the like of an information processing device according to the present embodiment are the same as those of the first embodiment, and will be arbitrarily explained with reference to FIG. 5 and the like. Detailed explanations of the same portions of the present embodiment as the first embodiment are omitted, and the portions of the present embodiment different from the first embodiment will be mainly explained.

It has been explained in the above-described first embodiment that, for example, the information processing device 10 is operated by setting the main switch 15 or the sub-switch 17 to be the on state, but the present embodiment is different from the above-described first embodiment with respect to a feature that the information processing device 10 can be operated even if the main switch 15 or the sub-switch 17 is not used.

Figure 15:
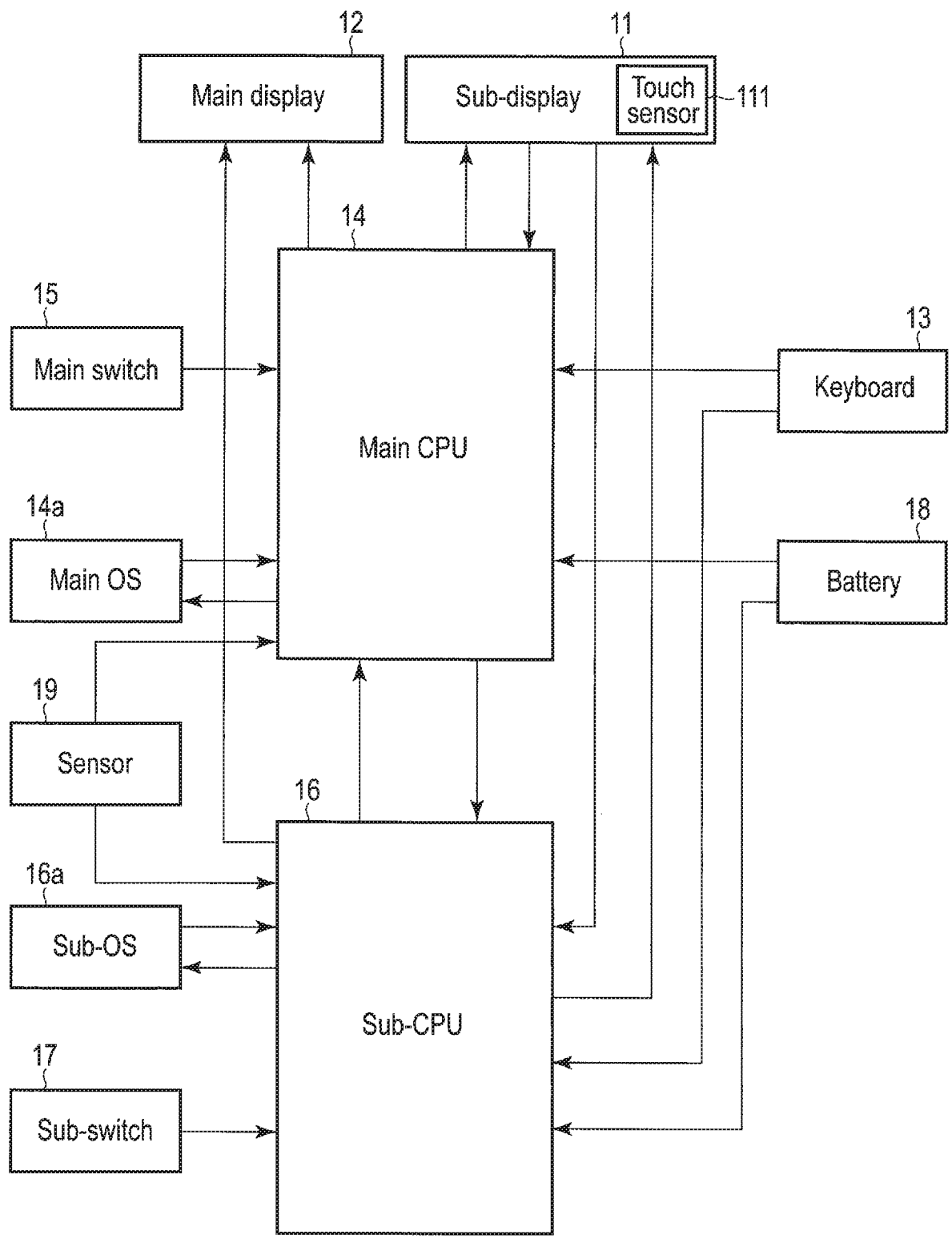
FIG. 15 is a block diagram showing an example of a system configuration of the information processing device according to the second embodiment.

FIG. 15 shows an example of a system configuration of the information processing device 10 according to the present embodiment. As shown in FIG. 15, the information processing device 10 includes, for example, a sensor 19 connected to a main CPU 14 and a sub-CPU 16.

In the present embodiment, for example, the sensor 19 includes a fingerprint sensor incorporated in a sub-display 11. If the sensor 19 is a fingerprint sensor, for example, the main CPU 14 (or the sub-CPU 16) can be operated if a fingerprint is detected by the sensor 19.

For example, if a region corresponding to the main CPU 14 and the sub-CPU 16 is preliminarily set on the sub-display 11, the user can operate the CPU corresponding to the region where the fingerprint is detected. According to such a configuration, the user can designate the CPU (main CPU 14 or sub-CPU 16) to be operated.

In addition, if the sensor 19 is a fingerprint sensor, authentication processing may be executed based on whether the fingerprint detected by the fingerprint sensor is a predetermined fingerprint (for example, the user's fingerprint) or not and the CPU may be operated in accordance with the result of the authentication.

It has been explained that the sensor 19 is the fingerprint sensor, but the other sensor may be used as the sensor 19.

As explained with reference to FIG. 5, if the main display 12 of the information processing device 10 is connected to the body 10a so as to be capable of pivoting between a position where an upper surface of the body 10a is exposed and a position where the upper surface of the body 10a is covered with the main display 12, the sensor 19 may be a sensor which detects a state (i.e., an opened state) of the main display 12 at the position where the upper surface of the body 10a is exposed and a state (i.e., a closed state) of the main display 12 at a position where the upper surface of the body 10a is covered.

In this case, for example, if the main display 12 transitions from the closed state to the opened state, the main CPU 14 (or the sub-CPU 16) can be operated.

For example, if the main display 12 transitions from the opened state to the closed state, the operating main CPU 14 (or the sub-CPU 16) may be set in a sleep state.

In the present embodiment, as explained above, the information processing device 10 can be operated without using the main switch 15 or the sub-switch 17 in the configuration including the sensor 19.

Third Embodiment

Next, a third embodiment will be explained. An appearance and the like of an information processing device according to the present embodiment are the same as those of the first embodiment, and will be arbitrarily explained with reference to FIG. 5 and the like. Detailed explanations of the same portions of the present embodiment as the first embodiment are omitted, and the portions of the present embodiment different from the first embodiment will be mainly explained.

It has been explained in the above-described first embodiment that the information processing device 10 operates in the main display mode or the sub-display mode as explained with reference to, for example, FIG. 7 and FIG. 8, but the present embodiment is different from the above-described first embodiment with respect to a feature that the information processing device 10 can operate in both the main display mode and the sub-display mode (i.e., the main CPU 14 and the sub-CPU 16 can operate simultaneously).

FIG. 16 shows an example of a system configuration of the information processing device 10 according to the present embodiment. As shown in FIG. 16, a main display 12 is connected to the main CPU 14 but is not connected to the sub-CPU 16, in the information processing device 10 according to the present embodiment. In contrast, a sub-display 11 is connected to the sub-CPU 16 but is not connected to the main CPU 14.

In the present embodiment, in such a configuration, since an image according to an application program and the main OS 14a executed by the main CPU 14 is displayed on the main display 12 and since an image according to an application program and the sub-OS 16a executed by the sub-CPU 16 is displayed on the sub-display 11, the user can use the main display 12 and the sub-display 11 as different systems. In this case, for example, an external mouse 20 connected to the main CPU 14, or the like may be set to be operated by the user.

The present embodiment may be implemented in combination with the above-described first embodiment or the like. In the information processing device 10, for example, the main CPU 14 may operate alone, the sub-CPU 16 may be operated alone, or the main CPU 14 and the sub-CPU 16 may simultaneously operate independently of each other. In addition, operating the main CPU 14, operating the sub-CPU 16, and operating both the main CPU 14 and the sub-CPU 16 may be changed in accordance with the user's operation or the like or may be automatically changed in accordance with the aspect of use of the information processing device 10 or the like.

Fourth Embodiment

Next, a fourth embodiment will be explained. An appearance, a system configuration, and the like of an information processing device according to the present embodiment are the same as those of the first embodiment, and will be arbitrarily explained with reference to FIG. 5, FIG. 6, and the like. Detailed explanations of the same portions of the present embodiment as the first embodiment are omitted, and the portions of the present embodiment different from the first embodiment will be mainly explained.

A concrete application example of the information processing device 10 according to the above-described first embodiment will be explained in the present embodiment, but the present embodiment is different from the above-described first embodiment with respect to a feature that a manual (use guide) of an application program is displayed on the sub-display 11.

A procedure of the information processing device 10 according to the present embodiment will be explained with reference to a flowchart of FIG. 17.

The information processing device 10 according to the present embodiment is assumed to operate in the main display mode or the sub-display mode. The condition that "the information processing device 10 operates in the main display mode" indicates that the main OS 14a is executed by the main CPU 14. In contrast, the condition that "the information processing device 10 operates in the sub-display mode" indicates that the sub-OS 16a is executed by the sub-CPU 16.

It is assumed that a predetermined application program (hereinafter referred to as a target application) is executed by the main CPU 14 in a case where the information processing device 10 operates in, for example, the main display mode.

In this case, an image according to the target application is displayed on the main display 12 of the information processing device 10.

The main CPU 14 determines whether an instruction to display the manual (hereinafter referred to as a manual displaying instruction) has been made based on the user operation of the information processing device 10 or not (step S1).

The user operation to make the manual displaying instruction includes, for example, an operation of pressing a specific key of the keyboard 13 arranged on the upper surface of the body 10a of the information processing device 10, an operation of pressing a specific button (hard button) provided on the body 10a, or the like. In addition, the operation to make the manual displaying instruction may be, for example, an operation of designating a button (help button or the like) provided on the image by using a pointer on the image displayed on the main display 12, or the like.

If it is determined that the manual displaying instruction has not been made (NO in step S1), the processing is ended.

If it is determined that the manual displaying instruction has been made (YES in step S1), the main CPU 14 determines whether the sub-display 11 is illuminating or not (step S2).

The condition that "the sub-display 11 is illuminating" indicates a state in which the power is supplied to the sub-display 11 and various images can be displayed on the sub-display 11 (i.e., the sub-display 11 is turned on).

If it is determined that the sub-display 11 is not illuminating (NO in step S2), the main CPU 14 turns on the sub-display 11 (step S3).

In contrast, if it is determined that the sub-display 11 is illuminating (YES in step S2), the processing in step S3 is not executed.

Next, the main CPU 14 displays the manual of the target application on the sub-display 11 (step S4). The manual of the target application is preliminarily managed in the target application and can be acquired from the target application.

The manual of the target application may be managed inside the information processing device 10 or may be acquired from the outside of the information processing device 10.

Figure 18:
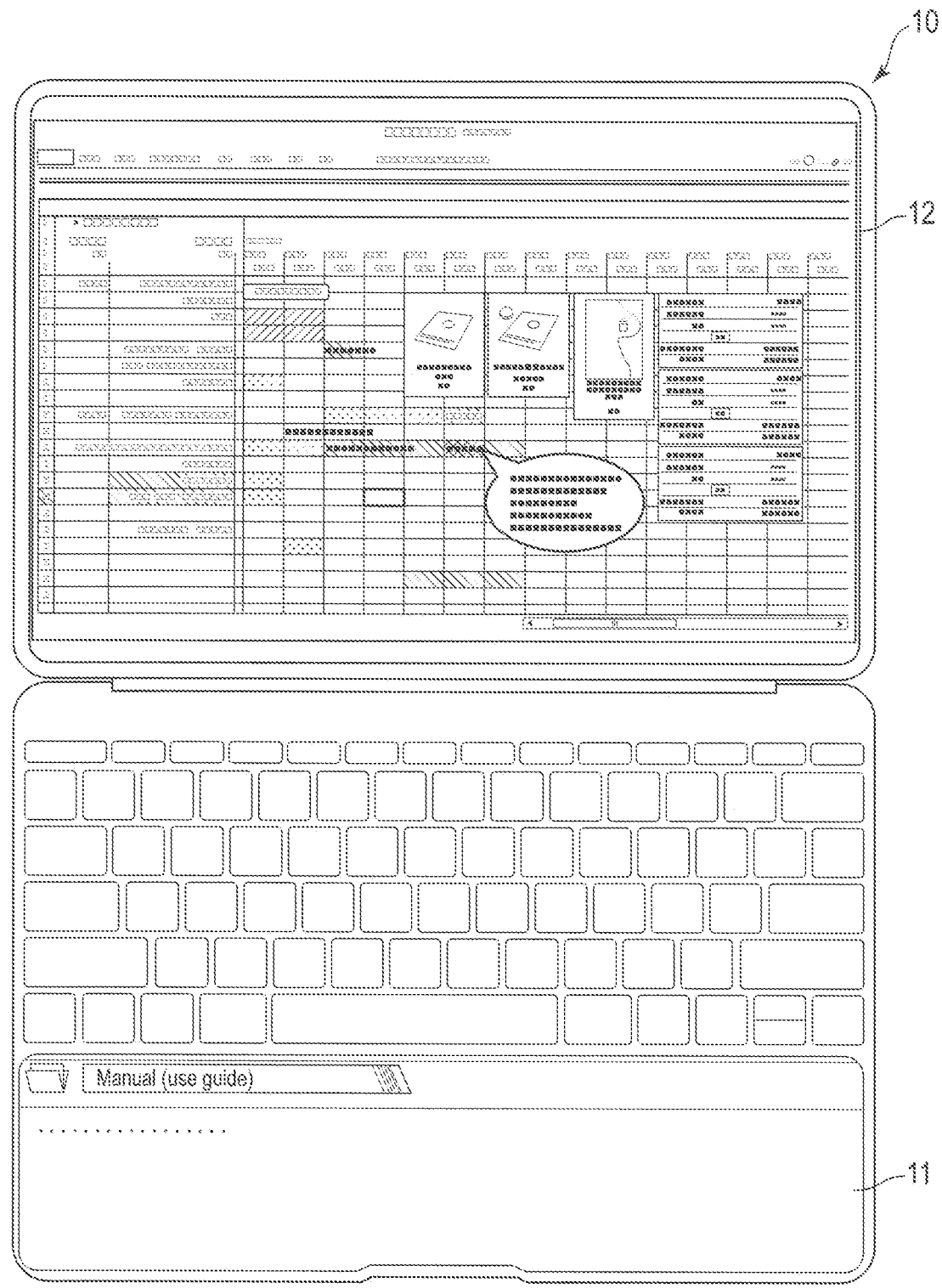
FIG. 18 is a view showing an example of the screen of the sub-display on which a manual is displayed.

FIG. 18 is a view showing an example of the screen of the sub-display 11 on which the manual is displayed. As shown in FIG. 18, if the manual is displayed on the sub-display 11, the user can use the target application via the main display 12 while confirming the manual.

Figure 17:
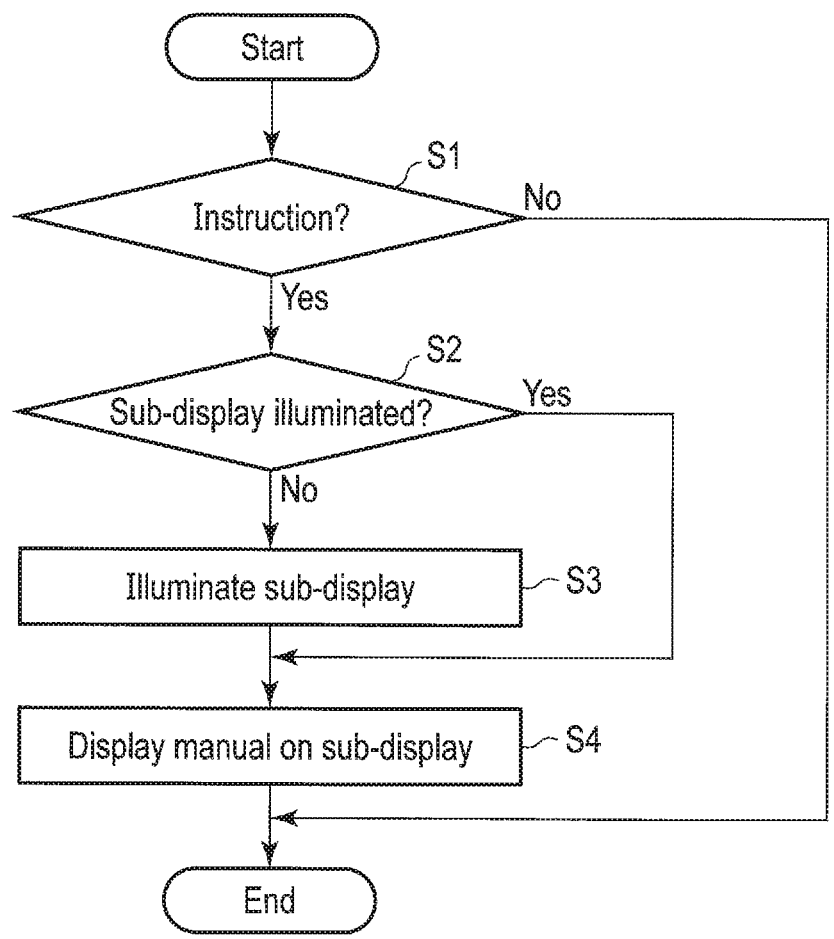
FIG. 17 is a flowchart showing an example of a procedure of the information processing device according to the fourth embodiment.

It has been explained in FIG. 17 that the manual of the target application is displayed on the sub-display 11 in accordance with the user instruction (manual displaying instruction) but, for example, the processing in step S1 may be omitted and the processing in step S2 may be executed when the target application is activated (executed).

If the information processing device 10 is operated in the main display mode as explained above, for example, the sub-CPU 16 may operate and the manual of the target application may be displayed on the sub-display 11 under control of the sub-CPU 16 when an abnormality occurs while the main CPU 14 executes the target application.

It has been explained that the information processing device 10 operates in the main display mode, but if the information processing device 10 operates in the sub-display mode, the above-described processing in steps S1 to S4 may be executed by the sub-CPU 16.

As explained in the above-described third embodiment, if the main CPU 14 and the sub-CPU 16 operate simultaneously, for example, the main CPU 14 may execute the processing in step S1 and the sub-CPU 16 may execute the processing following step S2, by cooperation between the main CPU 14 and the sub-CPU 16.

In the present embodiment, as described above, the user can use the target application via the main display 12 while confirming, for example, the manual displayed on the sub-display 11, by the configuration of displaying the manual of the target application on the sub-display 11, and the palm rest portion can be used effectively.

Fifth Embodiment

Next, a fifth embodiment will be explained. An appearance, a system configuration, and the like of an information processing device according to the present embodiment are the same as those of the first embodiment, and will be arbitrarily explained with reference to FIG. 5, FIG. 6, and the like. Detailed explanations of the same portions of the present embodiment as the first embodiment are omitted, and the portions of the present embodiment different from the first embodiment will be mainly explained.

A concrete application example of the information processing device 10 according to the above-described first embodiment will be explained in the present embodiment, but the present embodiment is different from the above-described first embodiment with respect to a feature that an image according to a task change launcher to be explained later is displayed on a sub-display 11.

Figure 19:
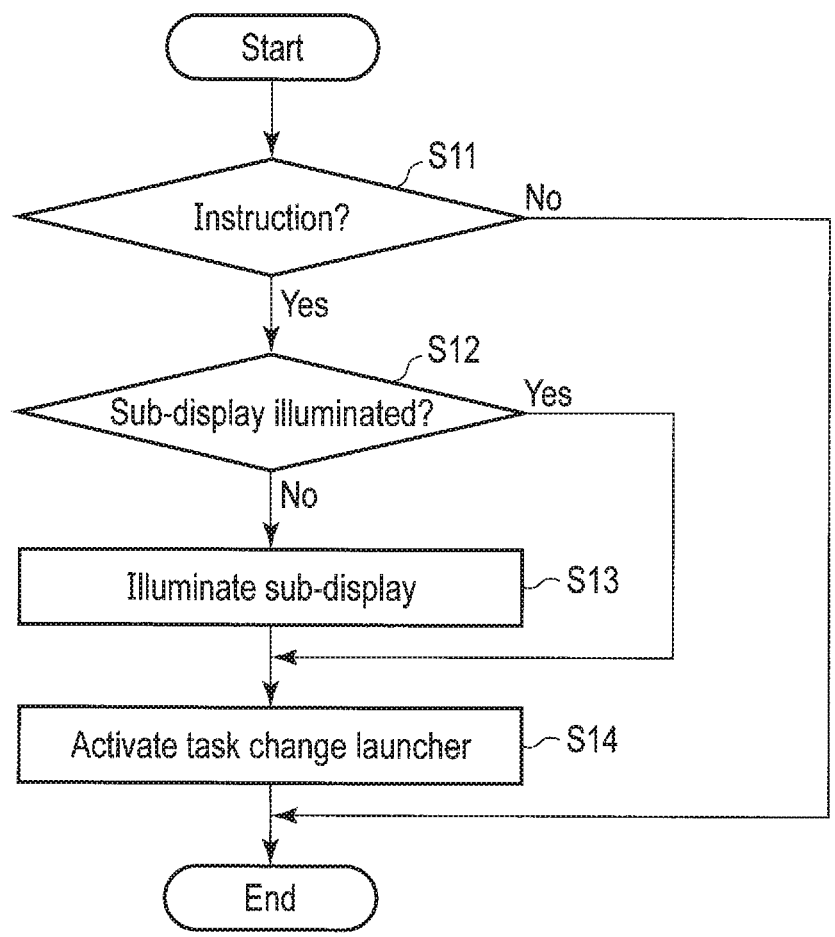
FIG. 19 is a flowchart showing an example of a procedure of the information processing device according to the fifth embodiment.

A procedure of the information processing device 10 according to the present embodiment will be explained with reference to a flowchart of FIG. 19.

The information processing device 10 according to the present embodiment is assumed to operate in the main display mode or the sub-display mode.

It is assumed that a plurality of application programs (hereinafter referred to as target applications) are executed by the main CPU 14 in a case where the information processing device 10 operates in, for example, the main display mode.

In this case, for example, an image according to at least one target application, of the target applications is displayed on the main display 12 of the information processing device 10.

The main CPU 14 determines whether an instruction to activate the task change launcher (hereinafter referred to as a launcher activating instruction) has been made based on the user operation of the information processing device 10 or not (step S11).

The user instruction to make the launcher activating instruction is the same as the user operation to make the manual displaying instruction as explained in the above-described fourth embodiment, and its detailed explanations are omitted here.

If it is determined that the launcher activating instruction has not been made (NO in step S11), the processing is ended.

In contrast, if it is determined that the launcher activating instruction has been made (YES in step S11), the processing in steps S12 and S13 corresponding to the above-described processing in steps S2 and S3 shown in FIG. 17 is executed.

If it is determined in step S12 that the sub-display 11 is illuminated (YES in step S12) or if the processing in step S13 is executed, the main CPU 14 activates the task change launcher (step S14).

The task change launcher is an application program (software) used to change the target application which displays the image on the main display 12 in a case where, for example, a plurality of target applications are executed by the main CPU 14 as described above.

If the task change launcher is activated, for example, a list of images corresponding to the respective target applications executed by the main CPU 14 is displayed on the sub-display 11.

Figure 20:
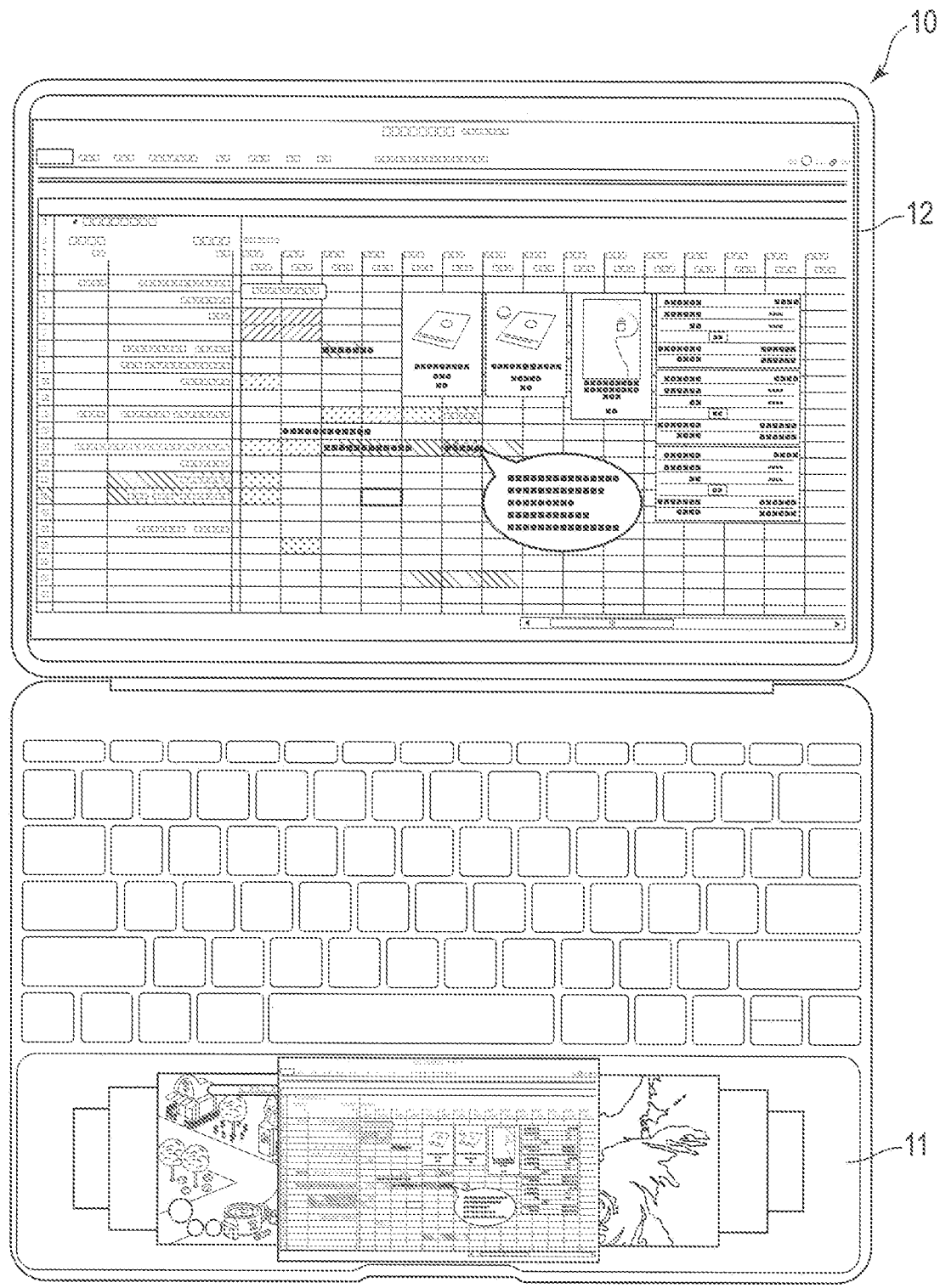
FIG. 20 is a view showing an example of the image displayed on the sub-display when a task change launcher is activated.

Changing the images displayed on the main display 12 will be concretely explained with reference to FIG. 20. FIG. 20 shows an example of the image displayed on the sub-display 11 when a task change launcher is activated.

It is assumed here that a plurality of target applications including a first target application and a second target application are executed by the main CPU 14 and, for example, an image according to the first application is displayed on the main display 12.

If the task change launcher is activated as described above, a list of the images corresponding to the respective target applications is displayed on the sub-display 11 as shown in FIG. 20. In this case, the user can select a desired image from a list of images according to respective target applications (i.e., urge a desired image to be displayed in the center of the sub-display 11), by executing a swipe operation in the lateral direction (i.e., an operation of sliding the finger) on the sub-display 11. It is assumed here that, for example, the image according to the second target application is displayed in the center of the sub-display 11.

In this case, in a state in which the image according to the second target application (i.e., the image displayed by executing the second target application) is displayed in the center of the sub-display 11 (i.e., the image is selected), the user can execute a flick operation in the upward direction on the image. If such an operation is executed, the image according to the first target application displayed on the main display 12 is changed to the image according to the second target application.

The image on the sub-display 11 shown in FIG. 20 (i.e., the image displayed when the task change launcher is executed) is a mere example and, if the image displayed on the main display 12 can be changed, the other format image (UI) may be displayed.

It has been explained that the information processing device 10 operates in the main display mode, but if the information processing device 10 operates in the sub-display mode, the above-described processing in steps S11 to S14 may be executed by the sub-CPU 16.

As explained in the above-described third embodiment, if the main CPU 14 and the sub-CPU 16 operate simultaneously, for example, the main CPU 14 may execute the processing in step S11 and the sub-CPU 16 may execute the processing following step S12, by cooperation between the main CPU 14 and the sub-CPU 16.

In the present embodiment as described above, a desired image can be displayed on the main display 12 without executing a complicated operation to use the target application, in the configuration that the images displayed on the main display 12 can be changed via the sub-display 11 by activating the task change launcher. Therefore, the palm rest portion can be used effectively.

It has been explained in the present embodiment that the images according to the target applications (application programs which are being executed by the main CPU 14 and the like) are changed by using the task change launcher, but when the task change launcher is activated, for example, a list of icons corresponding to the application programs which can be executed by the main CPU 14 and the like (i.e., application programs which are not activated) may be displayed and the user may select (designate) a desired application program from the list of icons.

In addition, when the task change launcher is activated, a list of all icons corresponding to application programs which are currently executed and application programs which are not activated may be displayed by the main CPU 14 or the like.

Sixth Embodiment

Next, a sixth embodiment will be explained. An appearance, a system configuration, and the like of an information processing device according to the present embodiment are the same as those of the first embodiment, and will be arbitrarily explained with reference to FIG. 5, FIG. 6, and the like. Detailed explanations of the same portions of the present embodiment as the first embodiment are omitted, and the portions of the present embodiment different from the first embodiment will be mainly explained.

A concrete application example of the information processing device 10 according to the above-described first embodiment will be explained in the present embodiment, but the present embodiment is different from the above-described first embodiment with respect to a feature that, for example, the user interface which can be used in the application program executed by the main CPU 14 and the like is displayed on the sub-display 11.

Figure 21:
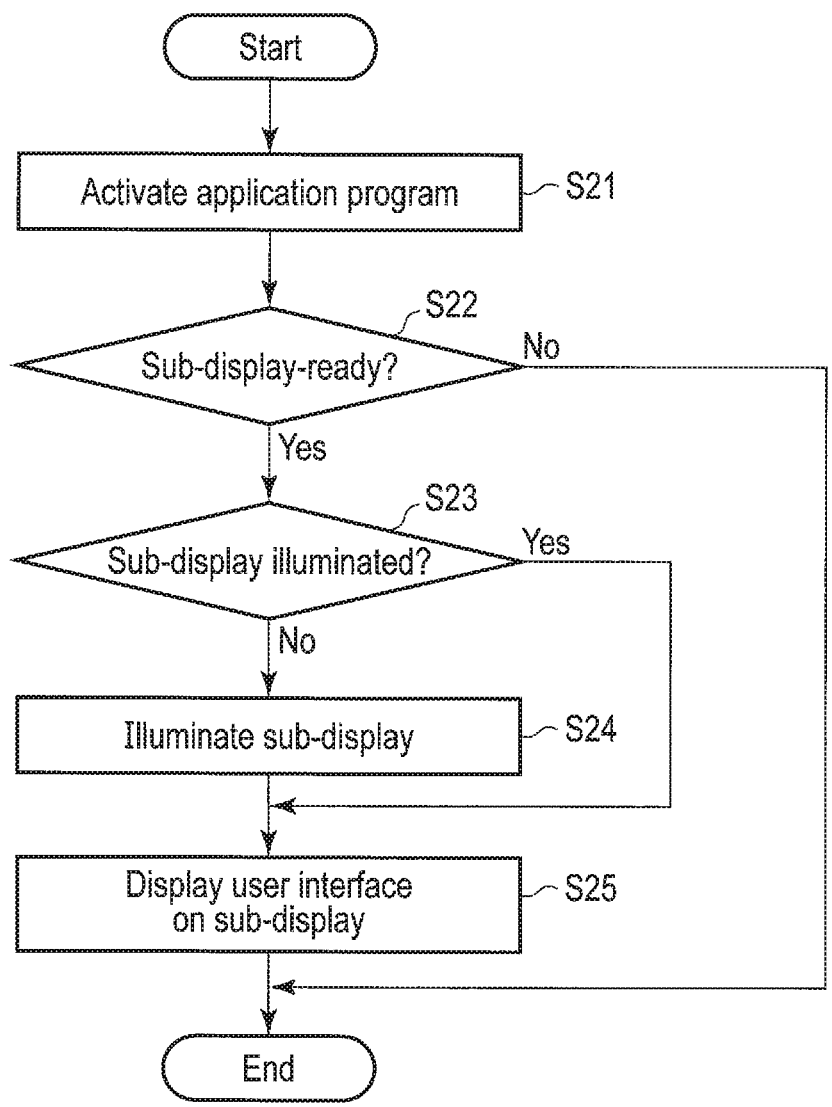
FIG. 21 is a flowchart showing an example of a procedure of the information processing device according to the sixth embodiment.

A procedure of the information processing device 10 according to the present embodiment will be explained with reference to a flowchart of FIG. 21.

The information processing device 10 according to the present embodiment is assumed to operate in the main display mode or the sub-display mode.

It is assumed here that a predetermined application program (hereinafter referred to as a target application) is activated by the main CPU 14 in a case where the information processing device 10 operates in, for example, the main display mode (step S21).

In this case, the main CPU 14 determines whether the target application is an application program which can display the user interface on the sub-display 11 (i.e., a sub-display-ready application) or not (step S22). The sub-display-ready application is predetermined in accordance with the type of the application program, and the like and includes, for example, an application program which enables a game to be played (hereinafter referred to as a game application) and the like.

If it is determined that the target application is the sub-display-ready application (YES in step S22), processing in steps S23 and S24 corresponding to the above-described processing in steps S2 and S3 shown in FIG. 17 is executed.

If it is determined in step S23 that the sub-display 11 is illuminating (YES in step S23) or if the processing in step S24 is executed, the main CPU 14 displays a user interface which can be used for the target application, on the sub-display (step S25).

Figure 22:
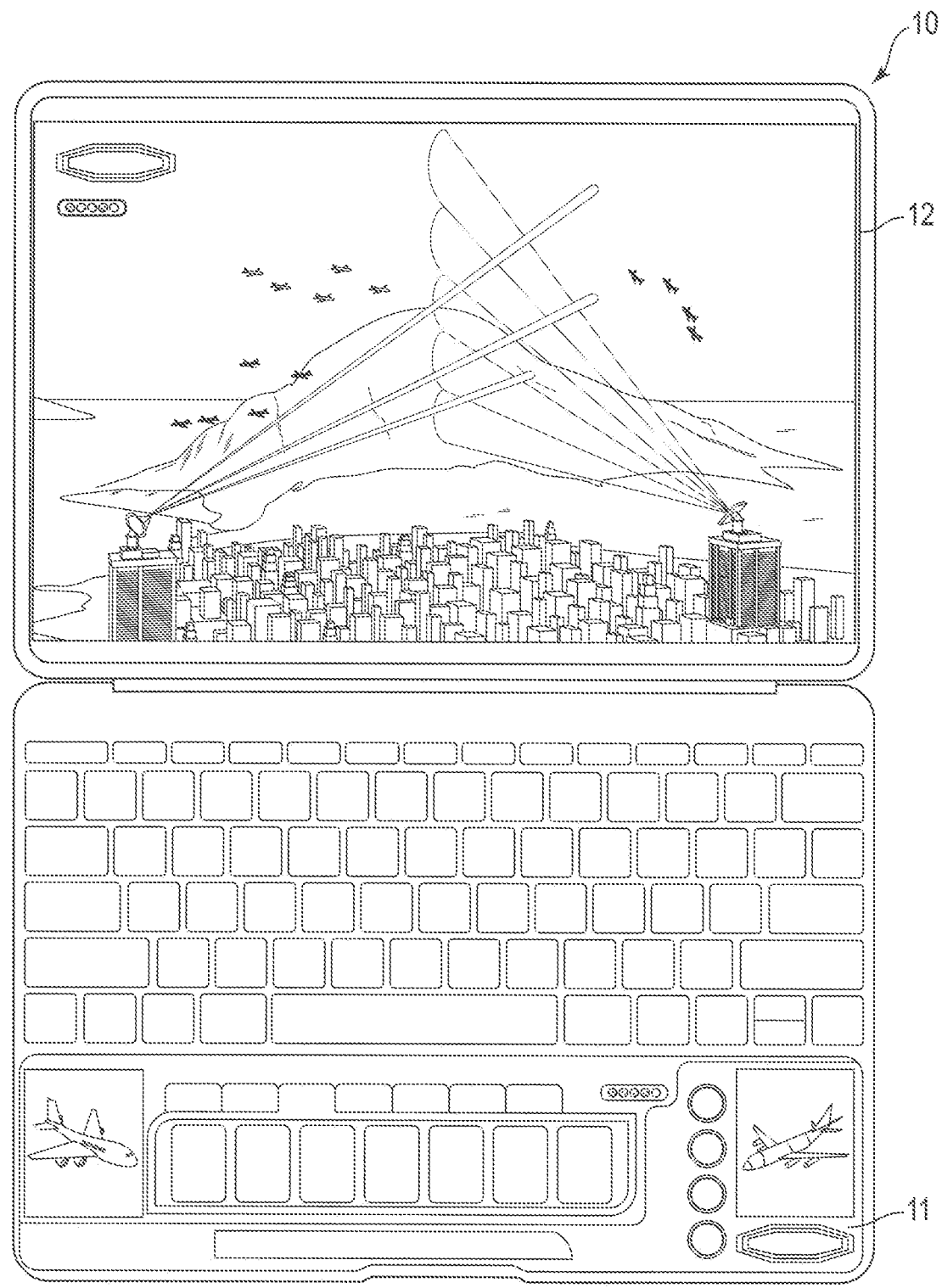
FIG. 22 is a view showing an example of the screen of the sub-display on which a controller for playing a game is displayed.

If the target application is the game application as described above, a controller for playing the game by the game application as shown in, for example, FIG. 22 is displayed on the sub-display 11 as the user interface which can be used in the target application.

In step S25, for example, an interface other than the user interface used as the controller may be displayed if it is subjected to use of the target application.

Figure 23:
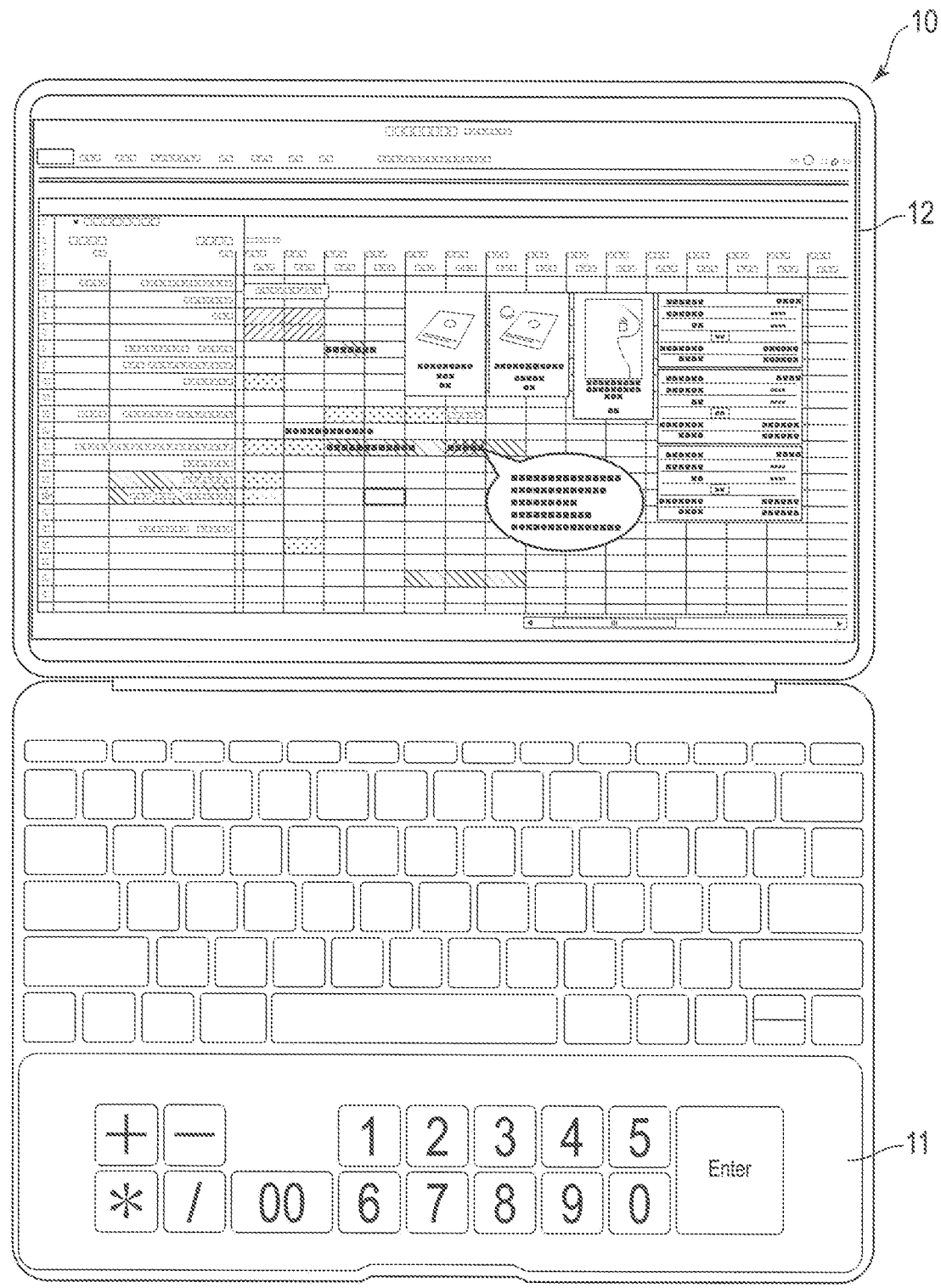
FIG. 23 is a view showing an example of the screen of the sub-display on which a user interface providing general-purpose functions is displayed.

If it is determined in step S22 that the target application is not the sub-display-ready application (NO in step S22), the processing is ended. In this case, the sub-display 11 may remain unilluminated but, even if it is determined that the target application is not the sub-display-ready application, the sub-display 11 may illuminate and a user interface (for example, a ten-key or the like) providing, for example, general-purpose functions as shown in FIG. 23 may be displayed on the sub-display 11 and, besides, objects such as standard sentences may be displayed on the sub-display 11.

It has been explained that the information processing device 10 operates in the main display mode, but if the information processing device 10 operates in the sub-display mode, the above-described processing in steps S21 to S25 may be executed by the sub-CPU 16.

As explained in the above-described third embodiment, if the main CPU 14 and the sub-CPU 16 operate simultaneously, for example, the main CPU 14 may execute the processing in steps S21 and S22, and the sub-CPU 16 may execute the processing following step S23, by cooperation between the main CPU 14 and the sub-CPU 16.

In the present embodiment as described above, the screen of the main display 12 can be effectively used and the visibility can be improved as compared with the case of displaying the user interface on the main display 12, in the configuration of displaying the user interface which can be used in the target application (for example, a controller for playing the game in the game application) on the sub-display 11. In addition, in the present embodiment, the operability can also be improved since playing games and the like can be executed by using the sub-display 11.

Seventh Embodiment

Next, a seventh embodiment will be explained. An appearance, a system configuration, and the like of an information processing device according to the present embodiment are the same as those of the first embodiment, and will be arbitrarily explained with reference to FIG. 5, FIG. 6, and the like. Detailed explanations of the same portions of the present embodiment as the first embodiment are omitted, and the portions of the present embodiment different from the first embodiment will be mainly explained.

A concrete application example of the information processing device 10 according to the above-described first embodiment will be explained in the present embodiment, but the present embodiment is different from the above-described first embodiment with respect to a feature that, for example, a joystick can be used with the sub-display 11 in the application program executed by the main CPU 14 and the like.

A procedure of the information processing device 10 according to the present embodiment will be explained with reference to a flowchart of FIG. 24.

The information processing device 10 according to the present embodiment is assumed to operate in the main display mode or the sub-display mode.

It is assumed here that a predetermined application program (hereinafter referred to as a target application) is activated by the main CPU 14 in a case where the information processing device 10 operates in, for example, the main display mode (step S31).

In this case, the main CPU 14 determines whether the target application is an application program which can use the above-explained joystick (i.e., a joystick-ready application) or not (step S32). The joystick-ready application is predetermined in accordance with the type of the application program, and the like and includes, for example, an application program which enables a game to be played (hereinafter referred to as a game application) and the like.

If it is determined that the target application is the joystick-ready application (YES in step S32), the main CPU 14 determines whether the joystick is placed on the sub-display 11 or not (step S33).

Figure 25:
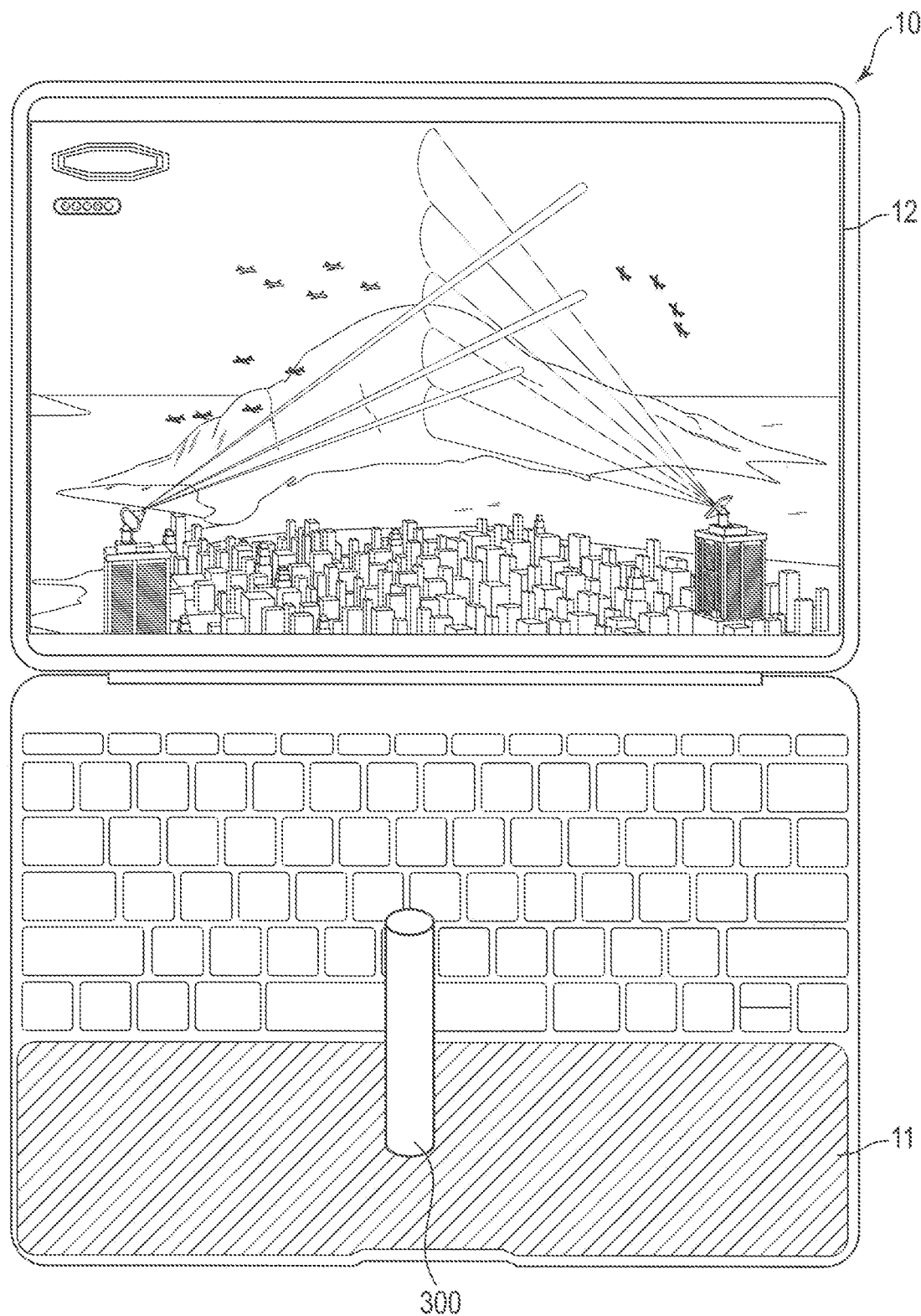
FIG. 25 is a view showing an example of a state in which a joystick is placed on the sub-display.

FIG. 25 shows a state in which a joystick 300 is placed on the sub-display 11.

The joystick is a device which enables direction input with a lever used as a controller for playing a game.

If the joystick 300 is placed on the sub-display 11 as shown in FIG. 25, the main CPU 14 can detect placement of the joystick on the sub-display 11, based on contact of the joystick detected by the sub-display 11.

Explanation returns to FIG. 24, and if it is determined that the joystick is placed on the sub-display 11 (YES in step S33), the main CPU 14 acquires the input in the longitudinal and lateral directions in accordance with the user operation of the joystick placed on the sub-display 11 (step S34).

If the sub-display 11 (touch panel) is configured in the type such as an electrostatic type, the sub-display can detect an area of contact of the joystick on the sub-display 11 or a distance between the joystick and each part, which is varied in accordance with the user operation of the joystick. In this case, the main CPU 14 can acquire the input of the longitudinal and lateral directions, based on the area of contact of the joystick on the sub-display 11 or the distance between each part and the sub-display 11, which is detected by the sub-display 11.

In contrast, if the sub-display 11 (touch panel) is configured in the type such as a photosensitive type, the sub-display 11 can detect the pressure generated on the sub-display 11 in accordance with the user operation of the joystick. In this case, the main CPU 14 can acquire the input of the longitudinal and lateral directions (leaning and angle of the joystick), based on the pressure detected by the sub-display 11.

The input of the longitudinal and lateral directions acquired in step S34 (i.e., the user operation of the joystick) is fed back to the execution of the target application (step S35).

If it is determined in step S32 that the target application is not the joystick-ready application (NO in step S32) or if it is determined in step S33 that the joystick is not placed on the sub-display 11 (YES in step S33), the processing is ended.

If it is determined in step S33 that the joystick is not placed on the sub-display 11, the user interface which does not use the joystick (for example, a controller for playing the game explained in the above-described sixth embodiment) may be displayed on the sub-display 11.

In addition, if it is determined in step S33 that the joystick is not placed on the sub-display 11, warning may be displayed on the main display 12 or the sub-display 11 and the processing of step S33 may be executed again.

Furthermore, though not shown in FIG. 24, if it is determined in step S32 that the target application is the joystick-ready application but if the sub-display 11 is not illuminated, the sub-display 11 may be illuminated by executing the above-described processing in step S3 shown in FIG. 17.

It has been explained in the present embodiment that the processing in step S32 is automatically executed after the target application is activated in step S31, but the processing in step S32 may be executed based on the user operation on the information processing device 10 (for example, an operation of designating the button provided on the image, or the like) after the processing in step S31 is executed.

In addition, the processing in step S32 may be executed when the joystick is placed on the sub-display 11 after the processing in step S31 is executed. In this case, the processing in step S33 may be omitted.

It has been explained that the information processing device 10 operates in the main display mode, but if the information processing device 10 operates in the sub-display mode, the above-described processing in steps S31 to S35 may be executed by the sub-CPU 16.

As explained in the above-described third embodiment, if the main CPU 14 and the sub-CPU 16 operate simultaneously, for example, the main CPU 14 may execute the processing in steps S31, S32, and S35, and the sub-CPU 16 may execute the processing in steps S33 and S34 by collaborative operation between the main CPU 14 and the sub-CPU 16.

In the present embodiment as described above, the user can make operations using the joystick by acquiring the input in the longitudinal and lateral directions based on the user operation of the joystick placed on the sub-display 11 and feeding back the input to the target application (for example, a game application), and thereby it is possible to improve the operability when playing the game with the target application.

It has been explained in the present embodiment that the operations can be made by using the joystick merely placed on the sub-display 11, but the joystick may be placed in a part of the region (for example, a left region) of the sub-display 11 and buttons and the like used together with the joystick may be displayed in the other region (for example, a right region).

Eighth Embodiment

Next, an eighth embodiment will be explained. An appearance, a system configuration, and the like of an information processing device according to the present embodiment are the same as those of the first embodiment, and will be arbitrarily explained with reference to FIG. 5, FIG. 6, and the like. Detailed explanations of the same portions of the present embodiment as the first embodiment are omitted, and the portions of the present embodiment different from the first embodiment will be mainly explained.

It has been explained in the above-described first embodiment that the user can take notes via the sub-display 11 by executing the application program implementing the note function by the sub-CPU 16, but the present embodiment is different from the first embodiment with respect to a feature that the user can store taken notes in different formats.

Figure 26:
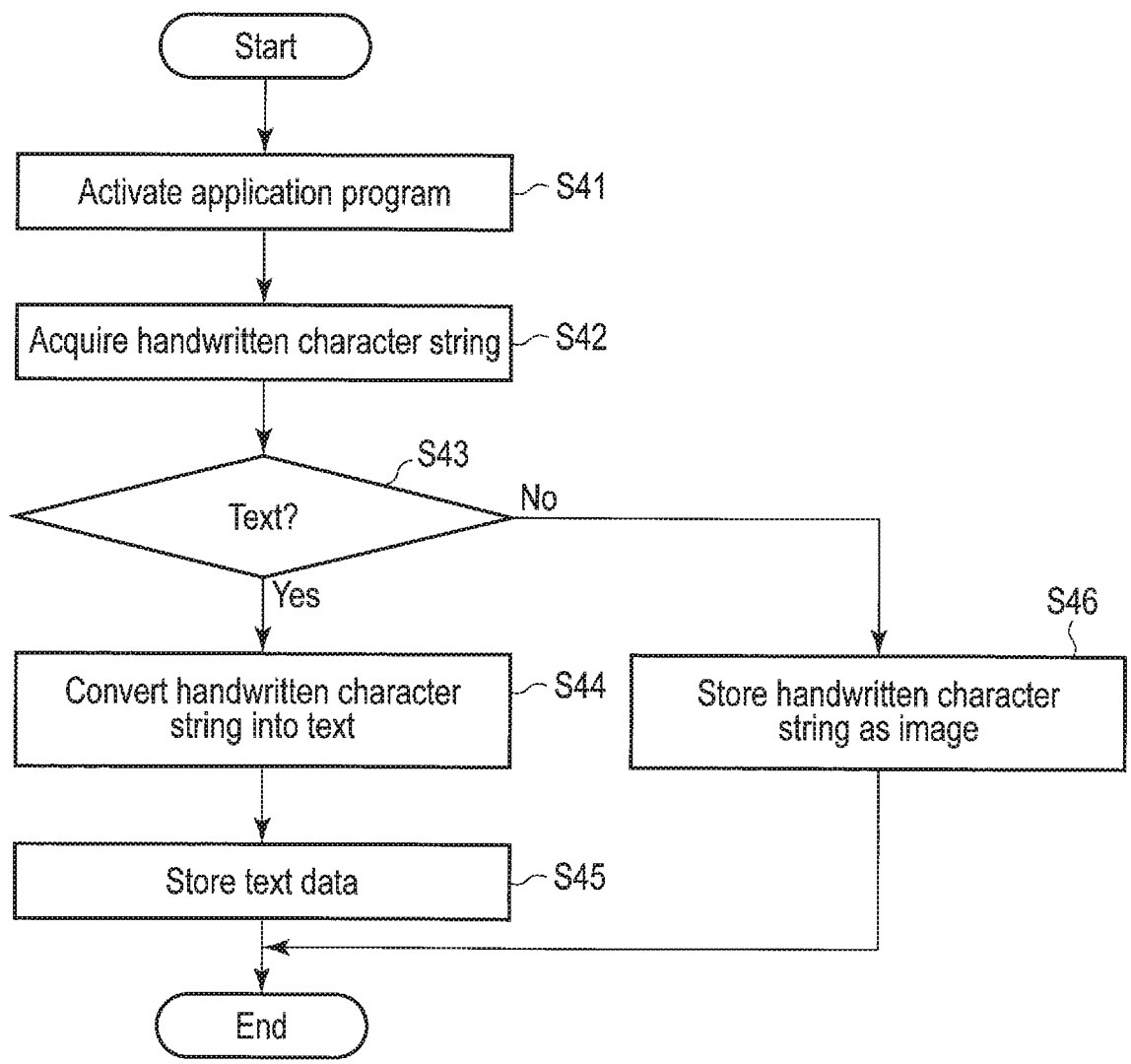
FIG. 26 is a flowchart showing an example of a procedure of the information processing device according to the eighth embodiment.

A procedure of the information processing device 10 according to the present embodiment will be explained with reference to a flowchart of FIG. 26.

It is assumed here that the information processing device 10 according to the present embodiment operates in the sub-display mode and an application program (hereinafter referred to as a note application) to implement the above-described note function is activated by the sub-CPU 16 (step S41).

In this case, the user can input by handwriting the content (character string) to be noted on the sub-display 11. The character string input by handwriting by the user (hereinafter referred to as handwritten character string) is acquired by the sub-CPU 14 (step S42). In step S42, the handwritten character string can be acquired by, for example, detecting a locus of the user's finger or stylus on the sub-display 11.

Next, the sub-CPU 14 determines whether to store the handwritten character string acquired in step S42 as a text or not (step S43). For example, a text and an image are prepared as the format for storing the handwritten character string, and the format for storing the handwritten character string may be preset by the user or may be determined by the user when the processing in step S43 is executed.

If it is determined that the handwritten character string is stored as a text (YES in step S43), the sub-CPU 14 executes, for example, optical character recognition (OCR) of the handwritten character string and converts the handwritten character string into a text (step S44).

The text into which the handwritten character string is converted in step S44 is stored in, for example, a nonvolatile memory or the like as a user's note (step S45).

In contrast, if it is determined that the handwritten character string is not stored as a text (NO in step S43), the sub-CPU 14 stores an image including the handwritten character string in, for example, a nonvolatile memory or the like as a user's note (step S46).

It has been explained that the note application is activated (executed) by the sub-CPU 16, and the note application may be executed by the main CPU 14. In this case, the processing in steps S41 to S45 may be executed by the main CPU 14.

In addition, as explained in the above-described third embodiment, if the main CPU 14 and the sub-CPU 16 operate simultaneously, for example, the sub-CPU 16 may execute the processing in steps S41 and S42, and the main CPU 14 may execute the processing following step S43, by cooperation between the main CPU 14 and the sub-CPU 16.

In the present embodiment as described above, the user's note in the note function can be stored in a format intended by the user. More specifically, if the user's note (handwritten character string) is stored in a text format, for example, the text is useful for searching for the text of the note later. In contrast, if the user's note is stored in an image format, the content of the note can be stored accurately since the image does not receive an influence such as a conversion error of the handwritten character string in the character recognition, or the like.

It has been explained in the present embodiment that the user's note is stored in a format of the text or the image and, for example, the user's note may be stored as an image for user's reference and may be stored on a background as a text for text search. More specifically, for example, if storing the handwritten character string as a text or an image is preset by the user, the processing in step S46 may also be executed together with the processing in steps S44 and S45.

Ninth Embodiment

Next, a ninth embodiment will be explained. An appearance, a system configuration, and the like of an information processing device according to the present embodiment are the same as those of the first embodiment, and will be arbitrarily explained with reference to FIG. 5, FIG. 6, and the like. Detailed explanations of the same portions of the present embodiment as the first embodiment are omitted, and the portions of the present embodiment different from the first embodiment will be mainly explained.

When the user operates (uses) the keyboard 13 in the information processing device 10 according to the above-described first embodiment, the user's palm or wrist is placed on the sub-display 11, and the region on the sub-display 11 on which the palm or wrist is placed often is not used. In addition, if the function (for example, the touch panel function) of the sub-display 11 is validated in a state in which the user's palm or wrist is placed on the sub-display 11, the function may cause an operation error. The present embodiment noticing this point is different from the first embodiment with respect to a feature of turning off (invalidating) the functions of the sub-display 11 in the region where the user's palm or wrist is placed.

A procedure of the information processing device 10 according to the present embodiment will be explained with reference to a flowchart of FIG. 27.

The information processing device 10 may operate in the main display mode or the sub-display mode in the present embodiment, but it will be explained here that, for example, the information processing device 10 operates in the main display mode. The sub-display 11 is assumed to be illuminated.

In this case, the main CPU 14 determines whether the palm or wrist is placed on the sub-display 11 in the condition that the keyboard 13 is used or not (step S51).

The processing in step S51 is executed based on an area of a range where the contact is detected by the sub-display 11 (touch panel). If contact is detected in a comparatively wide range (more than a predetermined range) on the sub-display 11 by the sub-display 11, the main CPU 14 can determine that the palm or wrist is placed on the sub-display 11. In contrast, if contact is detected in a comparatively narrow range (predetermined range or less) on the sub-display 11 by the sub-display 11, the main CPU 14 can determine that the palm or wrist is not placed by assuming that, for example, the user's finger or stylus is in contact with the sub-display 11. If the contact is not detected by the sub-display 11, the main CPU 14 can similarly determine that the palm or wrist is not placed on the sub-display 11.

As the detecting scheme of the stylus detection, for example, a resistive film scheme, a capacitive scheme and an active electromagnetic induction scheme can be employed.

In addition, a passive capacitive scheme, an active capacitive scheme, and the like can be employed as the capacitive scheme.

In the resistive film scheme, upper and lower electrodes arranged oppositely are made into contact with each other by pressure from the stylus, palm, or the like and contact of an external proximate object is thereby detected. If the pressure of a predetermined level or less is applied in the resistive film scheme, the upper and lower electrodes do not contact. In this case, since the contact made by the palm is not detected, the procedure excluding the processing in step S51 may be employed. Alternatively, if pressure of a predetermined level or more by the palm is applied, the processing in step S51 may be executed.

In the passive capacitive scheme, the contact of an external proximate object is detected by detecting the capacitance formed between the detection electrode and the stylus, finger, palm or the like. In the passive capacitive scheme, the processing in step S51 can be executed based on the area of the range in which the contact of the external proximate object is detected by the sub-display 11.

In the active capacitive scheme, the sensitivity of detection of the stylus contact is enhanced by detecting an electric field output from the stylus by the electrode. The active capacitive scheme is different from the passive capacitive scheme with respect to a feature of outputting the electric field from the stylus but is similar to the passive capacitive scheme with respect to a feature of detecting the capacitance between the detection electrode and the external proximate object (stylus, finger, palm, or the like) and, if the contact of the finger or palm or the contact of the stylus is determined, determining the input of a finger or palm or the input of a stylus based on the contact area as described in the processing in step S51 needs to be executed.

In the active electromagnetic induction scheme, a dedicated stylus alone is detected since the contact of the stylus is detected by detecting the magnetic field output from the stylus. Therefore, determining the input of the finger, palm or stylus in accordance with the contact area as executed in the processing in step S51 is unnecessary. In addition, determining the input of a finger or palm or the input of a stylus in accordance with the contact area is not executed in the processing in step S51 by combining the active electromagnetic induction scheme and the capacitive scheme, and the contact of finger or palm and the contact of stylus can be clearly distinguished by the detection in the active electromagnetic induction scheme or the capacitive scheme. For example, it is determined that the finger or palm is detected in a case where the contact is detected in the capacitive scheme alone, and the stylus input is determined in a case where the contact is detected in both the active electromagnetic induction scheme and the capacitive scheme or the active electromagnetic induction scheme alone.

Furthermore, whether the palm or wrist is placed on the sub-display 11 or not may be determined based on, for example, detection of a proximate object (user's palm or wrist) by the proximity sensor provided on the body 10a or key input using the keyboard 13 or, for example, the determination may be instructed by the user pressing a predetermined hardware switch or the like.

If it is determined that the palm or wrist is placed on the sub-display 11 (YES in step S51), the main CPU 14 turns off the functions of the sub-display 11 in a predetermined region on the sub-display 11 (step S52). The functions of the sub-display 11 turned off in step S52 include, for example, display, detection of contact (touch panel and handwriting input), fingerprint authentication (fingerprint sensor), and the like. The functions of the sub-display 11 turned off in step S52 may be some of them or all of them, or may be changed.

In addition, the predetermined region where the functions of the sub-display 11 are turned off may be, for example, the range (region) from the right and left edges of the sub-display 11 to a predetermined position where the palm or wrist is assumed to be placed when the keyboard 13 is used, the region determined by the number of touch sensors 111 provided in the sub-display 11, or the region determined based on the load on the main CPU 14 or the like.

In contrast, if it is determined that the palm or wrist is not placed on the sub-display 11 (NO in step S51), the functions of the sub-display 11 are not turned off and the functions are maintained in a valid state on the whole screen of the sub-display 11.

The processing shown in FIG. 27 is periodically executed but, if it is determined that the palm or wrist is not placed on the sub-display 11 in the processing shown in FIG. 27 executed again after the above-described processing in step S52 is executed, the functions of the sub-display 11 which have been turned off are set to be turned on again. The sub-display 11 can return to the state in which the function is validated on the whole screen.

It has been explained that the function of the sub-display 11 is turned off in the predetermined region in the processing shown in FIG. 27, but the region where the function of the sub-display 11 is turned off may be changed dynamically.

A procedure of the information processing device 10 in a case of dynamically changing the region where the function of the sub-display 11 is turned off will be explained with reference to a flowchart of FIG. 28.

First, processing in step S61 corresponding to the processing in step S51 shown in FIG. 27 is executed.

If it is determined in step S61 that the palm or wrist is placed on the sub-display 11 (YES in step S61), the main CPU 14 specifies the region on the sub-display 11 where the functions are turned off (hereinafter referred to as a function-off region).

If the processing in step S61 is executed based on the area of the region where the contact is detected by the sub-display 11 (touch panel) as describe above, for example, the region including the range where the contact is detected can be specified as the function-off region in step S62.

In addition, the sub-display 11 may be covered with a shadow of the user's hand and may hardly be used in not only the range (region) where the contact is detected by the sub-display 11, but also the region close to this range. For this reason, in step S62, if the user's palm or wrist is placed on the sub-display 11, the main CPU 14 may specify the region assumed to be covered with the shadow of the user's hand as the function-off region, in addition to the region including the range where the contact is detected by the sub-display 11.

If the processing in step S62 is executed, the main CPU 14 turns off the functions of the sub-display 11 in the function-off region on the sub-display 11 (step S63). If the region where the functions are turned off is dynamically changed, the processing in steps S61 to S63 may be executed in every predetermined period.

It has been explained that the information processing device 10 operates in the main display mode in FIG. 27 and FIG. 28, but if the information processing device 10 operates in the sub-display mode, the processing shown in FIG. 27 and FIG. 28 may be executed by the sub-CPU 16. In addition, as explained in the above-described third embodiment, if the main CPU 14 and the sub-CPU 16 operate simultaneously, the processing shown in FIG. 27 and FIG. 28 may be executed by the sub-CPU 16.

In addition, in the present embodiment, the sub-display 11 is illuminated, and the main display 12 may be used or may not be used.

As described above, in the present embodiment, power consumption in the sub-display 11 can be reduced in the configuration of turning off the functions of the partial region of the sub-display 11 if it is determined that the user's palm or wrist is placed.

Tenth Embodiment

Next, a tenth embodiment will be explained. Detailed explanations of the same portions of the present embodiment as the first embodiment are omitted, and the portions of the present embodiment different from the first embodiment will be mainly explained.

It has been explained in the above-described first embodiment that the length of the main display 12 in the longitudinal direction and the length of the body 10*a* in the longitudinal direction seen from the user when using the information processing device 10 substantially match, but the present embodiment is different from the above-described first embodiment with respect to a feature that the length of the main display 12 in the longitudinal direction is smaller than the length of the body 10*a* in the longitudinal direction.

As described above, the main display 12 is connected to the body 10*a* so as to be capable of pivoting between a position where an upper surface of the body 10*a* is exposed and a position where the upper surface of the body 10*a* is covered with the main display 12.

Figure 29:
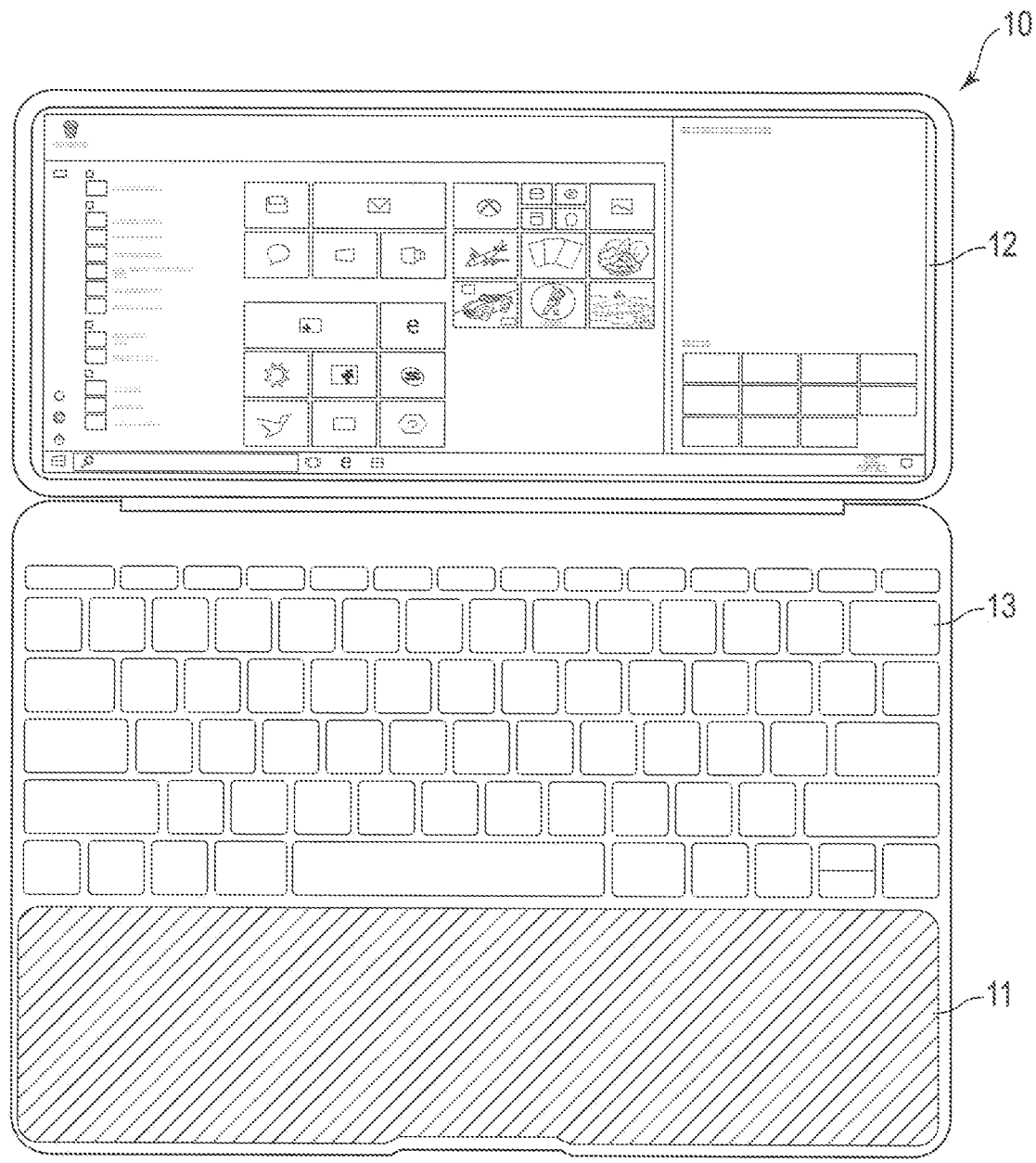
FIG. 29 is a view showing an example of a state in which a main display is opened in the information processing device according to the tenth embodiment.

FIG. 29 shows a state in which the main display 12 is located at a position for exposing the upper surface of the body 10*a* (i.e., a state in which the main display 12 is opened) in the information processing device 10 according to the present embodiment. In contrast, FIG. 30 shows a state in which the main display 12 is located at a position for covering the upper surface of the body 10*a* (i.e., a state in which the main display 12 is closed) in the information processing device 10 according to the present embodiment.

Figure 30:
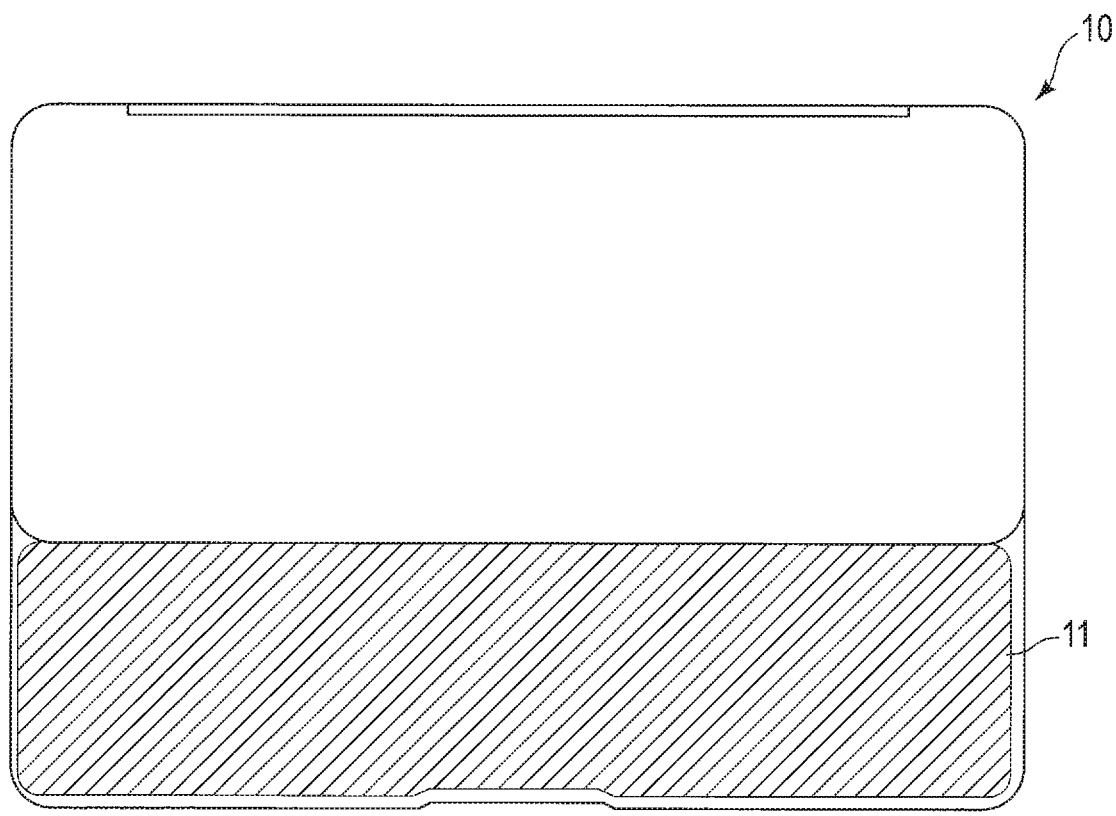
FIG. 30 is a view showing an example of a state in which the main display is closed in the information processing device.

As shown in FIG. 29 and FIG. 30, the length of the main display 12 in the longitudinal direction is smaller than the length of the body 10*a* in the longitudinal direction in the present embodiment. More specifically, the length of the main display 12 in the longitudinal direction is set to approximately match the length of the keyboard 13 in the longitudinal direction.

In the information processing device 10 according to the present embodiment, in such a configuration, the sub-display 11 can be used since the sub-display 11 becomes exposed even if the main display 12 is in the closed state.

A system configuration and the like of the information processing device 10 according to the present embodiment are the same as those of the above-described first embodiment, and will be arbitrarily explained with reference to FIG. 6 and the like.

A procedure of the information processing device 10 according to the present embodiment will be explained with reference to a flowchart of FIG. 31.

The information processing device 10 may operate in the main display mode or the sub-display mode in the present embodiment, but it will be explained here that, for example, the information processing device 10 operates in the main display mode. In this case, the processing shown in FIG. 31 is periodically executed by the main CPU 14.

First, the main CPU 14 determines whether the main display 12 is closed or not (step S71). The condition that "the main display 12 has been closed" indicates that the state in which the main display is opened as shown in FIG. 29 transitions to the state in which the main display 12 is closed as shown in FIG. 30.

In the present embodiment, it is assumed that, for example, the state in which the main display 12 is closed can be detected by a magnetic sensor, a physical switch or the like provided in the information processing device 10.

If it is determined that the main display 12 is not closed (NO in step S71), the processing is ended.

In contrast, if it is determined that the main display 12 is closed (YES in step S71), the main CPU 14 transitions to the sleep state (step S72). The sleep state implies a standby state in which power consumption can be reduced, and the like. In this case, the main display 12 becomes an unilluminated state (off).

If the main CPU 14 transitions to the sleep state in step S71, the sub-CPU 16 is activated (step S73).

The processing in steps S74 and S75 is executed. The processing in steps S74 and S75 is the same as the above-described processing in steps S2 and S3 shown in FIG. 17, and its detailed explanations are omitted. The processing in steps S74 and S75 is executed by the sub-CPU 16.

If it is determined in step S74 that the sub-display 11 is illuminated (YES in step S74) or if the processing in step S75 is executed, the sub-CPU 16 displays predetermined information on the sub-display 11 (step S76). The information displayed on the sub-display 11 in step S76 includes, for example, information indicating a calendar, a clock, and presence of an unread mail, and the like but may include the other information predetermined by the user, and the like.

Figure 31:
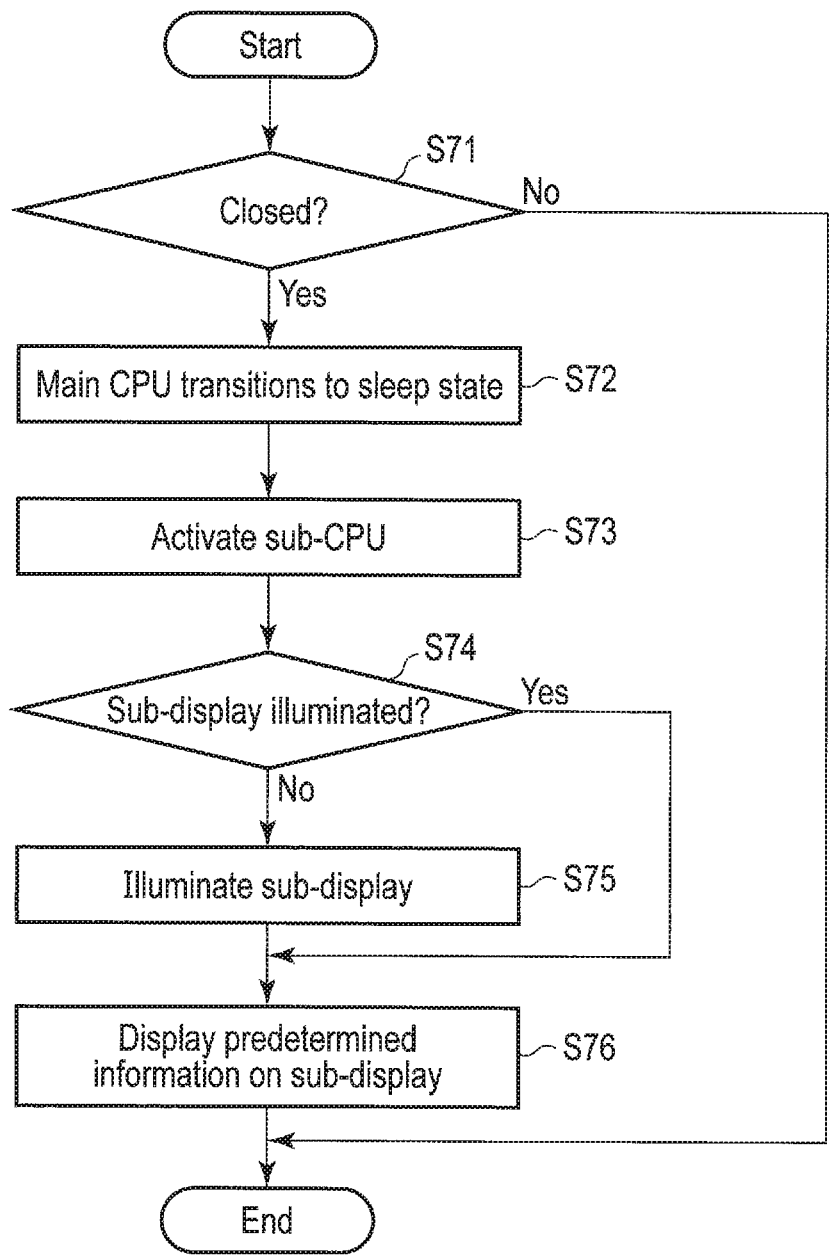
FIG. 31 is a flowchart showing an example of a procedure of the information processing device.

It has been explained that the main CPU 14 transitions to the sleep state and the sub-CPU 16 is activated in the processing shown in FIG. 31, but the sub-CPU 16 may execute the processing following step S74 without activating the sub-CPU 16.

It is explained that the information processing device 10 operates in the main display mode, but if the information processing device 10 operates in the sub-display mode, the processing shown in FIG. 31 may be executed by the sub-CPU 16. In this case, the processing in steps S72 and S73 is omitted.

In addition, as explained in the above-described third embodiment, if the main CPU 14 and the sub-CPU 16 operate simultaneously, for example, the main CPU 14 transitions to the sleep state in step S72 when it is determined in step S71 that the main display 12 is closed, and then the processing following step S74 is executed by the sub-CPU 16.

In the present embodiment as described above, in the configuration that the length of the main display 12 in the longitudinal direction is smaller than the length of the body 10a in the longitudinal direction, the palm rest portion can be used further effectively since various types of information disclosed on the sub-display 11 can be confirmed even if the main display 12 is closed.

Figure 32:
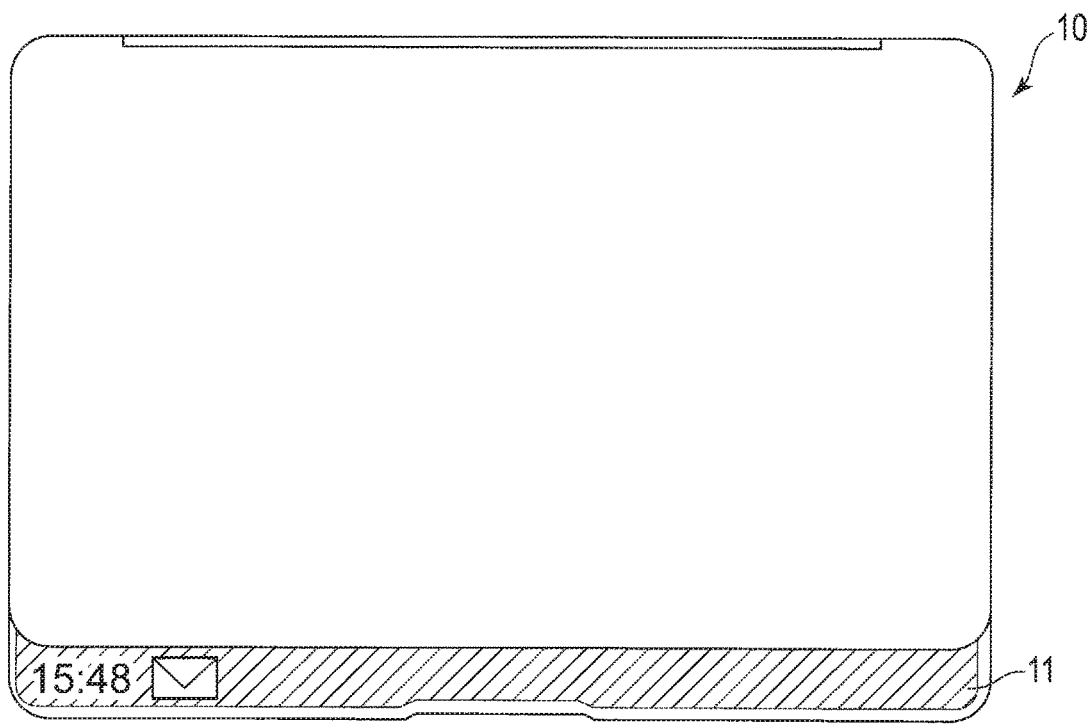
FIG. 32 is a view showing an example of a state in which a part of the sub-display is exposed while the main display is closed.

It has been explained in the present embodiment that the sub-display 11 is entirely exposed when the main display 12 is closed, by making the length of the main display 12 in the longitudinal direction match the length of the body 10a in the longitudinal direction, but a part of the sub-display 11 may be exposed as shown in FIG. 32. According to such a configuration, the functions of a part of the region of the sub-display 11 covered with the main display 12 in the state in which the main display 12 is closed can be turned off and the power consumption can be reduced. Turning off the functions of a part of the region in the sub-display 11 has been explained in the above-described ninth embodiment, and its detailed explanations are omitted.

Figure 33:
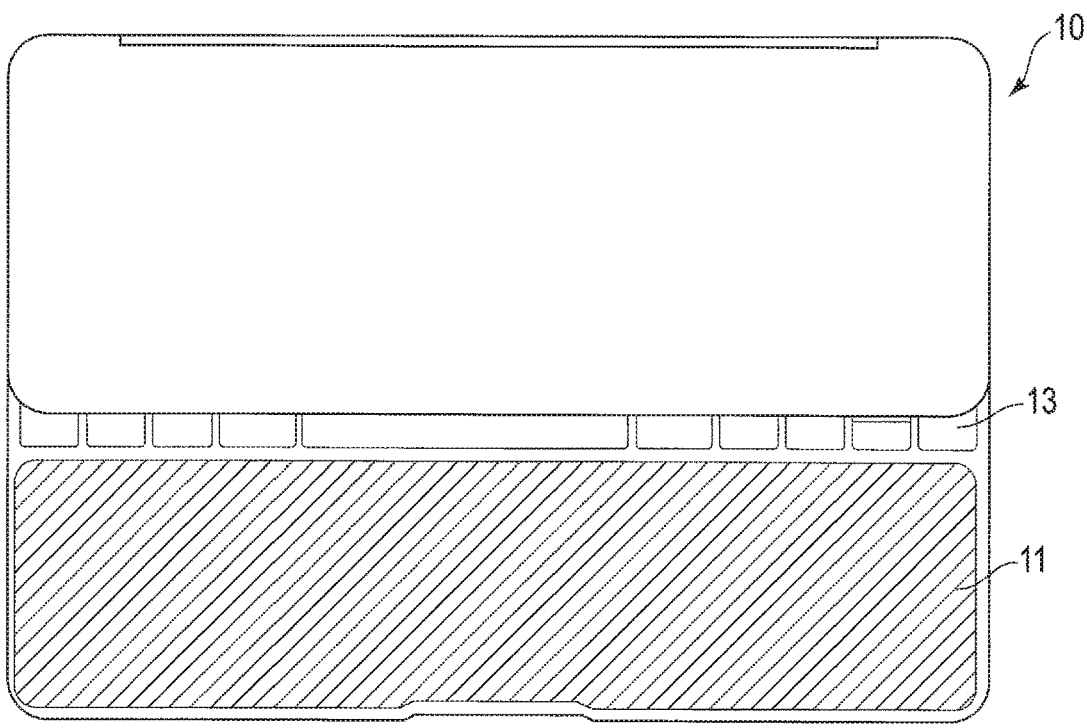
FIG. 33 is a view showing an example of a state in which parts of the sub-display and the keyboard are exposed while the main display is closed.

In addition, as shown in FIG. 33, for example, not only the sub-display 11, but a part of the keyboard 13 may be exposed in the state in which the main display is closed. According to such a configuration, the exposed keyboard 13 can be partially used and, for example, the user can execute activating the above-described note application and the like by pressing a specific exposed key.

Eleventh Embodiment

Next, an eleventh embodiment will be explained. Detailed explanations of the same portions of the present embodiment as the first embodiment are omitted, and the portions of the present embodiment different from the first embodiment will be mainly explained.

It has been explained in the above-described first embodiment that the main display 12 is composed of one display, but the present embodiment is different from the above-described first embodiment with respect to a feature that the main display 12 is composed of a first display 12a and a second display 12b.

Figure 34:
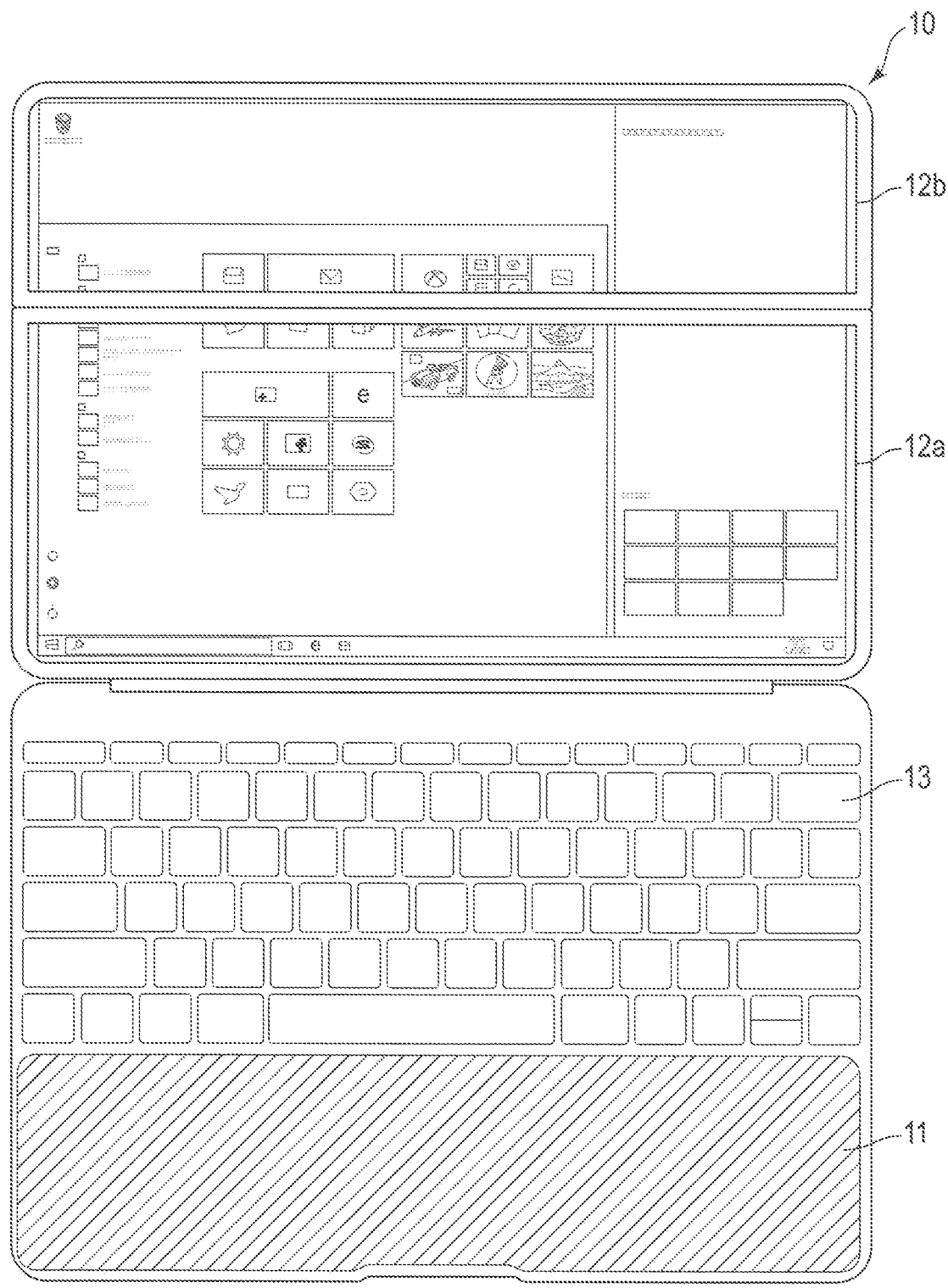
FIG. 34 is a view for explanation of the information processing device according to the eleventh embodiment.

The information processing device 10 according to the present embodiment will be explained with reference to FIG. 34. As shown in FIG. 34, the main display 12 of the information processing device 10 according to the present embodiment includes the first display 12a and the second display 12b.

The main display 12 is divided into an upper side portion and a lower side portion by, for example, a boundary line in the lateral direction (horizontal direction) located more close to the center than to the upper side of the main display 12 when the main display 12 is opened. In the present embodiment, the lower side portion of the main display 12 thus divided is the first display 12a, and the upper side portion of the main display 12 thus divided is the second display 12b.

The above-described first display 12a is connected to the body 10a so as to be capable of pivoting between a position where an upper surface of the body 10a is exposed and a position where the upper surface of the body 10a is covered with the main display 12 (first display 12a and second display 12b), similarly to the above-described main display 12 of the first embodiment.

Figure 35:
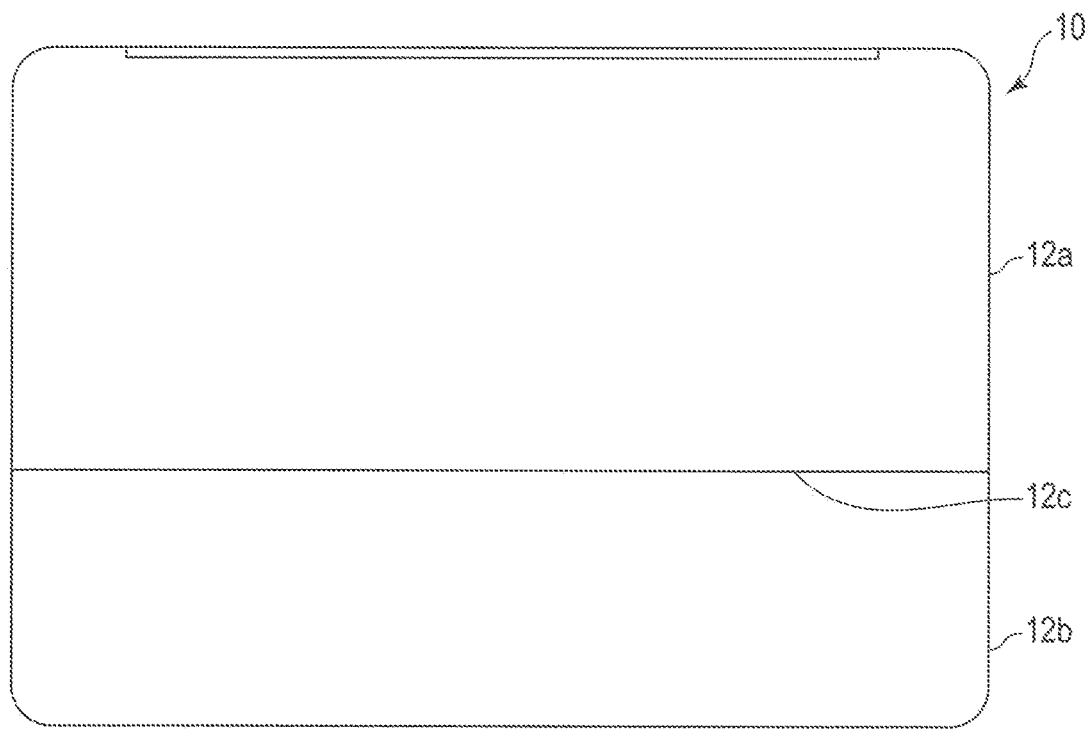
FIG. 35 is a view showing an example of a state in which the upper surface of the body is covered with a first display and a second display.

FIG. 35 shows a state in which the upper surface of the body 10a is covered with the first display 12a and the second display 12b (i.e., the main display 12 is closed).

The second display 12b is configured to pivot about a boundary portion 12c between the first display 12a and the second display 12b (i.e., to be bent about a point of division between the first display 12a and the second display 12b).

Figure 36:
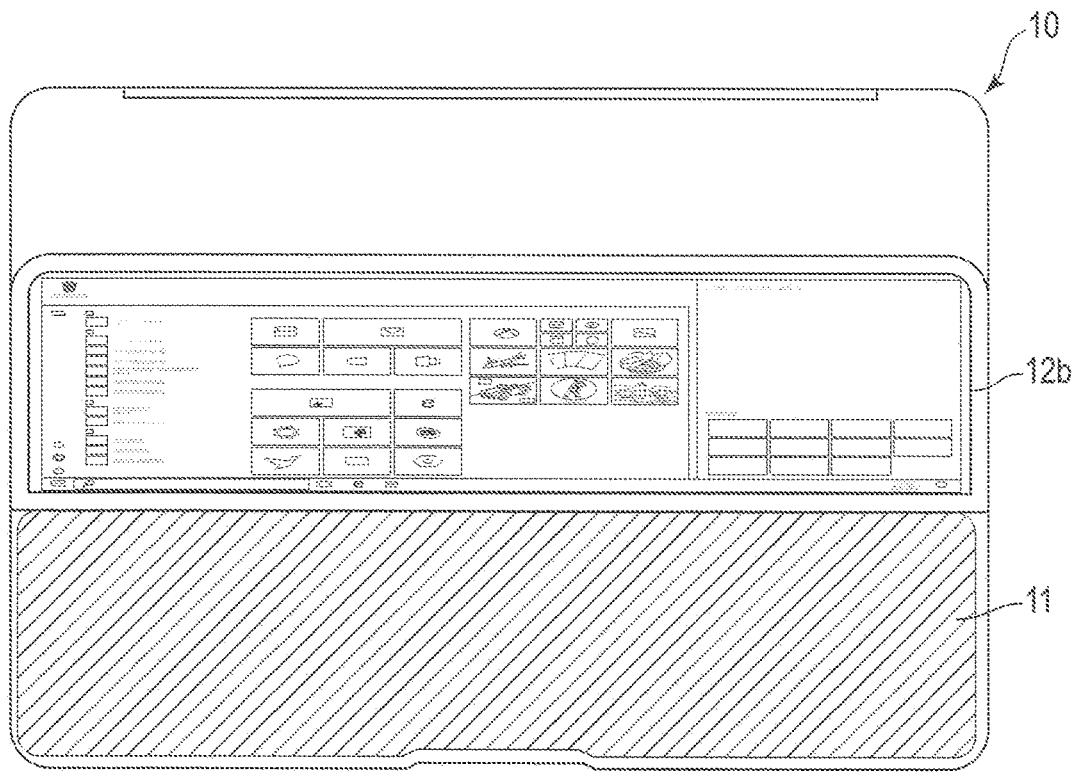
FIG. 36 is a view showing an example of a state in which the second display is pivoted from a state where the main display is closed to a position where the display surface of the second display is exposed.

FIG. 36 shows a state in which the second display 12b is pivoted from a state where the main display 12 (first display 12a and second display 12b) is closed as shown in FIG. 35 to a position where the display surface of the second display 12b is exposed.

In the information processing device 10 according to the present embodiment, in such a configuration, the second display 12b and the sub-display 11 can be used, since the second display 12b and the sub-display 11 become exposed even if the upper surface of the body 10a is covered with the first display 12a.

A system configuration of the information processing device 10 according to the present embodiment is the same as that of the above-described first embodiment except for a feature that the main display 12 is composed of the first display 12a and the second display 12b, and will be arbitrarily explained with reference to FIG. 6 and the like.

A procedure of the information processing device 10 according to the present embodiment will be explained with reference to a flowchart of FIG. 37.

It is assumed that as shown in FIG. 35, the upper surface of the body 10a of the information processing device 10 is covered with the main display 12 (first display 12a and second display 12b) (i.e., the main display 12 is closed). At this time, it is assumed that the first display 12a, the second display 12b, and the sub-display 11 are unilluminated.

In this case, it is determined whether the second display 12b is opened or not (step S81). The condition that "the second display 12b is opened" indicates that the state shown in FIG. 35 is changed to the state in which the screen of the second display 12b is exposed by pivoting the second display 12b (i.e., the state shown in FIG. 36).

In the present embodiment, it is assumed that, for example, the state in which the second display 12b is opened can be detected by a magnetic sensor, a physical switch or the like provided in the information processing device 10.

If it is determined that the second display 12b is not opened (NO in step S81), the processing is ended.

It is assumed that, for example, the user can preset OS which is operated in the state shown in FIG. 36. The OS which can be preset by the user may be the main OS 14a or the sub-OS 16a but the sub-OS 16a is assumed to be set in the following explanations.

If it is determined in step S81 that the second display 12b is opened (YES in step S81), it is determined whether the sub-OS 16a set by the user is active (operating) or not (step S82).

If it is determined that the sub-OS 16a is not active (NO in step S82), the sub-CPU 16 is operated and the sub-CPU 16 activates the sub-OS 16a (step S83).

In contrast, if it is determined that the sub-OS 16a is active (YES in step S2), the processing in step S83 is not executed.

Next, the sub-CPU 16 illuminates the second display 12b and the sub-display 11 (step S84).

It is assumed that the user can set whether to urge the second display 12b and the sub-display 11 to cooperate or not if the second display 12b is opened.

For this reason, the sub-CPU 16 determines whether to urge the second display 12b and the sub-display 11 to execute the collaborative operation (cooperation) or not, based on the user settings (step S85).

If it is determined that the second display 12b and the sub-display 11 are urged to execute collaborative operation (YES in step S85), the sub-CPU 16 controls display of the second display 12b and the sub-display 11 as if the second display 12b and the sub-display 11 operated as one screen (step S86).

In this case, the second display 12b and the sub-display 11 operating as one screen may display, for example, the information indicating a calendar, a clock, and presence of an unread mail, and the like or may display a image according to a predetermined application program executed by the sub-CPU 16, and the like.

In the information processing device 10 according to the preset embodiment, for example, switches corresponding to the second display 12b and the sub-display 11, respectively, are provided. The user can execute the operation of turning off the second display 12b and the sub-display 11 by using such switches. The switches corresponding to the second display 12b and the sub-display 11, respectively, may be switches (hardware switches) physically arranged in the information processing device 10 or buttons (software switches) displayed on the second display 12b or the sub-display 11.

The sub-CPU 16 determines whether the operation of turning off the second display 12b and the sub-display 11 has been executed or not (step S87).

If the operation of turning off the second display 12b or the sub-display 11 is not executed (NO in step S87), the cooperating operation of the second display 12b and the sub-display 11 is continued.

If the operation of turning off the second display 12b or the sub-display 11 is executed (YES in step S87), the sub-CPU 16 urges the display (second display 12b or sub-display 11) operated to be turned off to be unilluminated (step S88).

If the processing in step S88 is executed, the sub-CPU 16 cancels cooperation (collaborative operation) of the second display 12b and the sub-display 11 (step S89). According to this, while the second display 12b and the sub-display 11 operate as one screen, one of the displays is made unilluminated and the display operation is continued by the other illuminated display.

If it is determined that the cooperating operation of the second display 12b and the sub-display 11 is not executed (NO in step S85), the processing is ended. In this case, the second display 12b and the sub-display 11 can display different information. If the second display 12b and the sub-display 11 thus display different information, the second display 12b may be controlled by the main CPU 14, and the sub-display 11 may be controlled by the sub-CPU 16.

In the present embodiment as described above, since the second display 12b constituting the main display 12 is configured to pivot about the boundary portion between the first display 12a and the second display 12b, the information processing device 10 can be used in the state as shown in FIG. 36. In other words, in the present embodiment, the sub-display 11 can be expanded by urging the second display 12b and the sub-display 11 to cooperate and thereby the palm rest portion can be used further effectively.

In the present embodiment, the second display 12b and the sub-display 11 can be operated as one screen by urging the second display 12b and the sub-display 11 to cooperate, but the second display 12b and the sub-display 11 can operate independently to display different information or either of the displays can be illuminated to display information.

Twelfth Embodiment

Next, a twelfth embodiment will be explained. Detailed explanations of the same portions of the present embodiment as the first embodiment are omitted, and the portions of the present embodiment different from the first embodiment will be mainly explained.

It has been explained in the above-described first embodiment that the main display 12 is composed of one display, but the present embodiment is different from the above-described first embodiment with respect to a feature that the main display 12 is composed of a first display 12a and a second display 12b similarly to the above-described eleventh embodiment.

Figure 38:
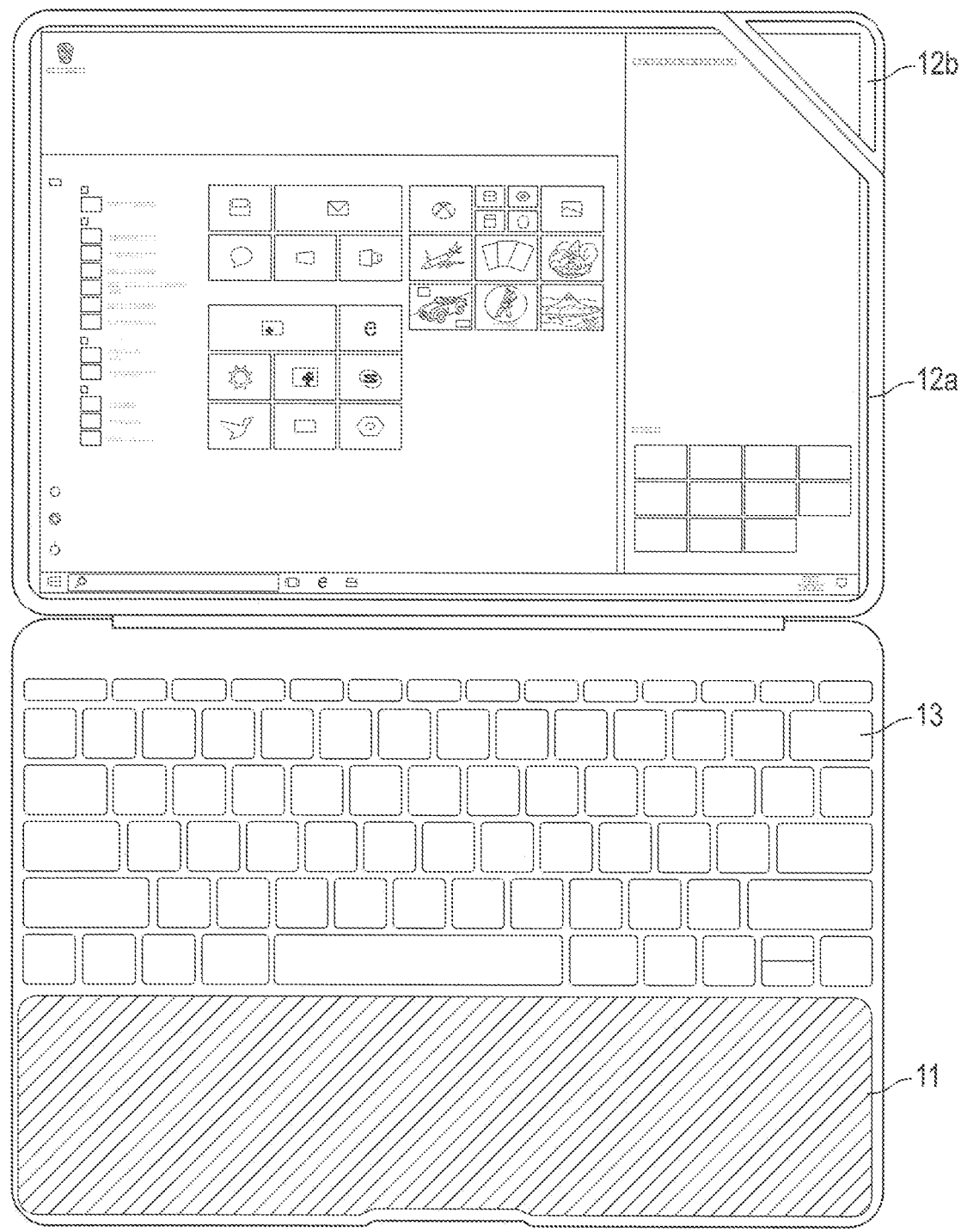
FIG. 38 is a view for explanation of the information processing device according to the twelfth embodiment.

The information processing device 10 according to the present embodiment will be explained with reference to FIG. 38. As shown in FIG. 38, the main display 12 of the information processing device 10 according to the present embodiment is composed of the first display 12*a* and the second display 12*b*.

The main display 12 is divided into a triangular portion at an upper right corner of the main display 12 and the other portion, in a state in which the main display 12 is opened. In the present embodiment, the portion other than the divided triangular portion is the first display 12*a*, and the triangular portion is the second display 12*b*.

The above-described first display 12*a* is connected to the body 10*a* so as to be capable of pivoting between a position where an upper surface of the body 10*a* is exposed and a position where the upper surface of the body 10*a* is covered with the main display 12 (first display 12*a* and second display 12*b*), similarly to the above-described main display 12 of the first embodiment.

Figure 39:
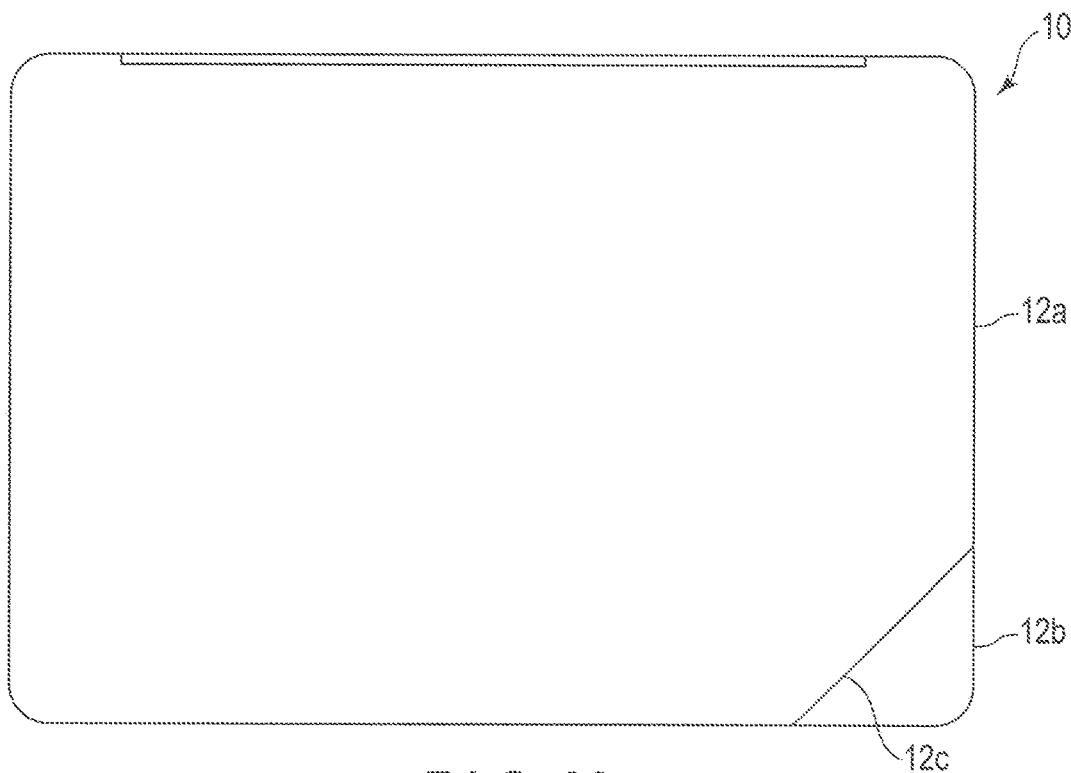
FIG. 39 is a view showing an example of a state in which the upper surface of the main body is covered with the first display and the second display.

FIG. 39 shows a state in which the upper surface of the body 10*a* is covered with the first display 12*a* and the second display 12*b* (i.e., the main display 12 is closed).

The second display 12*b* is configured to pivot about a boundary portion 12*c* between the first display 12*a* and the second display 12*b* (i.e., to be bent about a point of division between the first display 12*a* and the second display 12*b*).

Figure 40:
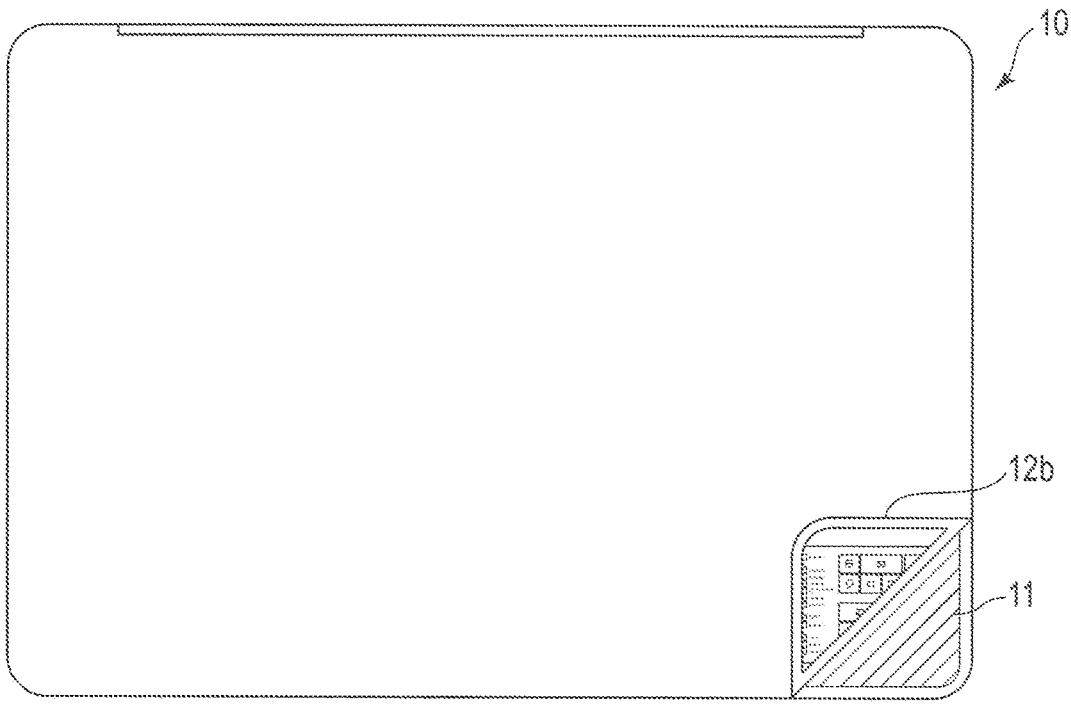
FIG. 40 is a view showing an example of a state in which the second display is pivoted from a state where the main display is closed to a position where the display surface of the second display is exposed.

FIG. 40 shows a state in which the second display 12*b* is pivoted from a state where the main display 12 (first display 12*a* and second display 12*b*) is closed as shown in FIG. 39 to a position where the display surface of the second display 12*b* is exposed.

In the information processing device 10 according to the present embodiment, in such a configuration, the second display 12*b* and the sub-display 11 can be used, since the second display 12*b* and the sub-display 11 become exposed even if the upper surface of the body 10*a* is covered with the first display 12*a*.

A system configuration of the information processing device 10 according to the present embodiment is the same as that of the above-described first embodiment except for a feature that the main display 12 is composed of the first display 12*a* and the second display 12*b*, and will be arbitrarily explained with reference to FIG. 6.

Figure 41:
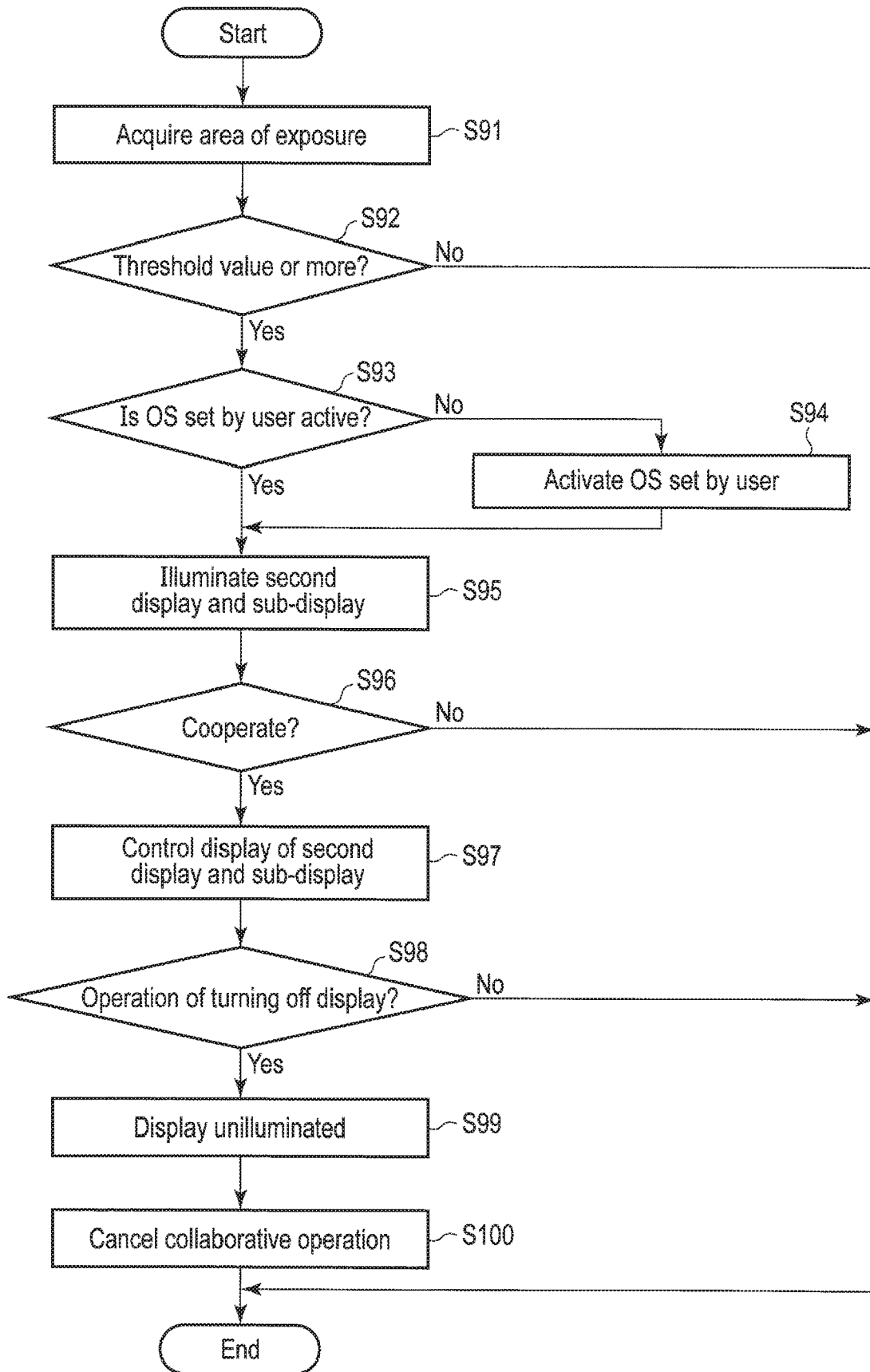
FIG. 41 is a flowchart showing an example of a procedure of the information processing device.

A procedure of the information processing device 10 according to the present embodiment will be explained with reference to a flowchart of FIG. 41.

It is assumed that as shown in FIG. 39, the upper surface of the body 10*a* of the information processing device 10 is covered with the main display 12 (first display 12*a* and second display 12*b*) (i.e., the main display 12 is closed). It is assumed that the first display 12*a*, the second display 12*b*, and the sub-display are unilluminated.

Since the second display 12*b* is configured to pivot about the boundary portion between the first display 12*a* and the second display 12*b*, the user can expose a part of the sub-display 11 (i.e., the portion opposite to the second display 12*b* in the state in which the main display 12 is closed) by urging the second display 12*b* to pivot.

If the user urges the second display 12*b* to pivot, the quantity of bending (quantity of opening) of the second display 12*b* is acquired (step S91). The quantity of bending of the second display 12*b* can be acquired by using, for example, a touch sensor 111 provided in the sub-display 11, a proximity sensor provided in the information processing device 10, a distortion sensor of the main display 12, or the like.

Next, it is determined whether the quantity of bending acquired in step S91 is higher than or equal to a predetermined value (hereinafter referred to as a threshold value) or not (step S92).

If it is determined that the quantity of bending is not the threshold value or more (NO in step S92), the processing is ended.

In contrast, if it is determined that the quantity of bending is the threshold value or more (YES in step S92), the processing following step S93 corresponding to the above-described processing in steps S82 shown in FIG. 37 is executed.

In the present embodiment as described above, since the second display 12*b* constituting the main display 12 is configured to pivot about the boundary portion between the first display 12*a* and the second display 12*b*, the information processing device 10 can be used in the state as shown in FIG. 40. In other words, in the present embodiment, the sub-display 11 can be expanded by urging the second display 12*b* and the sub-display 11 to cooperate and thereby the palm rest portion can be used further effectively. If the main display 12 is used as a flexible display and the flexible display is bent similarly to the second display 12*b* shown in FIG. 40, the second display 12*b* and the sub-display 11 may also be urged to cooperate. In this case, the bending position may be detected by the touch sensor 111 on the sub-display 11, and the exposed portion of the main display 12 and the exposed portion of the sub-display 11 may be operated to cooperate.

Thirteenth Embodiment

Next, a thirteenth embodiment will be explained. Detailed explanations of the same portions of the present embodiment as the first embodiment are omitted, and the portions of the present embodiment different from the first embodiment will be mainly explained.

The present embodiment is different from the above-described first embodiment with respect to a feature that the information processing device can be used in a plurality of modes.

The information processing device 10 according to the present embodiment will be explained with reference to FIG. 42 and FIG. 43.

First, FIG. 42 is a view showing the information processing device 10 according to the present embodiment as seen from a direction perpendicular to a horizontal plane in which the information processing device 10 is placed. In the present embodiment, the user can use the information processing device 10 from the front side of the information processing device 10 (i.e., the sub-display 11 side of the body 10*a*) shown in FIG. 42. A mode of using the information processing device 10 shown in FIG. 42 is referred to as a first mode, in the following explanations.

In contrast, FIG. 43 is a view showing the information processing device 10, turning the information processing device 10 shown in FIG. 42 at 180 degrees in the horizontal direction. In the present embodiment, the user can use the information processing device 10 from the front side of the information processing device 10 (i.e., the keyboard side of the body 10*a*) shown in FIG. 43. A mode of using the information processing device 10 shown in FIG. 43 is referred to as a second mode, in the following explanations.

In the present embodiment, whether the information processing device 10 is used in the first mode or the second mode needs to be determined and the processing according to the mode needs to be executed.

A procedure of the information processing device 10 according to the present embodiment will be explained with reference to a flowchart of FIG. 44.

The information processing device 10 may operate in the main display mode or the sub-display mode in the present embodiment, but it will be explained here that, for example, the information processing device 10 operates in the main display mode.

In this case, the main CPU 14 detects an orientation of the information processing device 10 used by the user (step S111).

In step S111, for example, if the palm or wrist is placed on the sub-display 11 when characters and the like are input by the keyboard 13, it can be detected that the information processing device 10 is used in an orientation (hereinafter referred to as a first orientation) in which the sub-display 11 is arranged in front of the keyboard 13 as seen from the user. In contrast, if the palm or wrist is not placed on the sub-display when characters and the like are input by the keyboard 13, it can be detected that the information processing device 10 is used in an orientation (hereinafter referred to as a second orientation) in which the keyboard 13 is arranged in front of the sub-display 11 as seen from the user.

The above-explained processing in step S111 is a mere example, and the orientation (first orientation or second orientation) in which the information processing device 10 is used may be detected based on, for example, an image captured by a camera arranged close to the main display 12 or on the upper surface of the boy 10*a* or the like. That is, if the camera is arranged at a position where the user using the information processing device 10 in the first orientation can be captured and if the user is in the image captured by the camera, it can be detected that the information processing device 10 is used in the first orientation. In contrast, if the user is not in the image captured by the camera, it can be detected that the information processing device 10 is not used in the first orientation (i.e., the information processing device 10 is used in the second orientation).

In addition, in step S111, for example, the orientation of use of the information processing device 10 may be detected, based on, for example, the user operation of the hardware switch or the software switch.

The main CPU 14 determines whether the orientation detected in step S111 is the first orientation or not (step S112).

If it is determined that the orientation detected in step S111 is the first orientation (YES in step S112), the main CPU 14 controls the information processing device 10 to operate in the first mode (step S113). More specifically, the main CPU 14 controls orientation of the characters displayed on the sub-display 11 such that the user using the information processing device 10 in the first mode can recognize the characters.

In contrast, if it is determined that the orientation detected in step S111 is not the first orientation (NO in step S112), the main CPU 14 controls the information processing device 10 to operate in the second mode (step S114). More specifically, the main CPU 14 controls orientation of the characters displayed on the sub-display 11 such that the user using the information processing device 10 in the second mode can recognize the characters.

It is assumed that the user inputs characters with the keyboard 13 when using the information processing device 10 in the second mode. In this case, since the keys arranged on the keyboard 13 are rotated at 180 degrees as compared with a case where the information processing device 10 is used in the first mode, the user can hardly input characters with such a keyboard 13.

For this reason, in step S114, control to change the assignment of characters, symbols and the like to the respective keys arranged on the keyboard 13 is executed. In this case, as shown in FIG. 42 and FIG. 43, for example, the assignment of characters, symbols and the like to the respective keys is changed such that the key arrangement of the keyboard 13 when using the information processing device 10 in the second mode is substantially the same as the key arrangement of the keyboard 13 when using the information processing device 10 in the first mode.

In addition, if the assignment of characters, symbols and the like to the respective keys is thus changed, the user can hardly recognize the assignment of characters or symbols to the keys. For this reason, in the present embodiment, for example, illumination of the characters or symbols engraved on the keys arranged on the keyboard 13 (i.e., display of the characters or symbols assigned to the keys) may be changed. For example, if the display is provided on the keyboard 13, display of the characters or symbols assigned to the respective keys may be changed by changing the display.

According to this, if the information processing device 10 is used in the second mode, too, the user can input the characters and the like by using the keyboard 13, similarly to the case where the information processing device 10 is used in the first mode.

In the present embodiment, as described above, since the information processing device 10 can be used in plural modes, the sub-display 11 can be used in its largest area without covering the sub-display with the palm or wrist, and thereby the user convenience can be enhanced.

According to at least one of the above-described embodiments, an information processing device capable of effectively using the palm rest portion can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising: a keyboard arranged on an upper surface of a body; a main display connected to the body; a sub-display arranged on a palm rest portion located on a front side of the keyboard, a main processor for causing the information processing device to operate in a main display mode; and a sub-processor for causing the information processing device to operate in a sub-display mode, wherein the sub-display is provided such that an end portion of the sub-display is provided along an end portion of the palm rest portion, an operating mode of the information processing device can be switched between the main display mode and the sub-display mode, when the information processing device operates in the main display mode, the main processor displays an information corresponding to an input using the keyboard on at least one of the main display and the sub-display, and when the information processing device operates in the sub-display mode, the sub-processor displays the information corresponding to the input using the keyboard on at least one of the main display and the sub-display; wherein the sub-display comprises a touch sensor capable of detecting a position of a user's touch on a screen of the sub-display, and when input is executed using the keyboard while the information processing device operates in the sub-display mode, the sub-processor detects a region of the sub-display where a palm or wrist is placed using the touch sensor, and displays the information corresponding to the input using the keyboard in a region other than the detected region.

2. The information processing device of claim 1, wherein the sub-display comprises a touch sensor capable of detecting a position of a user's touch on a screen of the sub-display.

3. The information processing device of claim 1, further comprising:
a first switch and a second switch,
wherein
if the first switch is turned on, a first operating system is activated, and the main display and the sub-display are controlled, and
if the second switch is turned on, a second operating system is activated and the sub-display is controlled.

4. The information processing device of claim 1, wherein the sub-display comprises a fingerprint sensor to implement a fingerprint authentication function of authenticating a user's fingerprint.

5. The information processing device of claim 1, wherein a display unit comprising a sub-display arranged on the palm rest portion is configured to be detachable from the body.

6. The information processing device of claim 3, wherein the second operating system has smaller load than the first operating system.

7. The information processing device of claim 3, wherein the first operating system operates by the main processor, and the second operating system operates by the sub-processor with smaller power consumption than the main processor.

8. The information processing device of claim 2, wherein if it is determined that a user's palm or wrist is placed on the sub-display, a function of a part of a region of the sub-display is turned off.

9. The information processing device of claim 1, wherein the main display comprises a first display and a second display.

10. The information processing device of claim 9, wherein the first display is coupled to the body, the second display is coupled to the first display, and the second display is smaller in area than the sub-display.

11. The information processing device of claim 1, wherein the main display is smaller in area than the body.

12. The information processing device of claim 11, wherein
the main display is smaller in area than the keyboard.

13. The information processing device of claim 1, wherein
the sub-display is detachable from the body.

14. The information processing device of claim 1, wherein
the sub-display comprises a touch sensor capable of detecting placement of a joystick on the sub-display and input in directions to the joystick.

15. The information processing device of claim 1, wherein
the main display comprises a first display and a second display connected to the first display, and
the second display is configured to pivot about a boundary portion between the first display and the second display.

16. The information processing device of claim 15, wherein
the second display is placed at a corner of the main display.

17. The information processing device of claim 1, further comprising:
a first switch and a second switch,
wherein
if the first switch is turned on, the information processing device operates in the main display mode, and
if the second switch is turned on, the information processing device operates in the sub-display mode.

18. The information processing device of claim 1, wherein
the sub-display comprises a touch sensor capable of detecting a position of a user's touch on a screen of the sub-display, and
when the information processing device operates in the main display mode, the main processor controls the main display based on an input using the touch sensor.

19. The information processing device of claim 1, wherein
the sub-display comprises a handwriting input circuit, and
when the information processing device operates in the sub-display mode, the sub-processor displays the information including a character received by the handwriting input circuit and input by handwriting in a region of the sub-display in which the character is input by handwriting, converts the character input by handwriting into a text, and displays the character converted into the text in a region other than the region in which the character is input by handwriting.

\* \* \* \* \*